United States Patent
Sugimoto et al.

(10) Patent No.: US 7,807,278 B2
(45) Date of Patent: Oct. 5, 2010

(54) PERPENDICULAR MAGNETIC RECORDING MEDIUM AND MAGNETIC STORAGE APPARATUS

(75) Inventors: Toshio Sugimoto, Kawasaki (JP); Ryosaku Inamura, Kawasaki (JP); Takuya Uzumaki, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/388,991

(22) Filed: Mar. 24, 2006

(65) Prior Publication Data

US 2006/0199043 A1 Sep. 7, 2006

Related U.S. Application Data

(63) Continuation of application No. PCT/JP03/12538, filed on Sep. 30, 2003.

(51) Int. Cl.
*G11B 5/66* (2006.01)

(52) U.S. Cl. .................. 428/828.1; 428/827; 428/828

(58) Field of Classification Search .................. 428/828
See application file for complete search history.

(56) References Cited

U.S. PATENT DOCUMENTS

| | | | |
|---|---|---|---|
| 6,211,673 B1 * | 4/2001 | Gerber et al. ............... | 324/262 |
| 6,440,589 B1 | 8/2002 | Fullerton et al. | |
| 6,641,934 B1 * | 11/2003 | Suzuki et al. ............... | 428/828 |
| 6,682,826 B2 | 1/2004 | Shimizu et al. | |
| 6,881,503 B2 * | 4/2005 | Lu et al. .................... | 428/828 |
| 7,067,206 B2 | 6/2006 | Uwazumi et al. | |
| 7,067,207 B2 * | 6/2006 | Kamata et al. ............. | 428/836 |
| 7,141,317 B2 * | 11/2006 | Kikitsu et al. .............. | 428/829 |
| 7,351,445 B2 * | 4/2008 | Haginoya et al. .......... | 427/131 |
| 7,422,808 B2 * | 9/2008 | Sugimoto et al. ......... | 428/828.1 |
| 2002/0028355 A1 | 3/2002 | Nakamura et al. | |
| 2003/0017364 A1 * | 1/2003 | Kikitsu et al. .............. | 428/693 |
| 2003/0108776 A1 * | 6/2003 | Chang et al. ........... | 428/694 TM |
| 2004/0053073 A1 * | 3/2004 | Lu et al. .................. | 428/694 T |

(Continued)

FOREIGN PATENT DOCUMENTS

JP 02-024815 1/1990

(Continued)

OTHER PUBLICATIONS

Maeda et al. JP 2003-228809 (machine translation) Published Aug. 15, 2003.*

(Continued)

*Primary Examiner*—Mark Ruthkosky
*Assistant Examiner*—Gary Harris
(74) *Attorney, Agent, or Firm*—Greer, Burns & Crain, Ltd.

(57) ABSTRACT

A perpendicular magnetic recording medium, including a soft-magnetic backing layer; and a recording layer provided over the oft-magnetic backing layer. There is provided a magnetic flux slit layer between the soft-magnetic backing layer and the recording layer. The magnetic flux slit layer includes a soft-magnetic layer having a generally columnar structure generally isolated magnetically in an in-plane direction. The magnetic flux slit layer contains at least one selected from the group consisting of Co, Fe, Ni, a Co alloy, a Fe alloy, and a Ni alloy, as a major component, and the magnetic flux slit layer further contains any one selected from the group consisting of Ta, Cu, Pb, Cr, and Re.

21 Claims, 29 Drawing Sheets

U.S. PATENT DOCUMENTS

2006/0040140 A1 * 2/2006 Kaizu et al. .................. 428/829

FOREIGN PATENT DOCUMENTS

| | | |
|---|---|---|
| JP | 3-130904 | 6/1991 |
| JP | 5-303734 | 11/1993 |
| JP | 6-295431 | 10/1994 |
| JP | 07-044851 | 2/1995 |
| JP | 10-003644 | 1/1998 |
| JP | 2001-134918 | 5/2001 |
| JP | 1001-025030 | 1/2002 |
| JP | 2002-025030 | 1/2002 |
| JP | 2002-092843 | 3/2002 |
| JP | 2002-163819 | 6/2002 |
| JP | 2002-197635 | 7/2002 |
| JP | 2003-217107 | 7/2002 |
| JP | 2003-77122 | 3/2003 |
| JP | 2003-123245 | 4/2003 |
| JP | 2003-178431 | 6/2003 |
| JP | 15-228809 | 8/2003 |
| JP | 2003-228809 | 8/2003 |
| JP | 2004-030470 | 1/2004 |
| JP | 2004-030740 | 1/2004 |
| KR | 2001-0020939 | 3/2001 |

OTHER PUBLICATIONS

Ogiwara JP 2002-92843 (Machine Translation) Published Mar. 29, 2002.*

* cited by examiner

FIG.4

| SAMPLE | Ru THICKNESS (nm) | PERPENDICULAR COERCIVE FORCE Hc (kA/m) | α | NORMALIZED COERCIVE FORCE Hc/Hk | MEDIUM NOISE (μVrms) | S/Nm (dB) |
|---|---|---|---|---|---|---|
| EXAMPLE 1 | | | | | | |
| 1 | 7 | 403 | 2.7 | 0.39 | | |
| 2 | 10 | 442 | 2.5 | 0.40 | | |
| 3 | 15 | 474 | 1.9 | 0.44 | | |
| 4 | 20 | 490 | 1.9 | 0.45 | 62.4 | −1.3 |
| EXAMPLE 2 | | | | | | |
| 5 | 7 | 340 | 2.8 | 0.33 | | |
| 6 | 10 | 427 | 3.1 | 0.39 | | |
| 7 | 15 | 442 | 2.0 | 0.40 | | |
| 8 | 20 | 474 | 1.7 | 0.41 | 63.0 | 0.2 |
| COMPARATIVE 1 | | | | | | |
| 9 | 7 | 182 | 4.9 | 0.22 | | |
| 10 | 10 | 213 | 4.8 | 0.23 | | |
| 11 | 15 | 269 | 4.8 | 0.28 | | |
| 12 | 20 | 284 | 4.1 | 0.31 | 82.7 | −3.7 |

FIG.8

| | PERPENDICULAR COERCIVE FORCE Hc (kA/m) | SATURATION MAGNETIZATION (mT) | α | S/Nm (dB) | D50 (kFCI) |
|---|---|---|---|---|---|
| EXAMPLE 4 | 316 | 814 | 2.0 | 11 | 315 |
| EXAMPLE 5 | 435 | 760 | 1.2 | 18 | 364 |

100

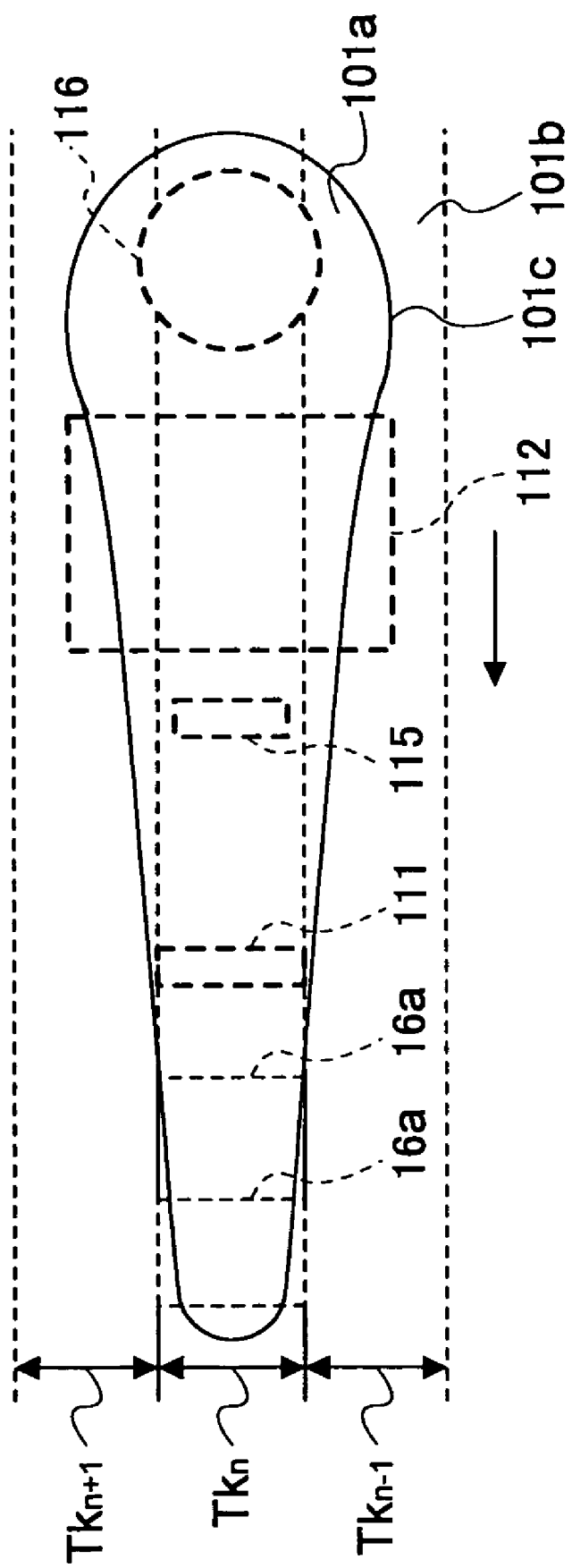

105

PERPENDICULAR MAGNETIC RECORDING MEDIUM AND MAGNETIC STORAGE APPARATUS

CROSS-REFERENCE TO RELATED APPLICATIONS

The present invention is a continuation application filed under 35 U.S.C. 111(a) claiming benefit under 35 U.S.C. 120 and 365(c) of PCT application JP2003/012538 filed on Sep. 30, 2003, the entire contents of each are incorporated herein as reference.

BACKGROUND OF THE INVENTION

The present invention relates to perpendicular magnetic recording media and magnetic storage apparatuses, and more particularly to a perpendicular magnetic recording medium and a magnetic storage apparatus capable of performing high density recording.

With rapid development of technology in magnetic storage apparatuses, practical machine of surface recording density of about 100 Gbit/in$^2$ is about to be commercialized by using the technology of in-plane recording, in which recording is made on a magnetic recording medium in an in-plane direction. However, there has been caused the problem of thermal stability of recorded magnetization in the technology of in-plane magnetic recording when the recording unit is miniaturized beyond the recording density of 100 Gbit/in$^2$. While it is predicted that commercialization should be possible up to the recording density of 250 Gbit/in$^2$ with further improvement of technology, it is recognized that the recording density has now almost reached the limit with the technology of in-plane magnetic recording.

On the other hand, with the technology of perpendicular magnetic recording that carries out recording in the perpendicular direction of a magnetic recording medium, thermal stabilization can be secured for the magnetic recording unit by providing an appropriate thickness even when the size of the recording unit is miniaturized. Thus, it is predicted that the surface recording density should be improved to the order of terabit/in$^2$ with the technology of perpendicular magnetic recording.

In the art of perpendicular magnetic recording medium, the mainstream is a so-called dual-layer perpendicular magnetic recording medium, in which there is provided a soft-magnetic backing layer between a magnetic recording layer and a substrate. With such a construction of dual-layer perpendicular magnetic recording medium, a mirroring effect of the soft-magnetic backing layer functions so as to intensify a recording magnetic field from a primary magnetic pole of a recording head, and the recording magnetic head is spatially concentrated to increase the gradient of the recording magnetic field.

On the other hand, the soft-magnetic backing layer disposed against the primary magnetic pole has a spreading, and thus, the magnetic flux exiting from the primary magnetic pole undergoes spreading toward the soft-magnetic backing layer. Thereby, the magnetic flux is diffused at the surface of the recording layer, and there arises a problem that it becomes not possible to form minute recording bits in the recording layer. Because of this, it has not been possible to increase the recording density.

Meanwhile, in anticipation of decrease of reproduced output and increase of medium noise with increase of recording density, investigations are being made for improvement of S/N ratio. More specifically, it is recognized that measures have to be taken for: miniaturization; isolation; orientation control; and improvement of crystallinity, for the magnetic particles constituting the recording medium. Because the magnetic particles of the recording layer are formed on a non-magnetic intermediate layer, the magnetic particles are influenced by the crystal orientation or crystallinity of the non-magnetic intermediate layer, and thus, designing of the non-magnetic intermediate layer becomes an important issue.

When the thickness of the non-magnetic intermediate layer is increased for improving the crystallinity of the non-magnetic intermediate layer, there arises a problem in that, although the crystallinity of the recording layer is improved, the spacing between the recording head and the soft-magnetic backing layer is increased, leasing to further spreading of the magnetic flux.

Patent Reference 1
Japanese Laid-Open Patent Application 2002-163819 official gazette
Patent Reference 2
Japanese Laid-Open Patent Application 3-130904 official gazette
Patent Reference 3
Japanese Laid-Open Patent Application 6-295431 official gazette
Patent Reference 4
Japanese Laid-Open Patent Application 10-3644 official gazette
Patent Reference 5
Japanese Laid-Open Patent Application 2001-134918 official gazette

SUMMARY OF THE INVENTION

Accordingly, it is a general object of the present invention to provide a novel and useful perpendicular magnetic recording medium, manufacturing method thereof and a magnetic storage apparatus wherein the foregoing problems are eliminated.

Another and more specific object of the present invention is to provide a perpendicular magnetic recording medium enabling high-density recording by suppressing the spreading of magnetic flux from a recording head and thus increasing the recording magnetic field and increasing the gradient of the recording magnetic field.

Another object of the present invention is to provide a perpendicular magnetic recording medium enabling high-density recording with improved S/N ratio, by facilitating miniaturization of crystal particles in the recording layer and simultaneously facilitating isolation of the crystal particles.

According to a first aspect, the present invention provides a perpendicular magnetic recording medium, comprising: a soft-magnetic backing layer; and a recording layer provided over said soft-magnetic backing layer, wherein there is provided a magnetic flux slit layer between said soft-magnetic backing layer and said recording layer, said magnetic flux slit layer comprising a soft-magnetic layer having a generally columnar structure generally isolated magnetically in an in-plane direction.

According to the present invention, it becomes possible to suppress the spreading of the magnetic flux from the recording head in an in-plane direction inside the magnetic flux slit layer, by forming the magnetic flux slit layer between the soft-magnetic backing layer and the recording layer to have a generally magnetically isolated columnar structure in the in-plane direction. Further, by forming the columnar structure by a soft-magnetic material, it becomes possible concentrate the magnetic flux. Thus, it becomes possible to increase the recording magnetic field in the recording layer and increase the gradient of the recording magnetic field, and it becomes possible to realize a perpendicular magnetic recording medium that enables high density recording.

According to a second aspect, the present invention provides a method for manufacturing a perpendicular magnetic recording medium having a soft-magnetic backing layer and a recording layer provided over said soft-magnetic backing layer, comprising the steps of: forming said magnetic backing layer; and forming said recording layer, wherein there is provided, between said step of forming said soft-magnetic backing layer and said step of forming said recording layer, a step of forming a magnetic flux slit layer of a soft-magnetic material with an ambient gas pressure equivalent to or exceeding an ambient gas pressure used in said step of forming said recording layer.

According to the present invention, it should be noted that the magnetic flux slit layer provided between the soft-magnetic backing layer and the recording layer is formed under the ambient gas pressure equal to or larger than the ambient gas pressure used at the time of forming the recording layer, and because of this, the ambient gas is incorporated into the soft-magnetic material. Thereby, there is caused formation of the columnar structure, and the soft-magnetic layer has a generally columnar structure generally isolated magnetically in the in-plane direction. With such a structure, spreading of the magnetic flux from the recording head in the in-plane direction inside the magnetic flux slit layer is suppressed. Further, Because columnar structure of the magnetic flux slit layer is formed of a soft-magnetic material, it is possible to concentrate the magnetic flux.

According to a third aspect of the present invention, there is provided a perpendicular magnetic recording medium comprising: a soft-magnetic backing layer; a non-magnetic intermediate layer provided over said soft-magnetic backing layer; and a recording layer provided over the non-magnetic intermediate layer, said non-magnetic intermediate layer comprising non-magnetic particles and a non-magnetic first non-soluble phase surrounding said non-magnetic particles, said recording layer comprising magnetic particles and a non-magnetic second non-soluble phase surrounding said non-magnetic particles, said magnetic particles having a columnar structure and grown epitaxially over said non-magnetic particles.

According to the present invention, the non-magnetic intermediate layer provided underneath the recording layer is formed from the non-magnetic particles and the first non-soluble phase, and the non-magnetic particles are formed with spontaneous mutual separation. Further, the magnetic particles of the recording layer are grown epitaxially over the non-magnetic particles, and thus, it becomes possible to control the grain size of the magnetic particles and control the separation between the magnetic particles. Thus, it becomes possible to achieve miniaturization and isolation of the magnetic particles at the same time, and it becomes possible to increase the S/N ratio by reducing the medium noise. Thereby, it becomes possible to realize a perpendicular magnetic recording medium that enables high density recording.

Here, it should be noted that epitaxial growth as used with the present specification means that crystal growth of a second layer is made over an underlying first layer in such a manner that the second layer causes crystal growth with regard to the first layer in the state that lattice matching is achieved more or less (allowing lattice mismatch of about 10% or less between the first layer and the second layer) for the crystal surfaces in the growth direction of the film. With regard to the in-plane direction perpendicular to he growth direction, it should be noted that epitaxial growth as used with the present specification includes, in addition to the case that there exists a specific relationship for crystal orientation, also the case in which there is no specific relationship in the crystal orientation.

According to a fourth aspect, there is provided a perpendicular magnetic recording medium, comprising: a soft-magnetic backing layer; and a recording layer provided over said soft-magnetic backing layer, wherein there is provided a soft-magnetic shielding layer over said recording layer, and recording is made in said recording layer by causing magnetization therein by a recording magnetic field that passes through a region in a part of said soft-magnetic shielding layer magnetically saturated by a predetermined magnetic field amount.

According to the present invention, magnetization is caused in the recording layer for the part underlying the magnetically saturated region, which is formed in a part of the soft-magnetic shielding layer provided over the recording layer by the recording magnetic field, the magnetization being caused by the recording magnetic field that passes selectively through such a saturated region. With this, it becomes possible to suppress the spreading of the magnetic flux from the recording head and it becomes possible to prevent erasing in adjacent tracks. Further, because of concentration of the magnetic flux from the recording head, it becomes possible to increase the recording magnetic field, and writing performance into the recording layer can be improved.

According to a fifth aspect of the present invention, there is provided a perpendicular magnetic recording medium comprising a soft-magnetic backing layer and a recording layer provided over said soft-magnetic backing layer, wherein there is provided a magnetic flux slit layer over the recording layer such that magnetic particles are disposed in said magnetic flux slit layer in a generally magnetically isolated state in an in-plane direction.

According to the present invention, in which the magnetic flux slit layer is provided over the recording layer and the magnetic particles constituting the magnetic flux slit layer are disposed in a generally magnetically isolated state in the in-plane direction, the magnetic flux exiting from the recording head and entering into the soft-magnetic backing layer via the magnetic flux slit layer and the recording layer experiences constriction in the magnetic flux slit layer such that the magnetic flux passes through the magnetic particles. Thereby, it becomes possible to suppress spreading of the magnetic flux and cause concentration of the magnetic flux as it exits from the recording head and enters into the recording layer. Thereby, it becomes possible to prevent erasing of adjacent tracks by the spreading of the magnetic flux, and it becomes possible to increase the track density. Further, it becomes possible to narrow the width of the transition region of magnetization in the elongating direction of the tracks, and it becomes possible to increase the line recording density. As a result, it becomes possible to realize a perpendicular magnetic recording medium of high recording density.

According to a sixth aspect of the present invention, there is provided a perpendicular magnetic recording medium comprising a soft-magnetic backing layer and a recording layer provided over the soft-magnetic recording layer, wherein there is provided a magnetic flux slit layer over the recording layer, such that the magnetic flux slit layer comprises a ferromagnetic matrix phase of a ferromagnetic material and non-magnetic particles disposed in an in-plane direction.

According to the present invention, in which the magnetic flux slit layer is formed of the ferromagnetic matrix phase disposed with the non-magnetic fine particles and the magnetic flux slit layer is provided over the recording layer, the magnetic flux exiting from the recording head and entering into the soft-magnetic backing layer through the magnetic flux slit layer and the recording layer is constricted in the magnetic flux slit layer so as to pass through the ferromagnetic matrix phase between the non-magnetic particles. Thereby, it becomes possible to suppress the spreading of the magnetic flux from the recording head to the recording layer and it becomes possible to constrict the magnetic flux. Thus, erasing of adjacent tracks caused by the spreading of the magnetic flux is avoided, and it becomes possible to increase the track density. Further, it becomes possible to narrow the width of the transition region of magnetization in the longitudinal direction of the tracks, and it becomes possible to improve the line recording density.

According to a seventh aspect of the present invention, there is provided a magnetic storage apparatus having any of the foregoing perpendicular magnetic recording media and a recoding and reproducing means.

According to the present invention, it becomes possible with the perpendicular magnetic recording medium to increase the magnetic flux from the recording head and the recording magnetic field in the recording layer. Further, it becomes possible to increase the gradient of the recording magnetic field. Further, it becomes possible to increase the S/N ratio by achieving miniaturization and isolation of the magnetic particles at the same time. Thereby, it becomes possible to realize a magnetic recording apparatus of high recording density.

According to an eighth aspect, the present invention provides a perpendicular magnetic recording medium comprising a magnetic backing layer and a recording layer provided over the soft-magnetic backing layer, said recording layer being magnetized by a magnetic flux from a recording head passed through said recording layer and entering to said magnetic backing layer, wherein there is provided a magnetic flux control layer containing a superconducting material between the soft-magnetic backing layer and the recording layer, wherein there is formed a region of normal conduction state in a part of the magnetic flux control layer of superconduction state, such that the magnetic flux passes through the region of the normal conduction state.

According to the present invention, the magnetic flux control layer of the superconduction state becomes a perfect diamagnetic state, and the magnetic flux from the recording head is interrupted by the magnetic flux control layer. It is possible to change a part of the magnetic flux control layer to normal conduction state by applying heat, and thus, it becomes possible to cause the magnetic flux to pass selectively through the region thus changed to normal conduction state. Thereby, there is caused concentration of the magnetic flux in such a region, and it becomes possible to concentrate the magnetic flux to the part of the recording layer adjacent to such a region. Thereby, erasing of adjacent tracks caused by spreading of the magnetic flux is prevented and it becomes possible to increase the track density. Further, it becomes possible to narrow the width of the transition region of magnetization in the elongating direction of the tracks, and the line recording density is improved. As a result, it becomes possible to realize a perpendicular magnetic recording medium of high recording density.

BRIEF DESCRIPTION OF THE DRAWINGS

FIG. 4 is a diagram showing the characteristics of the perpendicular magnetic recording media of Examples 1 and 2 in comparison with Comparative Example 1;

FIG. 8 is a diagram showing the characteristics of the perpendicular magnetic recording medium according to Examples 4 and 5;

FIG. 29 is a diagram explaining the state of the magnetic flux control layer as viewed from the side of the composite magnetic head for perpendicular magnetic recording medium shown in FIG. 28;

FIG. 30A is a diagram showing application of a magnetic flux to the perpendicular magnetic recording medium of an example of the present embodiment from a primary magnetic pole of a recording head, while

FIG. 32A is a schematic cross-sectional diagram of the perpendicular magnetic recording medium according to an eighth embodiment of the present invention, while

BRIEF DESCRIPTION OF THE DRAWINGS

Hereinafter, the present invention will be explained in detail with reference to the drawings according to the needs.

First Embodiment

First, a perpendicular magnetic recording medium according to a first embodiment of the present invention will be explained, wherein it should be noted that the perpendicular magnetic recording medium is provided with a magnetic flux slit layer of a soft-magnetic material and having a generally columnar structure between a soft-magnetic backing layer and a recording layer.

Figure 1:
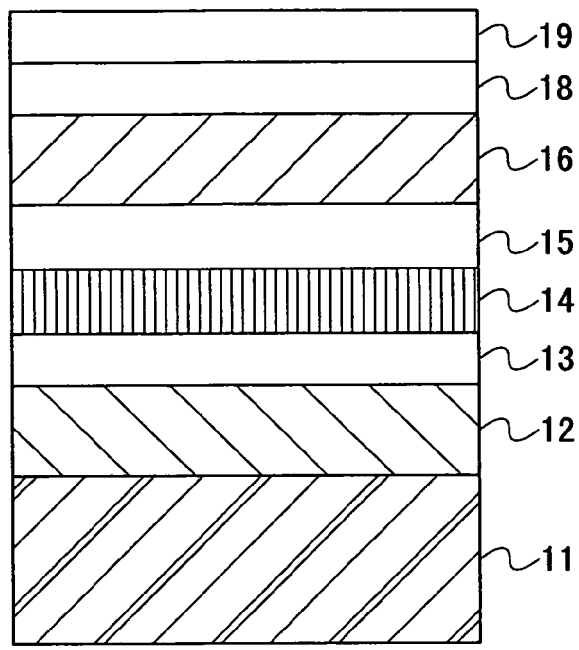
FIG. 1 is a schematic cross-sectional diagram of the perpendicular magnetic recording medium according to a first embodiment of the present invention.

FIG. 1 is a schematic cross-sectional diagram of the perpendicular magnetic recording medium according to the first embodiment of the present invention. Referring to FIG. 1, the perpendicular magnetic recording medium 10 of the present embodiment includes a substrate 11 and has a construction in which a soft-magnetic backing layer 12, a seed layer 13, a magnetic flux slit layer 14, a non-magnetic intermediate layer 15, a recording layer 16, a protective layer 18, and a lubricating layer 19 are stacked consecutively over the substrate 11.

The substrate 11 is formed for example of a glass ceramic substrate, a tampered glass substrate, a Si substrate, an aluminum alloy substrate, or the like, wherein it is also possible to use a film such as polyester (PET), polyethylene terephthalate (PEN), heat resistant polyimide (PI), or the like, in the case the perpendicular magnetic recording medium 10 is a tape.

The soft-magnetic backing layer 12 has a thickness of 50 nm-2 μm, for example, and is formed of an amorphous or microcrystalline alloy containing at least one element selected from Fe, Co, Ni, Al, Si, Ta, Ti, Zr, Hf, V, Nb, C, and B, or a stacked film of these alloys. From the viewpoint of concentrating the recording magnetic field, it is preferable to use a soft-magnetic material having a saturated magnetic flux density Bs of 1.0 T or less. For example it is possible to use FeSi, FeAlSi, FeTaC, CoNbZr, CoCrNb, NiFeNb. The soft-magnetic backing layer 12 is formed of a plating process, a sputtering process, an evaporation deposition process, a CVD (chemical vapor deposition) process, or the like. It should be noted that the soft-magnetic backing layer 12 is provided for absorbing almost all the magnetic flux from the recording head and it is preferable that the product of the saturation magnetic flux density Bs and the film thickness has a large value for conducting saturation recording. Further, it is preferable that the soft-magnetic backing layer 12 has large high frequency permeability from the viewpoint of writing at high transfer rate.

The seed layer 13 has a thickness of 1.0 nm-10 nm, for example, and is selected from Ta, C, Mo, Ti, W, Re, Os, Hf, and Mg, or an alloy of these. Thereby, the crystallinity of the magnetic flux slit layer 14 formed thereon is improved, and it becomes further possible to disconnect the relationship in the crystal orientation or crystal growth between the magnetic flux slit layer 14 and the soft-magnetic backing layer 12 and further disconnect magnetic interaction. This seed layer may be provided or may not be provided.

The magnetic flux slit layer 14 has a thickness of 0.5 nm-20 nm, for example, and is formed of a soft-magnetic material. Thereby, it should be noted that the magnetic flux slit layer 14 is formed of soft-magnetic particles of a soft-magnetic material and a low-density body formed of a soft-magnetic material at the interface between adjacent soft-magnetic particles. The soft-magnetic particles extend perpendicularly to a film surface and has a bottom part grown from the underlying seed layer, while the soft-magnetic particles form a generally columnar structure reaching the non-magnetic intermediate layer 15 at a surface thereof. Further, at the boundary part, the soft-magnetic material constituting the soft-magnetic particle incorporates therein an inert gas such as He, Ne, Ar, Kr, Xe, or the like, and thus takes an amorphous state. Thereby, it should be noted that such a boundary part loses soft magnetism or has reduced saturation magnetic flux density as compared with the soft-magnetic particles. It should be noted that the forgoing boundary part may contain oxygen or nitrogen in addition to the inert gas. Further, there may be formed a compound between the soft-magnetic material and oxygen or nitrogen.

Preferably, the soft-magnetic particles have the average particle diameter (diameter of a circle corresponding to the cross-sectional area of the soft-magnetic particle in the cross-section taken in a film surface direction) of 3 nm-10 nm, and it is preferable to set the average separation between adjacent soft-magnetic particles to 0.5 nm-3 nm.

The soft-magnetic material used for the magnetic flux slit layer 14 contains at least one of Co, Fe, Ni, a Co alloy, a Fe alloy and a Ni alloy as the major component. Thereby, the soft-magnetic material may contain any element selected from the group consisting of Al, Ta, Ag, Cu, Pb, Si, B, Zr, Cr, Ru, Re, Nb and C, as an additional component. For example, the soft-magnetic material is preferably formed of a film of any of CoNbZr, CoZrTa, FeC, FeC, NiFe, FeTaC, FeCoAl, and an artificial lattice of FeC film/C film.

In the case the non-magnetic intermediate layer 15 has an hcp structure, it is preferable that the magnetic flux slit layer 14 has an hcp structure or fcc structure and that the (001) surface of the hcp structure or the (111) surface of the fcc structure forms an interface to the non-magnetic intermediate layer 15. Thereby, it becomes possible to cause epitaxial growth in the magnetic flux slit layer 14 and improvement of crystallinity is achieved.

Further, because adjacent soft-magnetic particles are separated from each other by the boundary part in the magnetic flux slit layer 14, the crystal particles formed in the non-magnetic intermediate layer 15 are similarly separated from each other. As a result, the magnetic particles of the recording layer 16 grown over the non-magnetic intermediate layer 15 are grown with mutual separation, and physical separation is facilitated between the magnetic particles. Thereby, it becomes possible to reduce the magnetic interaction between adjacent magnetic particles.

It is preferable that the magnetic flux slit layer 14 has a magnetic anisotropy such that in-plane magnetic anisotropy is larger than perpendicular magnetic anisotropy. In the case there is a large perpendicular magnetic anisotropy, there is caused increase of noise as a result of fluctuation of magnetization component perpendicular to the film surface at the time of reproduction.

The magnetic flux slit layer 14 is formed by a vacuum process such as sputtering or vacuum evaporation deposition. More specifically, the magnetic flux slit layer 14 is formed to a predetermined film thickness by a sputtering process or DC magnetron sputtering process while using the ambient of a single inert gas such as He, Ne, Ar, Kr, Xe, or the like, or a mixture thereof. Further, it is preferable to set the degree of vacuum at the time of film formation of 1 Pa-8 Pa. At the pressure lower than 1 Pa, it is difficult to form the structure formed of the soft-magnetic particles and the boundary part, while when the pressure exceeds 8 Pa, the volumetric proportion of the soft-magnetic particles becomes to small and it is not possible to pass the magnetic fluxes sufficiently. For more complete magnetic separation for adjacent soft-magnetic particles, it is preferable to use the pressure of 2 Pa or more. Further, from the viewpoint of epitaxial growth of the recording layer 16, it is preferable to use the pressure of 6 Pa or less. Further, it is preferable to conduct the film growth at the substrate temperature of 0° C.-150° C. (particularly 15° C.-80° C.). In order to facilitate formation of the boundary part, it is also possible to add a nitrogen gas or an oxygen gas to the ambient gas within the degree that no degradation is caused in the magnetic properties of the soft-magnetic particles.

The non-magnetic intermediate layer 15 has a thickness of 2 nm-30 nm, for example, and is formed of a non-magnetic material of Co, Cr, Ru, Re, Ri, Hf, or an alloy thereof. Preferably, the non-magnetic intermediate layer 15 has a hcp structure and may be formed of any of a Ru film, a RuCo film, a CoCr film, or the like. In the case the recording layer 16 has a hcp structure, it is possible cause epitaxial growth. In this case, it is possible to improve the crystallinity of the recording layer 16.

It should be noted that the recording layer 16 is a so-called perpendicular magnetization film having an easy axis of magnetization in the film thickness direction having a thickness of 3 nm-30 nm and is formed of a material selected from any of Ni, Fe, Co, a Ni alloy, a Fe alloy, CoCrTa, CoCrPt, a Co alloy containing CoCrPt-M. Here, it should be noted that M is selected from any of B, Mo, Nb, Ta, W, Cu or an alloy of these. It should be noted that such a ferromagnetic alloy has a columnar structure and shows a (001) surface in the film thickness direction, and hence in the growth direction, in the case the alloy has an hcp structure. With this case, the film has an easy axis of magnetization in the film thickness direction. For the recording layer 16, it is possible to use CoCrPtB, CoCrPtTa, CoCrPtTaNb, or the like.

Further, the recording layer 16 includes a non-magnetic material of a compound of an element selected from any of Si, Al, Ta, Zr, Y, and Mg and an element selected from any of O, C and N, and may be formed of crystal particles of columnar structure of the foregoing ferromagnetic alloy and a non-magnetic phase physically separating adjacent crystal particles. For the recording layer 16, it is possible to use (CoPt)—($SiO_2$), (CoCrPt)—($SiO_2$), (CoCrPtB)—(MgO), or the like. Because the magnetic particles form a columnar structure and the non-magnetic phase is formed so as to surround the magnetic particles, the magnetic particles are separated from each other and it becomes possible to suppress or disconnect the interaction between the magnetic particles. With this, it becomes possible to reduce the medium noise.

Further, it should be noted that the recording layer 16 may be formed of an artificial lattice film such as Co/Pd, CoB/Pd, Co/Pt, CoB/Pt, or the like. Thereby, the artificial lattice film may be formed by stacking CoB (thickness: 0.3 nm)/Pd (thickness 0.8 nm) alternately by 5 layers to 30 layers for each. It should be noted that such an artificial lattice film has large perpendicular magnetic anisotropy and is characterized by excellent thermal stability.

The protective film 18 is formed by sputtering method, CVD method, FCA (Filtered Cathodic Arc) method, or the like, and is formed of an amorphous carbon, hydrogenated carbon, carbon nitride, aluminum oxide, or the like, having a thickness of 0.5 nm-15 nm.

The lubricating layer 19 may be applied by a pull up process or spin coating process and is formed of a lubricating agent having a perfluoropolyether principal chain of the thickness of 0.5 nm-5 nm. For the lubricating agent, it is possible to use ZDol, Z25 (provided by Montefluos) or Z-tetraol, AM3001 (provided by Ausimont), for example.

In the conventional perpendicular magnetic recording media where no magnetic flux slit layer is provided, the magnetic flux from the magnetic head spreads toward the soft-magnetic backing layer at the time of the recording, while with the perpendicular magnetic recording medium of the present embodiment, the magnetic flux slit layer 15 is formed of the generally columnar soft-magnetic particles and the non-magnetic boundary part, and the magnetic flux passes selectively through the soft-magnetic particles of high permeability, and spreading of the magnetic flux is suppressed by constricting the magnetic flux selectively to the part where the soft-magnetic particle is provided. As a result, it becomes possible to concentrate the magnetic flux to the recording layer 16, and the recording magnetic field is increased. Further, a steep spatial distribution is realized fro the recording magnetic field. Thereby, it becomes possible to achieve high density recording.

Further, according to the perpendicular magnetic recording medium of the present embodiment, in which the soft-magnetic particles of the magnetic flux seed layer are physically separated, physical separation is facilitated for the magnetic particles of the recording layer 16 formed via the non-magnetic intermediate layer 15. As a result, magnetic interaction between adjacent magnetic particles is reduced and it becomes possible to reduce the medium noise.

Figure 2:
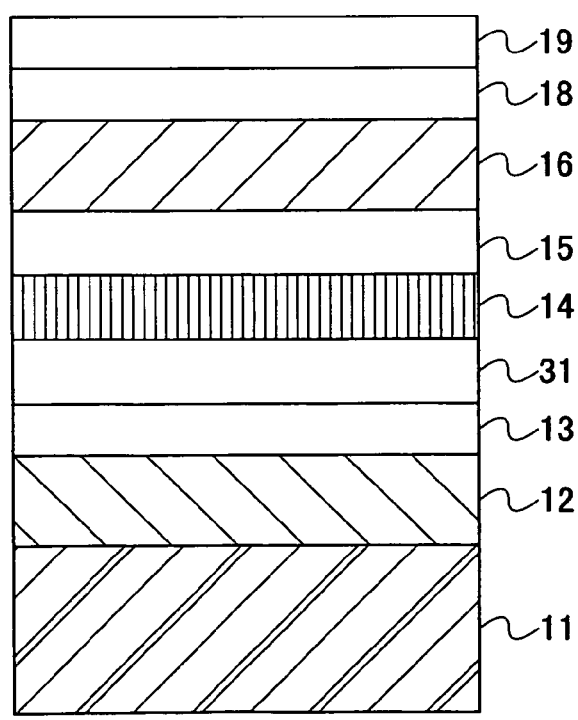
FIG. 2 is a schematic cross-sectional diagram of the perpendicular magnetic recording medium according to a modification of the first embodiment of the present invention.

FIG. 2 is a schematic cross-sectional diagram of the perpendicular magnetic recording medium according to a first modification of the first embodiment, wherein those parts of the drawing corresponding to the parts described previously are designated by the same reference numerals and the description thereof will be omitted.

Referring to FIG. 2, the perpendicular magnetic recording medium 30 includes a substrate 11 and has a construction to stack consecutively on the substrate 11, a soft-magnetic backing layer 12, a seed layer 13, an under layer 31, a magnetic flux slit layer 14, a non-magnetic intermediate layer 15, a recording layer 16, a protective layer 18 and a lubricating layer 19. Thus, the perpendicular magnetic recording medium 30 of the present modification is characterized by the under layer 31 provided between the seed layer 13 and the magnetic flux slit layer 14.

It should be noted that the under layer 31 has a thickness of 0.5 nm-20 nm, for example, and is formed of a soft-magnetic material containing at least one selected from Co, Fe, Ni, a Co alloy, a Fe alloy and a Ni alloy as the major component. Further, it is also possible that the under layer contain any one selected from the group consisting of Mo, Cr, Cu, V, Nb, Al, Si, B, C and Zr, as an additive component. Thereby, the under layer 31 functions as the nuclei for the growth of the magnetic flux slit layer 14, and thus, the crystallinity of the soft-magnetic particles is improved in the magnetic flux slit layer 14 or the isolation thereof is facilitated. Further, because of the soft-magnetism, it becomes possible to reduce the spacing between the recording head and the soft-magnetic backing layer. The under layer 31 is formed of a vacuum process such as sputtering process or vacuum deposition process and wherein it is preferable to use an ambient gas pressure lower than the ambient gas pressure used for forming the magnetic flux slit layer 14. With this, it becomes possible to form high quality growth nuclei or initial growth layer.

According to the present embodiment, the crystallinity of the soft-magnetic particles of the magnetic flux slit layer 14 is improved, and it becomes possible to increase the crystallinity of the magnetic particles of the recording layer 16, which is formed via the non-magnetic intermediate layer 15, further. As a result, the anisotropic magnetic field of the recording layer 16 is improved and it becomes possible to improve the coercive force.

Figure 3:
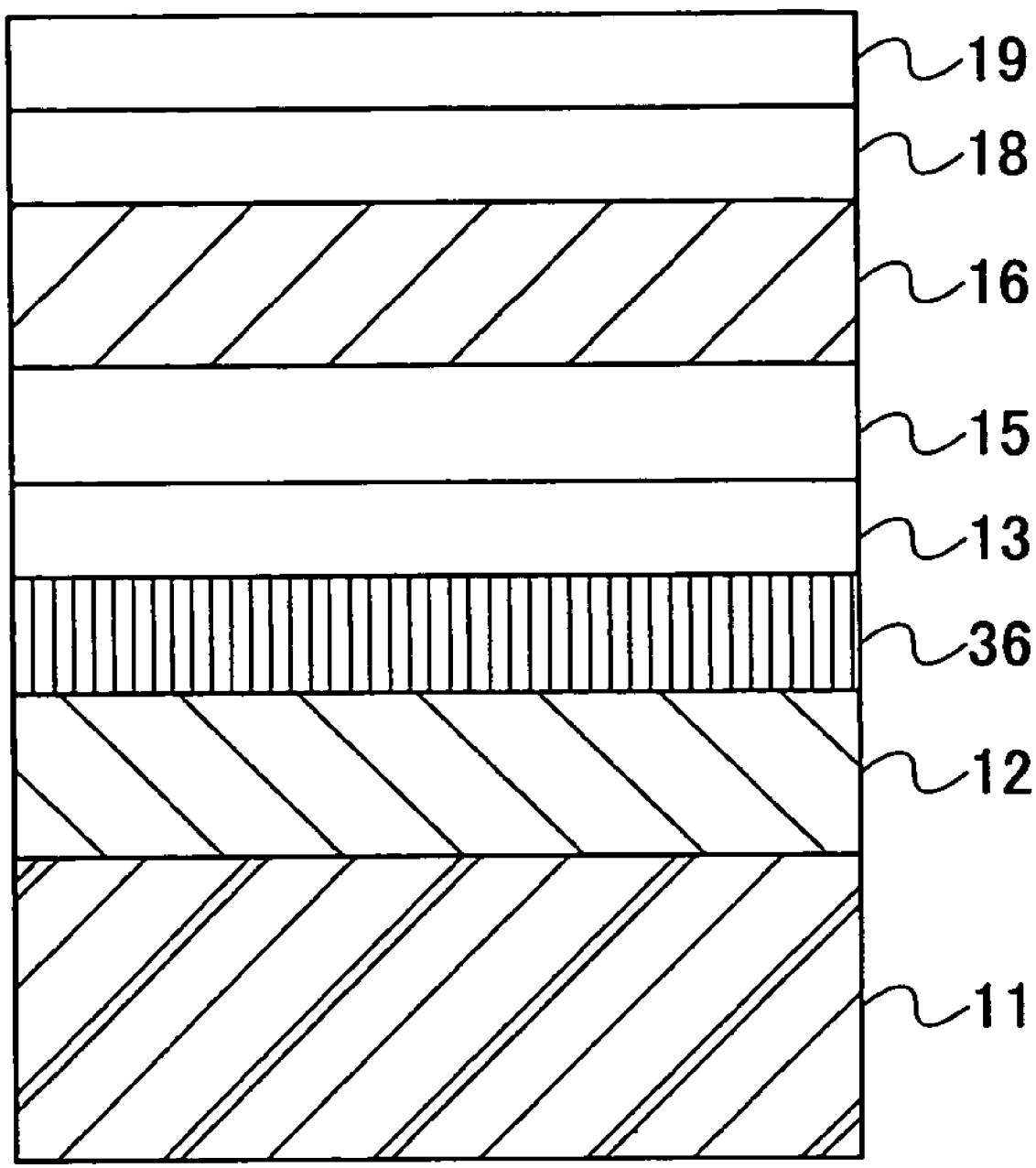
FIG. 3 is a schematic cross-sectional diagram of the perpendicular magnetic recording medium according to a second modification of the first embodiment of the present invention.

FIG. 3 is a schematic cross-sectional diagram of the perpendicular magnetic recording medium according to a second modification of the first embodiment, wherein those parts in the drawings corresponding to the parts explained previously are designated by the same reference numerals and the description thereof will be omitted.

Referring to FIG. 3, the perpendicular magnetic recording medium 35 includes a substrate 11 and has a stacked construction formed on the substrate 11 such that a soft-magnetic backing layer 12, a magnetic flux slit layer 36, a seed layer 13, a non-magnetic intermediate layer 15, a recording layer 16, a protective layer 18, and a lubricating layer 19 are stacked consecutively. Thereby, the perpendicular magnetic recording medium 35 of the present embodiment has the feature in that the magnetic flux slit layer 36 is provided over the magnetic backing layer 12 in contact therewith.

It should be noted that the magnetic flux slit layer 36 is generally identical with the magnetic flux slit layer 14 of FIG. 1 explained before, wherein it is preferable that the magnetic flux slit layer 36 has a thickness set within the range of 0.3 nm-10 nm, and that it is preferable that the magnetic flux slit layer 36 has in-plane anisotropy comparable with or exceeding the in-plane anisotropy of the soft-magnetic backing layer 12. By reducing the thickness of the magnetic flux slit layer 36, it becomes possible to increase the in-plane anisotropy and suppress the noise such as spike noise caused by the soft-magnetic backing layer 12. Further, because the magnetic flux slit layer 36 is formed adjacent to the soft-magnetic backing layer 12, it becomes possible to effectively suppress the spreading of the magnetic flux at the surface of the soft-magnetic backing layer 12, and the effect of magnetic flux constriction at the recording layer 16 can be increased further.

Further, in view of the fact that the magnetic flux slit layer 36 has a larger in-plane magnetic anisotropy as compared with the perpendicular anisotropy, it becomes possible to reduce the spike noise caused by the fluctuation of the magnetization in the soft-magnetic backing layer 12 in the perpendicular direction at the time of reproducing.

With the perpendicular magnetic recording medium of the present embodiment, it becomes further possible to increase, in addition to the effect of the perpendicular magnetic recording medium according to the first embodiment, the effect of magnetic flux constriction at the time of the recording, and it becomes possible to reduce the noise caused by the soft-magnetic backing layer.

Further, it is possible to combine the first modification and second modification in the perpendicular magnetic recording medium of the first embodiment.

Hereinafter examples of the present embodiment will be shown together with comparative examples not relying upon the present invention.

EXAMPLE 1

The perpendicular magnetic recording medium of the present example has the following construction. Thus, starting from the side of the substrate, there is formed a structure of glass substrate/soft-magnetic backing layer: CoNbZr film (180 nm)/seed layer: Ta film (5 nm)/magnetic flux slit layer: NiFe film (5 nm)/non-magnetic intermediate layer: Ru film (X nm)/recording layer: ($Co_{76}Cr_9Pt_{15}$) 90 vol %-($SiO_2$) 10 vol % film (10 nm)/protective film: carbon film (4 nm)/lubricating film: AM3001 film (1.5 nm). The films except for the lubricating layer were formed by using a sputtering apparatus of Ar gas ambient, wherein the CoNbZr film and the Ta film were formed by setting the ambient gas pressure to 0.5 Pa, while the NiFe film and the Ru film were formed by setting the ambient gas pressure to 4.0 Pa. It should be noted that the numbers in the brackets represent the film thickness, wherein samples were prepared by changing the film thickness X of the Ru film such that X=7, 10, 15 and 20 nm.

EXAMPLE 2

Example 2 is similar to Example 1 except that the under layer: NiFe film (5 nm) is formed between the first seed layer: Ta film (5 nm) and the magnetic flux slit layer: NiFe film (5 nm), by setting the ambient gas pressure to 0.5 Pa.

COMPARATIVE EXAMPLE 1

Comparative Example 1 is similar to that of Example 1 except that the magnetic flux slit layer: NiFe film (5 nm) of Example 1 is formed by setting the ambient gas pressure to 0.5 Pa.

FIG. 4 is a diagram showing the characteristics of the perpendicular magnetic recording media according to Examples 1, 2 and Comparative Example 1, wherein α in the drawing represents the gradient $4\pi \times \Delta M/H$ of the magnetization curve observed by applying a magnetic field to the recording layer in the perpendicular direction for the part near the coercive force. The closer α is to one, the more the magnetic particles have been isolated magnetically.

Referring to FIG. 4, it can be seen that Comparative Example provides the value of 4.1-4.9 for α, while α takes the value of 1.7-3.1 in Examples 1 and 2. From this, it can be seen that the degree of isolation of the magnetic particles is larger in the case of Examples 1 and 2.

With regard to the normalized coercive force, it can be seen that Comparative Example 1 provides the value of 0.23-0.31, while Examples 1 and 2 provide much larger values of 0.33-0.45. Because large normalized coercive force indicates small magnetic interaction between the magnetic particles, it can be seen that the magnetic interaction is smaller with Examples 1 and 2 as compared with Comparative Example 1. As a result, the medium noise is reduced significantly with Examples 1 and 2 as compared with Example 1 and S/Nm is improved. While not illustrated, it was confirmed by TEM observation made to the cross-section of the perpendicular magnetic recording medium of Example 2 that there are formed generally columnar crystal grains in the Ru film over the NiFe film forming the magnetic flux slit layer and that individual magnetic particles are isolated in the recording layer.

Comparing Example 1 and Example 2, it can be seen that S/Nm has a larger value with Example 2 as compared with Example 1. With Example 2, in which there is formed an NiFe film (film thickness 5 nm) formed by setting the ambient gas pressure to 0.5 Pa, contrary to Example 1, the crystallinity of the NiFe film formed thereon as the magnetic flux slit layer (ambient gas pressure: 4.0 Pa, film thickness 5 nm) is improved, and the crystallinity of the magnetic particles of the recording layer is improved because of the improved crystallinity of the NiFe film.

Here, it should be noted that the coercive force Hc and the anisotropic magnetic field Hk were measured by using VSM. Further, the medium noise and S/Nm were measured by using a composite magnetic head (recording head: monopole head, write core width 0.5 μm; reproducing head (GMR device): read core width 0.25 μm) of the floating amount of 17 nm under the condition of the recording density of 400 kFCI.

EXAMPLE 3

A perpendicular magnetic recording medium of the following construction was manufactured as the perpendicular magnetic recording medium of the present embodiment. Thus, starting from the side of the substrate, the construction includes glass substrate/soft-magnetic backing layer: CoNbZr film (190 nm)/magnetic flux slit layer: CoNbZr film (10 nm)/seed layer: Ta film (2 nm)/non-magnetic intermediate layer: Ru film (15 nm)/recording layer: $(Co_{71}Cr_9Pt_{20})$ 90 vol %-$(SiO_2)$ 10 vol % film (10 nm)/protective film: carbon (4 nm)/lubricating film: AM3001 film (1.5 nm). The films except for the lubricating layer were formed by using a sputtering apparatus of Ar gas ambient, wherein the CoNbZr film for the soft-magnetic backing layer and the Ta film were formed by setting the ambient gas pressure to 0.5 Pa, while the CoNbZr film for the magnetic flux slit layer and the Ru film were formed by setting the ambient gas pressure to 4.0 Pa.

COMPARATIVE EXAMPLE 1

Comparative Example 1 is similar to that of Example 1 except that the CoNbZr film forming the magnetic flux slit layer of Example 3 is formed by setting the ambient gas pressure to 0.5 Pa.

Figure 5:
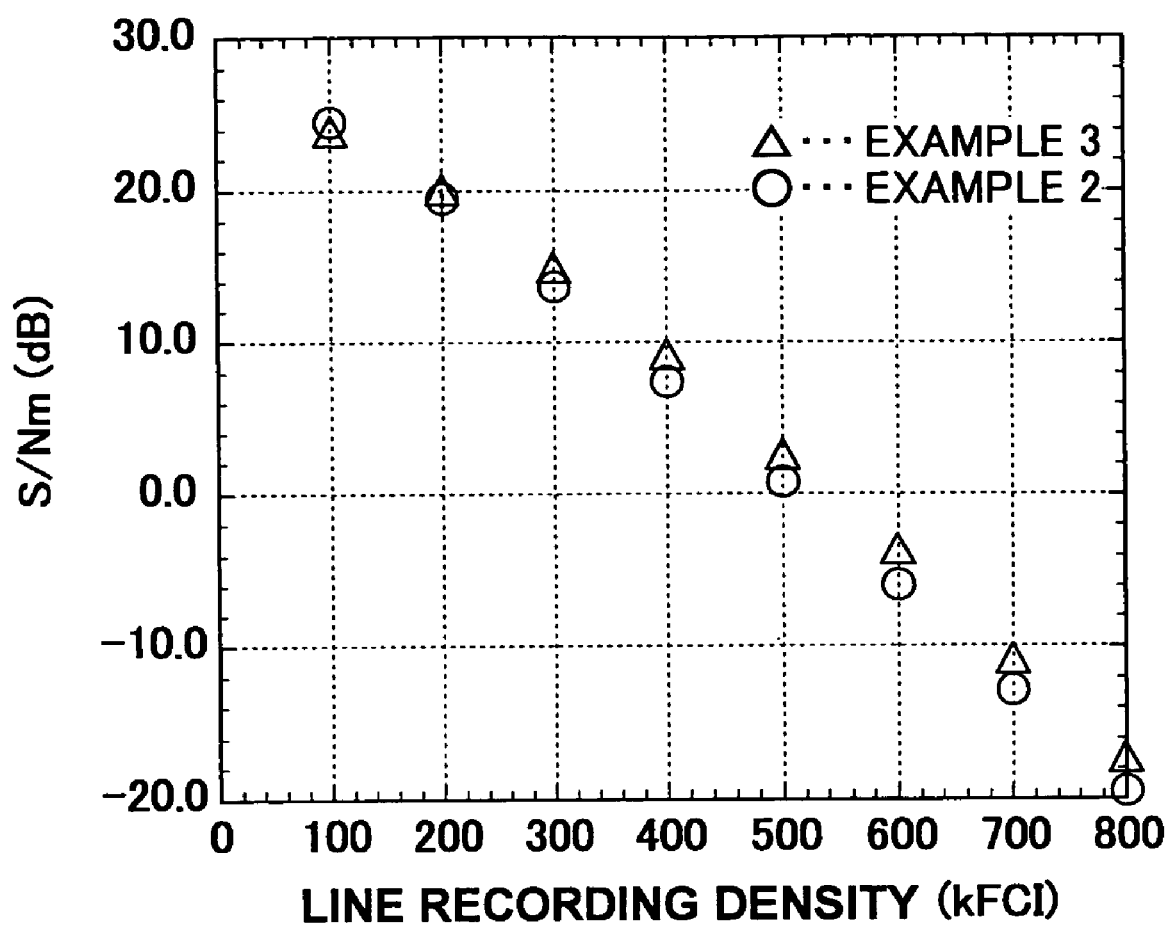
FIG. 5 is a diagram showing an S/Nm characteristic of the perpendicular magnetic recording media according to Example 3 and Comparative Example 2.

FIG. 5 is a diagram showing the S/Nm characteristics of the perpendicular magnetic recording medium according to Example 3 and Comparative Example 2. Referring to FIG. 5, it can be seen that S/Nm takes a larger value with Example 3 as compared with Comparative Example 2 at the recording density of 200 kFCI or more. For example, it can be seen that S/Nm is increased by 1.7 dB with Example 3 as compared with Comparative Example 2 at 400 kFCI. As a result of formation of the CoNbZr film of the magnetic flux slit layer under the ambient gas pressure of 4.0 Pa, magnetic isolation is facilitated as compared with the CoNbZr film of Comparative Example 2 formed at 0.5 Pa, and thus, the spreading of the magnetic flux from the magnetic head is suppressed, leading to reduction of the medium noise. It should be noted that the S/Nm characteristic was measured similarly to the condition explained above.

Second Embodiment

Next, a perpendicular magnetic recording medium of the second embodiment of the present invention will be explained, wherein it should be noted that, in the second embodiment, the non-magnetic particles and the magnetic particles are separated in the non-magnetic intermediate layer and the recording layer in the state surrounded by a non-soluble phase.

Figure 6:
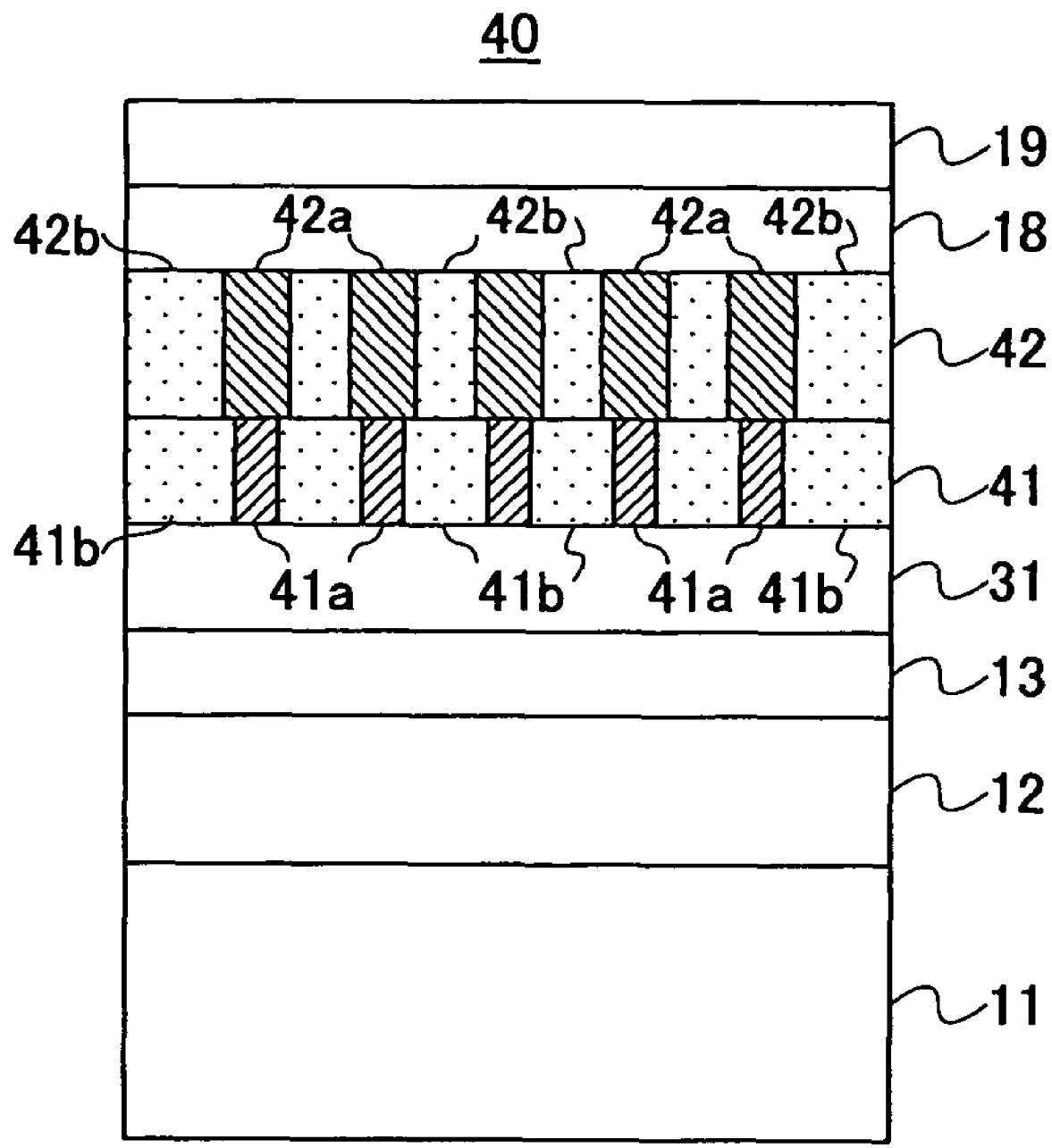
FIG. 6 is a schematic cross-sectional diagram of the perpendicular magnetic recording medium according to a second embodiment of the present invention.

FIG. 6 is a schematic cross-sectional diagram of the perpendicular magnetic recording medium according to the second embodiment of the present invention, wherein those parts corresponding to the parts explained previously are designated by the same reference numerals and the description thereof will be omitted.

Referring to FIG. 6, the perpendicular magnetic recording medium 40 of the present embodiment includes a substrate 11 and has a construction in which a soft-magnetic backing layer 12, a seed layer 13, an under layer 31, a non-magnetic intermediate layer 41, a recording layer 46, a protective layer 18, and a lubricating layer 19 are stacked consecutively over the substrate 11.

The recording layer 42 has a thickness of 6 nm-20 nm, for example, and is formed of magnetic particles 42a having a columnar structure and a second non-soluble phase 42b of a non-magnetic material surrounding the magnetic particles 42a and separating adjacent magnetic particles 42a physically form each other. Thereby, it should be noted that the columnar structure of the magnetic particles 42a extends in the thickness direction, and the second non-soluble phase 42b is formed so as to fill the gap between the magnetic particles 42a disposed in large number in the in-plane direction.

It should be noted that the magnetic particles 42a is formed of a material selected from the group consisting of Ni, Ge, Co, a Ni alloy, a Fe alloy, CoCrTa, CoCrPt, and a Co alloy containing CoCrPt-M, wherein M is selected from B, Mo, Nb, Ta, W, Cu, and an alloy thereof. The magnetic particles 42a have an easy axis of magnetization in the thickness direction and it is preferable to have the (100) surface in the thickness direction, and hence growth direction, in the case the ferromagnetic alloy constituting the magnetic particles 42a has a hcp structure.

In the case the magnetic particles 42a are formed of a CoCrPt alloy, the Co content is set to 5 atomic %-80 atomic %, the Cr content is set to 5 atomic % to 20 atomic %, and the Pt content is set to 15 atomic % to 30 atomic %. By increasing the Pt content as compared with a conventional magnetic recording medium, the perpendicular anisotropic magnetic field is increased and it becomes possible to increase the coercive force. It has been thought that such high Pt content causes difficulty in the epitaxial growth over a Cr underground layer, while it became possible with the present invention to form the magnetic particles 42a of excellent crystallinity by using the material of the non-magnetic particles 42a of the present embodiment.

It should be noted that the second non-soluble phase 42b is formed of a non-magnetic material not forming a solid solution or compound with the ferromagnetic alloy constituting the magnetic particles 42a, wherein the non-magnetic material comprises an element selected from Si, Al, Ta, Zr, Y, Ti and Mg, and at least one element selected from O, N and C. For example, oxide such as $SiO_2$, $Al_2O_3$, $Ta_2O_5$, $ZrO_2$, $Y_2O_3$, $TiO_2$, and MgO, or nitride such as $Si_3N_4$, AlN, TaN, ZrN, TiN, $Mg_3N_2$, or carbide such as SiC, TaC, ZrC, and TiC, can be used. Because a magnetic particle 42a is physically separated from adjacent magnetic particles 42a by the second non-soluble phase 42b of non-magnetic material, magnetic interaction is reduced, and as a result, it becomes possible to reduce the medium noise.

It should be noted that the non-magnetic material constituting the second non-soluble phase 42b is an insulating material. With this, it becomes possible to reduce the interaction between the magnetic particles 42a by way of tunneling effect of the electrons that causes the ferromagnetism.

Preferably, the volumetric concentration of the second non-soluble phase 42b is set to 2 vol %-40 vol % with reference to the volume of the recording layer 42. When the volumetric concentration has become smaller than 2 vol %, sufficient separation is not attained between the magnetic particles 42a and isolation of the magnetic particles 42a becomes insufficient. When the volumetric concentration exceeds 40%, on the other hand, saturation magnetization of the recording layer 42 is lowered excessively and the output at the time of reproducing is deteriorated. It is particularly preferable to set the volumetric concentration of the second non-soluble phase 42b t the range of 8 vol %-30 vol % from the viewpoint of isolation of the magnetic particles 42a and from the viewpoint of perpendicular orientation dispersion.

The non-magnetic intermediate layer 41 has a thickness of 3 nm-40 nm, for example, and is formed of non-magnetic crystalline particles 41a of a non-magnetic material and a first non-soluble phase 41b surrounding the non-magnetic particles 41a and is formed of the material not soluble to the non-magnetic particles 41a.

The non-soluble particles 41a is formed of at least one non-magnetic material having a hcp structure or fcc structure and selected from Co, Cr, Ru, Re, Ti, Hf, or an alloy thereof. For example, Ru or CoCrRu may be used. In the case the non-magnetic particles 41a has the hcp structure, it is preferable that the (001) surface thereof is generally parallel to the in-plane direction, while in the case the non-magnetic particles have the fcc structure, it is preferable that the (111) surface thereof is generally parallel to the in-plane direction. Thereby, it becomes possible to cause epitaxial growth of the magnetic particle 42a on the non-magnetic particle 41a at the interface between the non-magnetic intermediate layer 41 and the recording layer 42, and the grain diameter of the magnetic particles 42 and the gap between adjacent magnetic particles 42a can be controlled simultaneously by controlling the grain size of the non-magnetic particles 41a and the gap between adjacent non-magnetic particles 41a.

The first non-soluble phase 41b is formed of a material similar to the material forming the second non-soluble phase 42b described before. Thereby, it is preferable to set the volumetric concentration of the first non-soluble phase 41b to the range of 2 vol %-40 vol % with reference to the volume of the non-magnetic intermediate layer 41. Further, it is particularly preferable that the volumetric concentration of the first non-soluble phase 41b is equal to or larger than the volumetric concentration of the second non-soluble phase 42b, and it is most preferable that there holds the relationship that: [volumetric concentration of first non-soluble phase 41b]:[volumetric concentration of second non-soluble phase 41b]=1:1-1.5:1. Because there is a tendency that the grain diameter of a magnetic particles 42a is increased as a result of growth over a non-magnetic particle 41a, it becomes possible to achieve isolation of the magnetic particles 42a by setting the volumetric concentration of the first non-soluble phase 41b to be equal to or larger than the volumetric concentration of the second non-soluble phase 42b.

It is preferable to control the grain diameter of the non-magnetic particles 41b by the under layer 31 formed at an underside of the non-magnetic intermediate layer 41. The under layer 31 is formed of the material of the under layer 31 explained with reference to the first embodiment. The under layer 31 functions as the nuclei of growth of the non-magnetic particles 41, and it becomes possible to control the arrangement of the non-magnetic particles 41a and to improve the crystal orientation and crystallinity.

It is preferable that the material of the under layer 31 has a fcc structure having the (111) surface generally parallel to the substrate surface. Further, it is preferable that the proportion of lattice misfit to the non-magnetic particles 41a is 10% or less. Thus, in terms of crystallography, it is preferable that there holds the relationship of under layer 31: fcc structure (111) surface//non-magnetic intermediate layer 41: fcc structure (111) surface or Hcp structure (001), and that the proportion of lattice misfit is 10% or less.

Further, by forming the under layer 31 by a soft-magnetic material, the under layer 31 functions as a part of the soft-magnetic backing layer 12, and it becomes possible to reduce the spacing from the magnetic head to the surface of the soft-magnetic backing layer 12. With this, electromagnetic conversion characteristics are improved. The under layer 31 may be provided or may not be provided.

With the perpendicular magnetic recording medium 40 of the present embodiment, there is provided a seed layer underneath the under layer 31. The seed layer performs the function explained in the first embodiment. The under layer 31 may be provided or may not be provided.

Next, the method of forming the non-magnetic intermediate layer 41 and the recording layer 42 will be explained.

The non-magnetic intermediate layer 41 and the recording layer 42 are formed by a sputtering process by using a DC magnetron sputtering apparatus, an ECR sputtering apparatus, or the like. In the case an insulation material is contained, an RF magnetron sputtering apparatus, or the like, is used.

In the case of forming the non-magnetic intermediate layer 41, it is possible to conduct sputtering for a sputter target of the non-magnetic material forming the non-magnetic particles 41a and a sputter target of the material forming the first non-soluble phase 41b at the same time. Alternatively, it is possible to use a composite material of the non-magnetic material of the non-magnetic particles 41 and the material of the first non-soluble phase 41b. When forming the recording layer 42, it is possible to use different sputter targets respectively of the magnetic material of the magnetic particles 42a and the non-magnetic material of the second non-soluble phase 42b or a composite target, similarly to the case of the non-magnetic intermediate layer 41.

It is preferable to set the ambient gas pressure to the range of 2 Pa-8 Pa at the time of film formation. With this, isolation is facilitated for the non-magnetic particles 41a or the magnetic particles 42a. Further, it is preferable to use an Ar gas or an Ar gas added with an oxygen gas for the ambient gas.

According to the present embodiment, the non-magnetic intermediate 41 provided underneath the recording layer 42 is formed of the non-magnetic particles 41a and the first non-soluble phase 41b, and the non-magnetic particles 41a arranged with spontaneous mutual separation. Further, because crystal growth occurs for the magnetic particles 42a of the recording layer 42 from the surface of the non-magnetic particles 41a, it becomes possible to control the grain diameter of the magnetic particles 42a and the gap between adjacent magnetic particles 42a. Thereby, it becomes possible to facilitate miniaturization and isolation of the magnetic particles 42a at the same time.

EXAMPLE 4

The perpendicular magnetic recording medium of the present example has the following construction. Thus, starting from the side of the substrate, there is formed a structure of glass substrate/soft-magnetic backing layer: CoNbZr film (120 nm)/seed layer: Ta film (5 nm)/under layer: NiFe film (5 nm)/non-magnetic intermediate layer: Ru 86 vol %-($SiO_2$) 14 vol % film (20 nm)/recording layer: ($Co_{76}Cr_9Pt_{15}$) 76 vol %-($SiO_2$) 24 vol % film (10 nm)/protective film: carbon film (4 nm)/lubricating film: AM3001 film (1.5 nm). The perpendicular magnetic recording medium was formed by using a sputtering apparatus of Ar gas ambient, wherein the CoNbZr film, the Ta film, the NiFe film and the carbon film were formed by using a DC magnetron sputtering apparatus while setting the pressure of the Ar ambient gas to 0.5 Pa. Further, the non-magnetic intermediate layer and the recording layer were formed by an RF magnetron sputtering apparatus in an Ar gas ambient under the gas pressure of 4.0 Pa. The substrate temperature was set to room temperature at the time of deposition. The lubricating layer was applied by a dipping process. The numerals in the parentheses above represent the film thickness.

EXAMPLE 5

In place of the non-magnetic intermediate layer of Example 4, a Ru60 vol %-($SiO_2$) 35 vol % film (20 nm) was used in the present example. Otherwise, the present example is similar to Example 4.

COMPARATIVE EXAMPLE 3

In place of the non-magnetic intermediate layer of Example 4, a Ru film (20 nm) was used in Comparative Example 3. Otherwise, Comparative Example 3 is similar to Example 4.

Figure 7A:
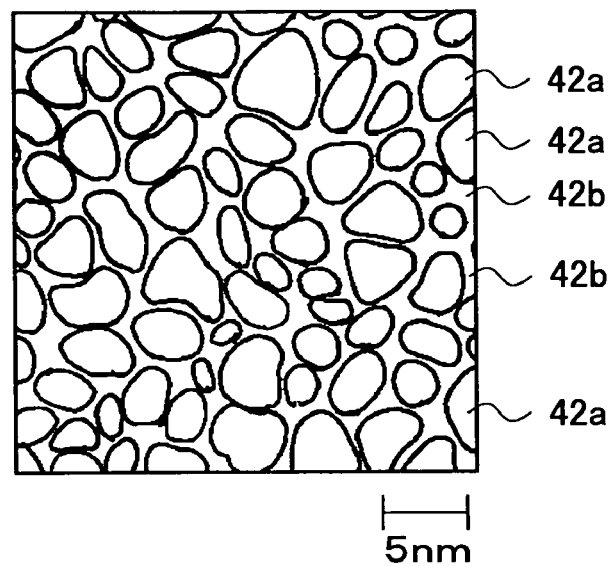
FIGS. 7A-7C are schematic diagrams of TEM photographs respectively showing a recording layer of the perpendicular recording medium according Examples 4, 5 and Comparative Example 3 in a plan view.
Figure 7B:
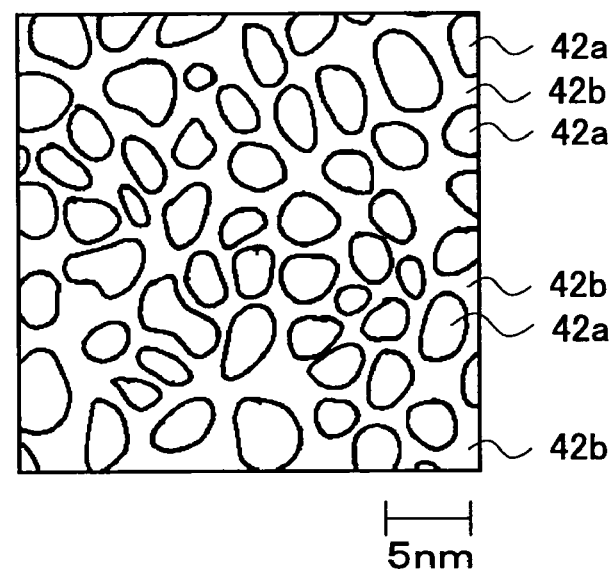
Figure 7C:
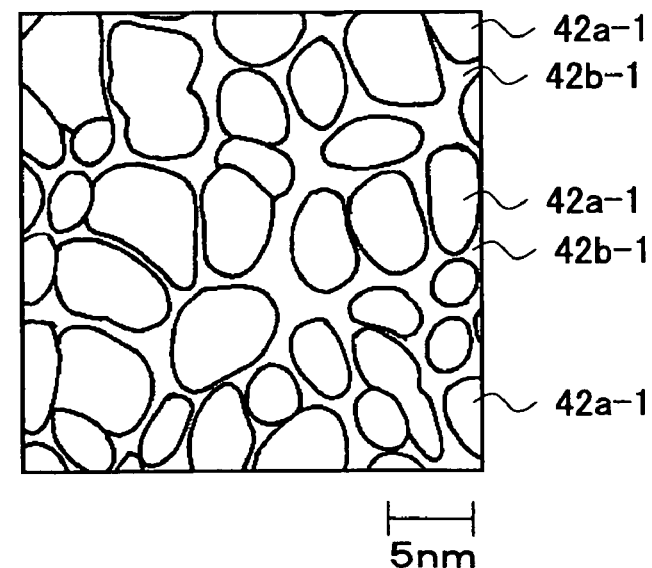

FIGS. 7A-7C show the sketch of TEM photographs respectively showing the recording layer of the perpendicular magnetic recording media according to Examples 4, 5 and Comparative Example 3 in a plan view.

Referring to FIGS. 7A-7C, it can be seen that isolation and miniaturization are promoted for the magnetic particles 42a in the recording layer of the perpendicular magnetic recording media of Example 4 and Example 5 as shown in FIGS. 7A and 7B, as compared with the perpendicular magnetic recording medium of Example 3 shown in FIG. 7C, in which the Ru film was used for the non-magnetic intermediate layer. The average grain diameters of the magnetic particles was 5.6 nm in Example 4 and 5.5 nm in Example 5, while in Comparative Example 3, the average grain diameter was 7.7 nm.

Particularly, in Example 5, it can be seen that the distance between adjacent magnetic particles 42a across the gap therebetween, and hence across the part of the second non-soluble phase 42b of $SiO_2$ is increased as compared with Example 4. Further, it can be seen with Example 5 that the second non-soluble phase 42b surrounds the non-magnetic particles 42a uniformly, contrary to the non-soluble phase 42b-1 shown in FIG. 7C. Thus, it will be understood that the gap between the magnetic particles in the recording layer can be increased by increasing the volumetric concentration of the first non-soluble phase in the non-magnetic intermediate layer from 14 vol % to 35 vol %, beyond the volumetric concentration of 24 vol % of the second non-soluble phase of the magnetic layer.

FIG. 8 is a diagram showing the characteristics of the perpendicular magnetic recording medium of Examples 4 and 5. Referring to FIG. 8, it can be seen that Example 5 realizes a closer to 1 as compared with Example 4. As explained before, α close to 1 represents that high degree of magnetic isolation is achieved for the magnetic particles, and thus, it can be seen that Example 5 realized further magnetic isolation as compared with Example 4. This result agrees with the physical isolation as observed by the plane view TEM photographs.

With regard to S/Nm, it can be seen that Example 5 provides the value of 18 dB, which is significantly improved over the value of 11 dB for Example 4. Thus, together with the result for α, it can be seen that there have been achieved reduction of medium noise and improvement of S/Nm as a result of promoted isolation of the magnetic particles.

Further, it can be seen that Example 5 provides a larger value for D50 over Example 4. This also indicates the possibility of further increase of recording density.

Thus, according to the present embodiment, it becomes possible to promote isolation and miniaturization of the magnetic particles by using a Ru—($SiO_2$) film for the non-magnetic intermediate layer as compared with the case of using an Ru film. The gap between the magnetic particles can be controlled by the volumetric concentration of the first non-soluble phase of the non-magnetic intermediate layer, and thus, it becomes possible to achieve magnetic isolation for the magnetic particles. Further, by increasing the volumetric concentration of the fist non-soluble phase of the non-magnetic intermediate layer to be higher than the volumetric concentration of the second non-soluble phase in the recording layer, isolation of the magnetic particles is promoted further, and it becomes possible to improve S/Nm and D50.

While not illustrated, it has been confirmed by way of cross-sectional TEM observation of the perpendicular magnetic recording medium of Examples 4 and 5 that the non-magnetic particles and the magnetic particles have a columnar structure extending in the film thickness direction in the non-magnetic intermediate layer 41 and the recording layer 42.

Here, it should be noted that the average diameter has been measured by extracting the contour of magnetic particles in the plan view TEM photograph (magnification of 200,000,000 times on the photograph) and obtaining the area of the magnetic particles after incorporating into a personal computer by a scanner. Thereby, the diameter of the circle having the area corresponding to the area is used as the grain diameter of the magnetic particle. With this procedure, 150 magnetic particles have been selected at random and the average grain diameter was obtained by obtaining the average of the grain diameters thereof.

Further, the perpendicular coercive force, saturation magnetization and α were measured under the condition of Examples 1 and 2 of the first embodiment. Further, S/Nm and D50 were measured by using a composite magnetic head of the floating distance of 17 nm (recording head: monopole head; write core width: 0.5 µm; reproducing head (GMR element): read core width 0.25 µm).

Third Embodiment

Next, a perpendicular magnetic recording medium according to a third embodiment of the present invention will be described, wherein the perpendicular magnetic recording medium of the third embodiment includes a soft-magnetic shielding layer over the rerecording layer.

Figure 9:
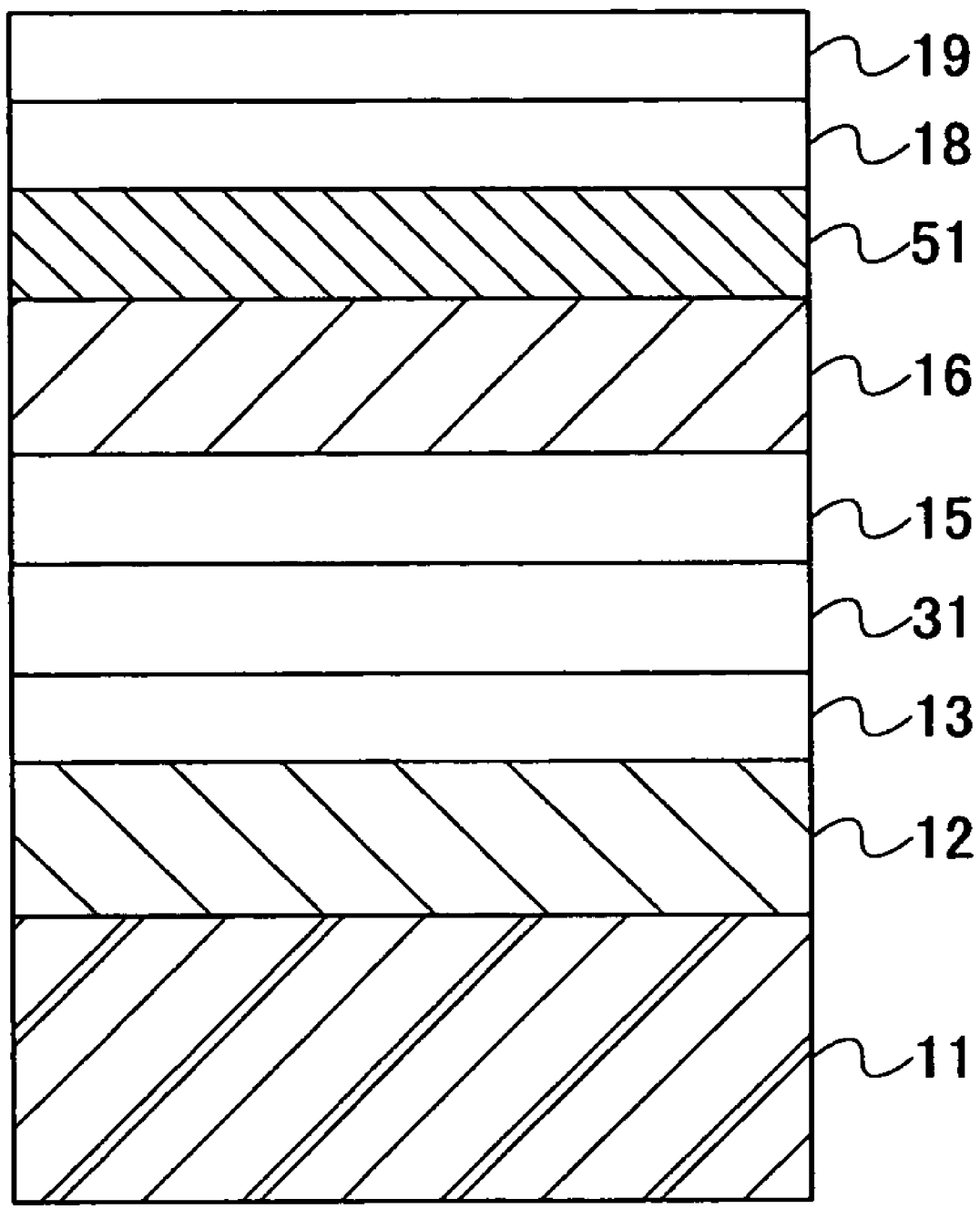
FIG. 9 is a schematic cross-sectional diagram of the perpendicular magnetic recording medium according to a third embodiment of the present invention.

FIG. 9 is a schematic cross-sectional diagram of the perpendicular magnetic recording medium according to the third embodiment of the present invention, wherein those parts corresponding to the parts explained previously are designated by the same reference numerals and the description thereof will be omitted.

Referring to FIG. 9, the perpendicular magnetic recording medium 50 of the present embodiment includes a substrate 11 and has a construction in which a soft-magnetic backing layer 12, a seed layer 13, an under layer 31, a non-magnetic intermediate layer 15, a recording layer 16, a soft-magnetic shielding layer 51, a protective layer 18, and a lubricating layer 19 are stacked consecutively over the substrate 11.

The soft-magnetic shielding layer 51 is formed over the recording layer 16 explained in the first or second embodiment and is formed of a soft-magnetic material of high permeability having the thickness of 2-50 nm. For the soft-magnetic material used for the soft-magnetic shielding layer 51, an amorphous or microcrystalline alloy containing at least one of the elements selected from Fe, Co, Ni, Al, Si, Ta, Ti, Zr, Hf, V, Nb, C and B or a stacked film of these alloys. For example, it is possible to use $Ni_{80}Fe_{20}$, $Ni_{50}Fe_{50}$, FeSi, FeAlSi, FeTaC, CoNbZr, CoCrNb, CoTaZr, NiFeNb, or the like.

Preferably, the easy axis of magnetization extends in the in-plane direction with the soft-magnetic shielding layer. Further, it is particularly preferable that the easy axis of magnetization extends in the direction perpendicular to the elongating direction of the track and hence perpendicular to the recording direction. With this, it becomes possible to minimize formation of magnetic domain wall, which becomes the source of noise, in the soft-magnetic shielding layer 15. In the case the perpendicular magnetic recording medium 50 is a magnetic disk, for example, the easy axis of magnetization is aligned in the radial direction, while in the case of a magnetic tape of lateral type, the easy axis of magnetization is aligned in the width direction of the magnetic tape.

Preferably, the soft-magnetic shielding layer 51 is a soft-magnetic material having the permeability in the range of 20-2000. With this, it becomes possible to improve the response to the high frequency recording magnetic field.

Further, it is preferable that the soft-magnetic shielding layer 51 has saturation magnetization in the range of 0.1 T-2.4 T. When the saturation magnetization exceeds 2.4 T, the possibility of selection of the magnetic material for the recording head is limited.

Further, it is preferable that the soft-magnetic shielding layer 51 is formed so as to satisfy the relationship of $Bs_S \times t_S < Bs_H \times t_H$, wherein $Bs_H$ represents the saturation magnetic flux density of the magnetic material constituting the primary magnetic pole of the recording head while $t_H$ represents the thickness of the primary magnetic pole at the tip end part thereof. With this, it becomes possible to ensure magnetic saturation of the soft-magnetic shielding layer 51 with the magnetic field from the primary magnetic pole.

With the perpendicular magnetic recording medium 50 according to the present invention, in which the soft-magnetic shielding layer 51 is provided over the recording layer 16, recording magnetic field smaller than a predetermined amount is absorbed by the soft-magnetic shielding layer 51 and cannot reach the recording layer. When the magnitude of the recording magnetic field has been increased beyond the magnetic field strength that causes magnetic saturation in the soft-magnetic shielding layer 51, the recording magnetic field cam passes through the soft-magnetic shielding layer 51 and recording is made in the recording layer.

Figure 10:
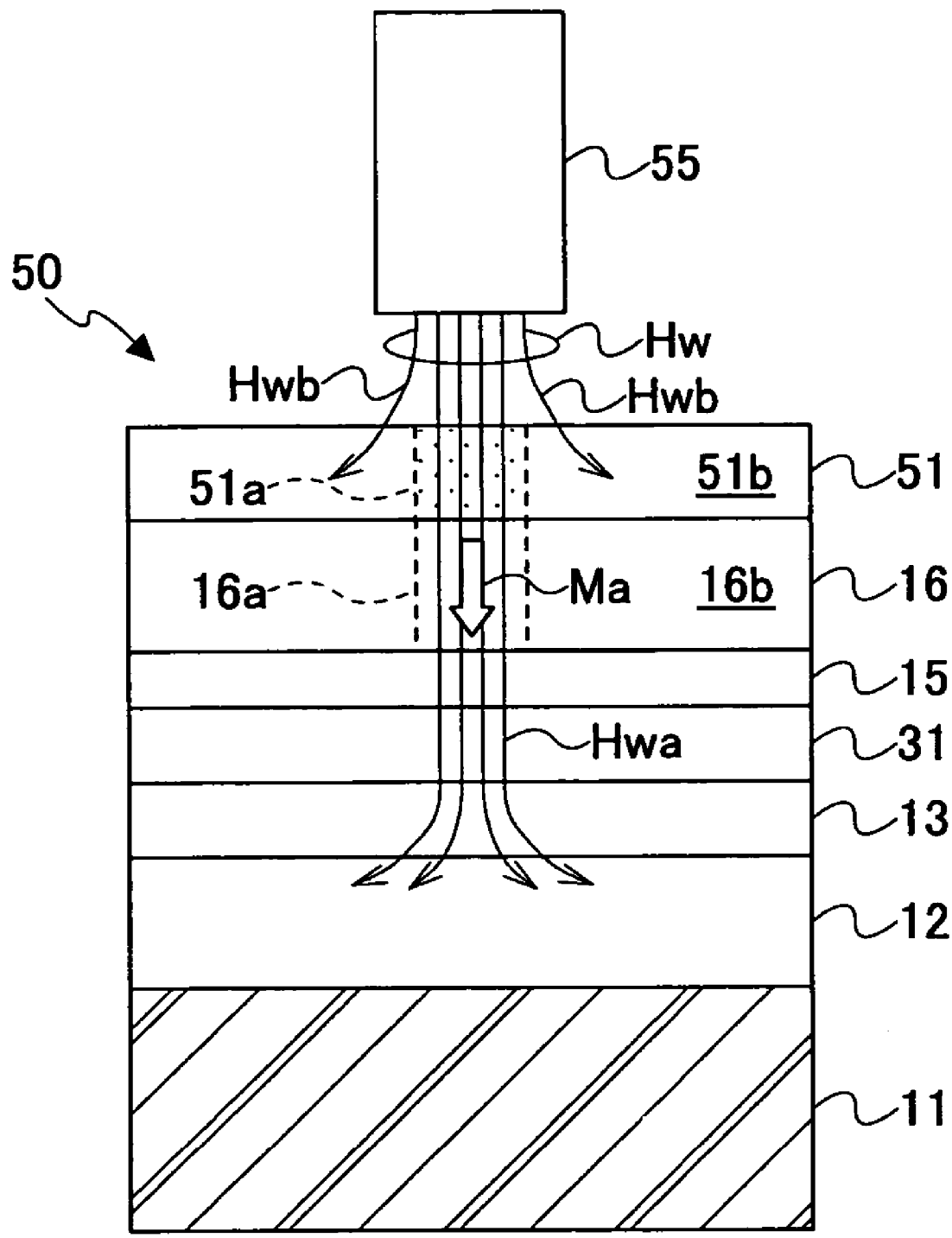
FIG. 10 is a diagram showing recording made on the perpendicular magnetic recording medium of the third embodiment.

FIG. 10 is a diagram showing the recording made upon the perpendicular magnetic recording medium of the present embodiment. For the sake of simplicity, illustration of the protective film 18 and the lubricating film 19 is omitted in FIGS. 10-12.

Referring to FIG. 10, a recording magnetic field Hw is applied to the perpendicular magnetic recording medium 50 at the time of recording from a tip end part of a primary magnetic pole 55 of a magnetic head that faces to the perpendicular magnetic recording medium 50 of a magnetic recording apparatus. When a recording magnetic field is applied with the magnitude smaller than the magnetic field that causes magnetic saturation in the soft-magnetic shielding layer 51, the magnetic flux from the recording head is absorbed by the soft-magnetic shielding layer 51 and the magnetic flux does not reach the recording layer 16. When the recording magnetic field is increased further, a region 51a of the soft-magnetic shielding layer 51 facing the central part of the tip end part of the primary magnetic flux undergoes magnetic saturation. Thus, when magnetic saturation is caused, the recording magnetic field passes through the soft-magnetic shielding layer 51 and reaches the magnetic layer 16 and further the soft-magnetic backing layer 12. With this, recording magnetic field is applied to the recording layer 16a and magnetization Ma is caused. Here, it should be noted that the magnetic field Hwb leaking from the tip end part of the principal magnetic pole 55 at a peripheral part thereof has a relatively weak strength and is absorbed by the soft-magnetic shielding layer 51. Thus, only the magnetic field Hwa leaked from the central part causes magnetic saturation, and because of this, the region 16a where the soft-magnetic shielding layer 51 undergoes saturation has a reduced size as compared with the size of the tip end part of the primary magnetic pole 55.

Figure 11:
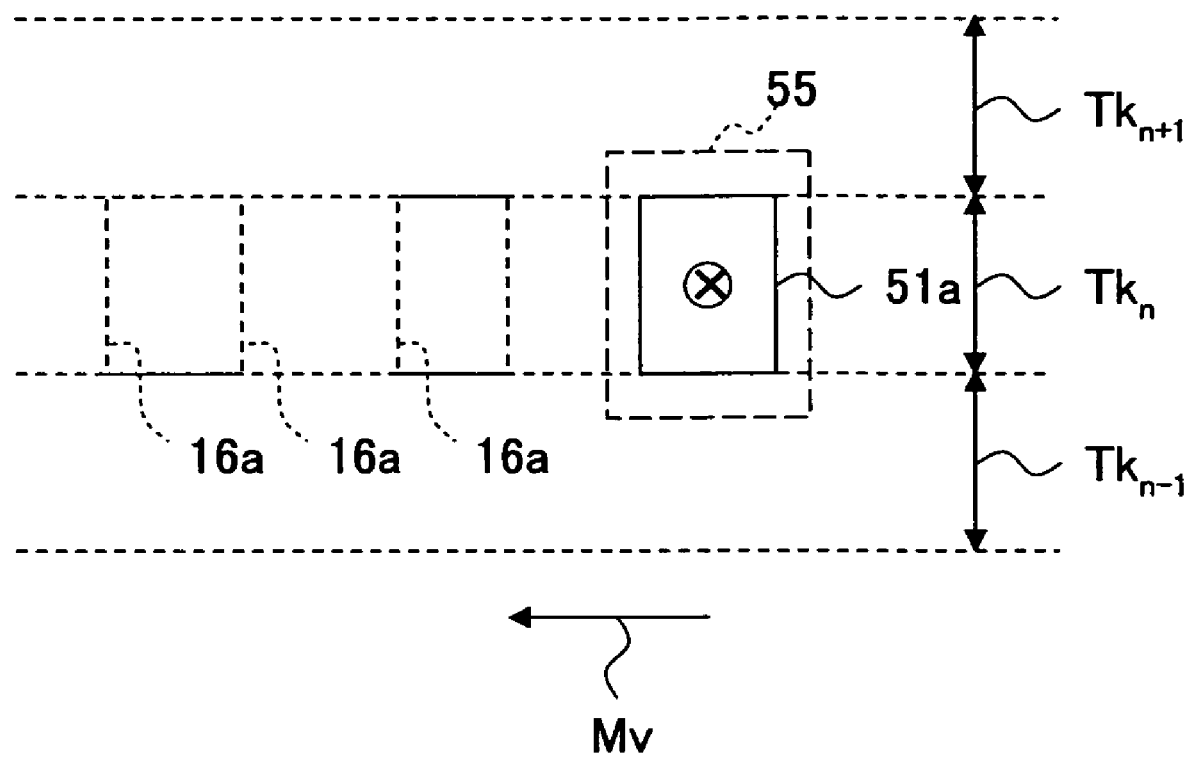
FIG. 11 is a plan view diagram of FIG. 10.

FIG. 11 shows the construction of FIG. 10 in a plan view. Referring to FIG. 11, the region where the saturation occurs in the soft-magnetic shielding layer 51 is formed generally right underneath the tip end part of the primary magnetic pole 55. Thereby, there is formed a bit in the direction of movement of the perpendicular magnetic recording medium (direction Mv shown by arrow) in correspondence to the recording signal in a manner that the bit is surrounded by a magnetization transition region. In the track width direction, on the other hand, it becomes possible to form a track $Tk_n$ with a width generally equal to the width of the region where the saturation occurs in the soft-magnetic shielding layer 41. Thus, by controlling the width of the saturation region 51a to be generally equal to the width of the track $Tk_n$, it becomes possible to eliminate the problem of side track erasing in which the magnetization of the adjacent tracks $Tk_{n-1}$ or $Tk_{n+1}$ is erased. For example, it is possible to control the width of the saturation region 51a by the magnitude of the recording current, the permeability and thickness of the soft-magnetic shielding layer 51, or the like.

Figure 12:
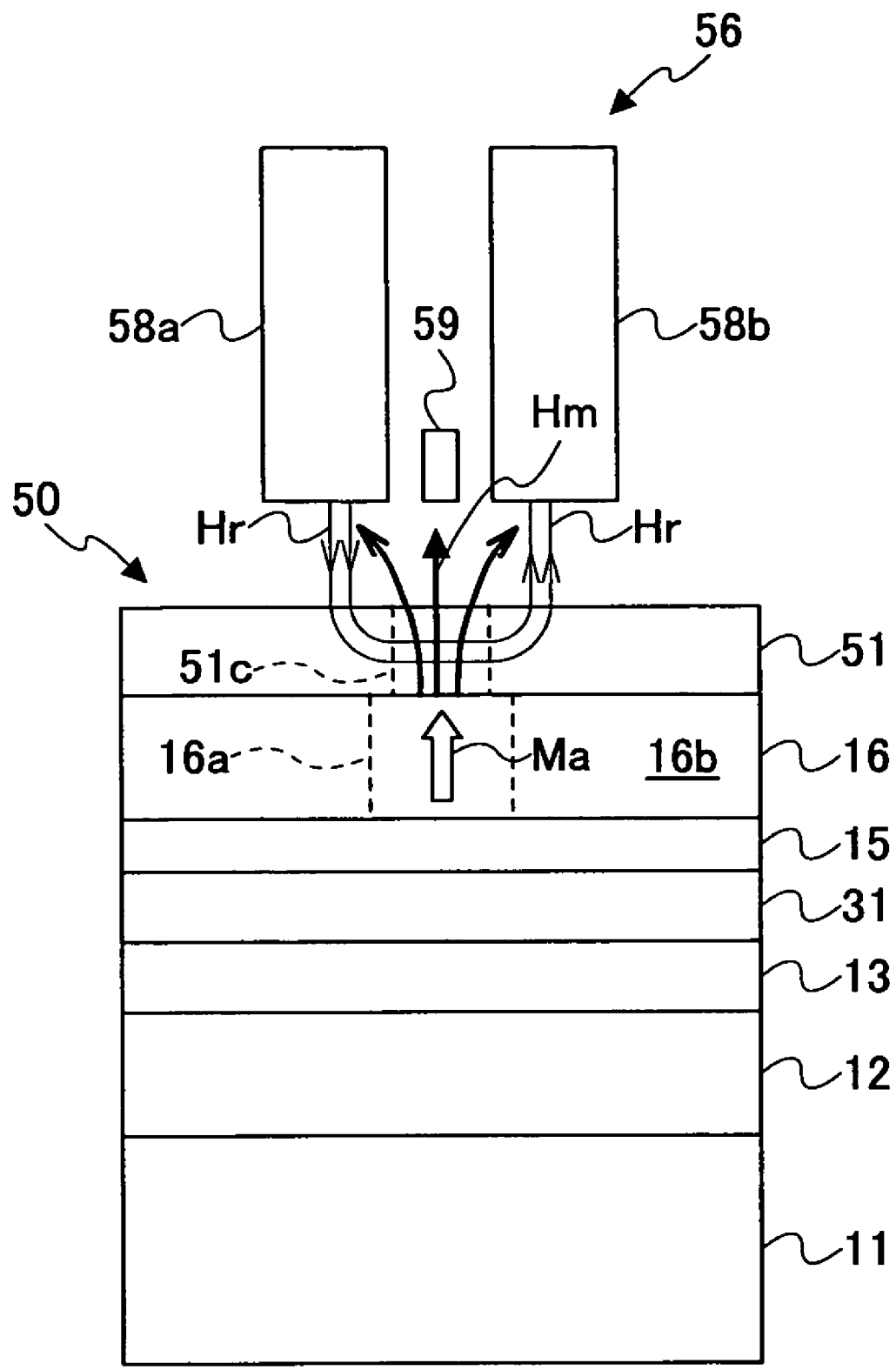
FIG. 12 is a diagram showing reproduction from the perpendicular magnetic recording medium of the third embodiment.

FIG. 12 is a diagram showing the reproducing from the perpendicular magnetic recording medium according to the present embodiment. Referring to FIG. 12, a reproducing head 56 has a construction in which an MR element is sandwiched by shields along the moving direction of the perpendicular magnetic recording medium 50. Thus, when the reproducing head 56 is brought close to the perpendicular magnetic recording medium, there is induced a magnetic field in the shield 58a-soft-magnetic shielding layer 51-shield 58b, due to the effect of the sense current flowing through the MR element or the magnetization of the soft-magnetic shielding layer 51, and the soft-magnetic shielding layer 51 facing the shields 58a and 58b and the region 51c therebetween are brought into the state of magnetic saturation. Thereby, it should be noted that the soft-magnetic shielding layer 51 has the easy axis of magnetization in the in-plane direction while the magnetic field has in-plane direction in the soft-magnetic layer 51. Thus, it is possible to cause the magnetization saturation with small magnetic field. For example, it is possible to cause magnetic saturation with the magnetic field in the order of 240 A/m with the soft-magnetic material of $Ni_{50}Fe_{50}$. As a result, the magnetic field leaking from the magnetization Ma in the recording layer 16 underneath the soft-magnetic shielding layer 51 reaches the MR element of the reproducing head 56 through the saturation region 51c in the soft-magnetic shielding layer 51. With this, it becomes possible to reproduce the magnetization state of the recording layer 16.

Figure 13:
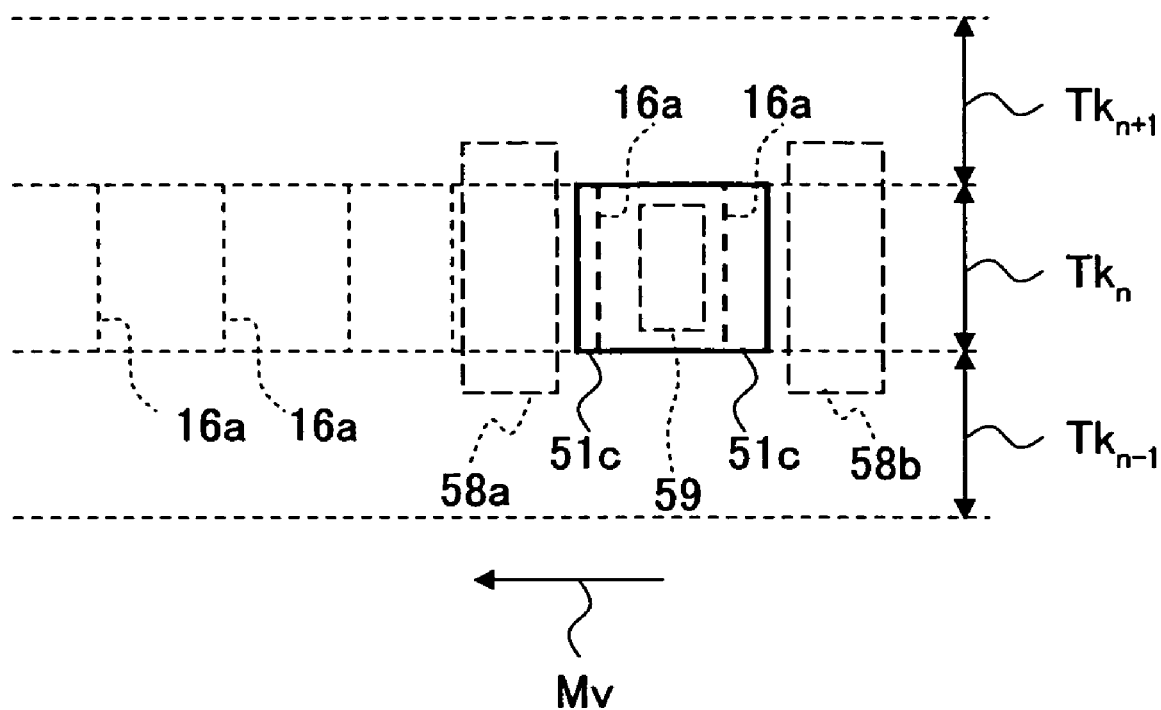
FIG. 13 is a plan view diagram of FIG. 12.

FIG. 13 is a diagram showing the construction of FIG. 12 in a plan view. Referring to FIG. 13, the saturation region 51c of the soft-magnetic shielding layer 51 becomes the region of the soft-magnetic shielding layer 51 located between the regions facing the shields 58a and 58b, and it becomes possible for the MR element 59 to reproduce the magnetic field leaking from the magnetization surrounded by a magnetization transition region 16a on the recording layer 16. By setting the width of the saturation region 51c to be equal to the track width, it becomes possible to reduce the crosstalk from the adjacent tracks $Tk_{n-1}$, $Tk_{n+1}$. Further, it is possible to reduce the width of the MR element 59 as compared with the width of the saturation region 51c.

Hereinafter, the manufacturing method of the perpendicular magnetic recording medium 50 according to the present embodiment will be explained. Thus, manufacturing of the perpendicular magnetic recording medium 50 is started from the side of the substrate 11 shown in FIG. 9 and the layers from the soft-magnetic backing layer 12 up to the recording layer 16 are formed according to the process similar to the one explained with reference to the first embodiment or second embodiment.

Thereby, the soft-magnetic shielding layer 51 is formed by a sputtering process by using a DC magnetron apparatus, for example. In order to align the easy axis of magnetization in the direction perpendicular to the moving direction of the perpendicular magnetic recording medium 50 at the time of recording, it is possible to use two approached to be described below.

Figure 14:
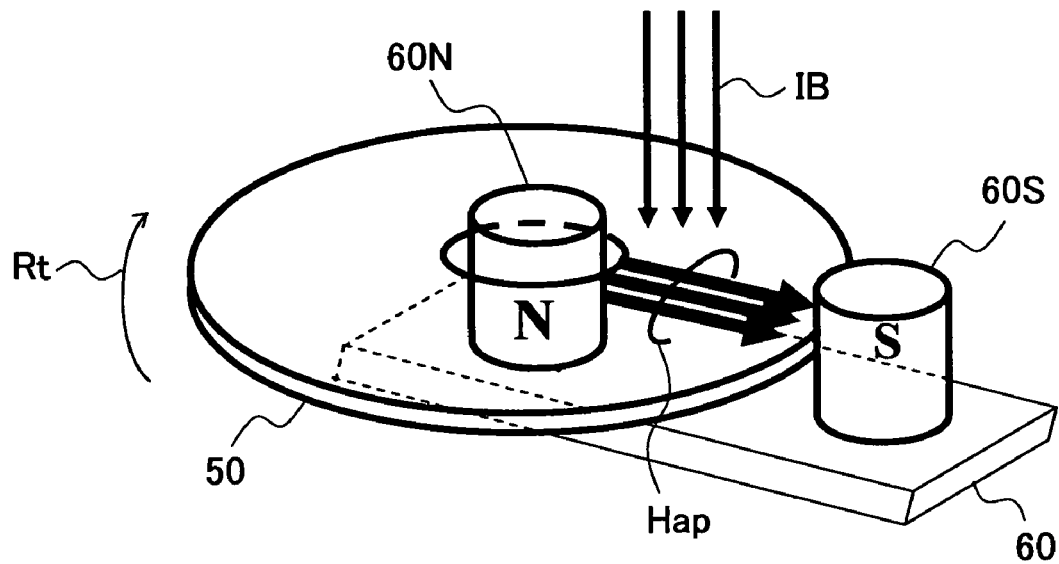
FIG. 14 is a diagram schematically showing the film forming apparatus that causes alignment in the axis of easy magnetization by applying a magnetic field.

FIG. 14 is a schematic diagram showing the film forming apparatus for aligning the easy axis of magnetization by applying a magnetic field. Referring to FIG. 14, there are disposed a magnetic pole 60N at the center of the perpendicular magnetic recording medium 50 and a magnetic pole 60S at the peripheral part thereof, and sputtering particles IB of the soft-magnetic shielding layer 51 are introduced while rotating the perpendicular magnetic recording medium 50 in an Rt direction, for example, while applying a DC magnetic field Hap in the radial direction. Here, the DC magnetic field is et to the order of 80 kA/m. While the drawing shows the case of applying the DC magnetic field to a part of the perpendicular magnetic recording medium 50, it is also possible to apply the DC magnetic field to the entirety of the perpendicular magnetic recording medium 50 by disposing the peripheral magnetic pole 60S over the entire periphery of the perpendicular magnetic recording medium 50.

Figure 15:
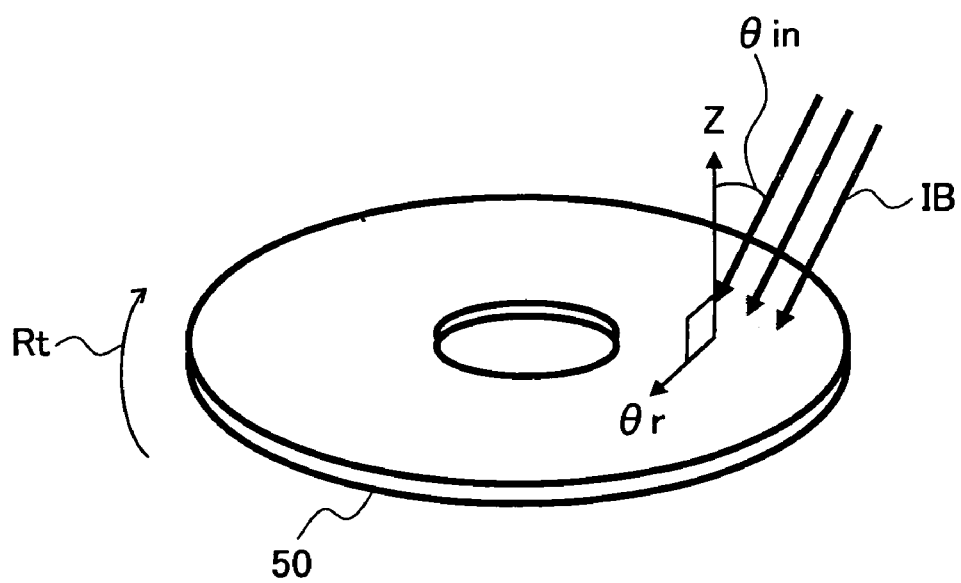
FIG. 15 is a diagram showing the film forming apparatus that causes alignment in the axis of easy magnetization by impinging sputtering particles obliquely.

FIG. 15 is a diagram schematically showing the film forming apparatus that causes alignment in the easy axis of magnetization by introducing the sputtering particles obliquely. Referring to FIG. 15, the perpendicular magnetic recording medium 50 is rotated in the Rt direction, for example, and the sputtering particles IB of the soft-magnetic shielding layer 51 are introduced. Thereby, it should be noted that the direction of incoming particles is inclined toward the outer periphery of the perpendicular magnetic recording medium 50 by an incident angle θin with regard to a plane defined by a circumferential direction Or and the direction perpendicular to the perpendicular magnetic recording medium 50 (Z-direction). Preferably, the incident angle θin is set larger than 0 degrees but not exceeding 60 degrees. Next, the protective film 18 and the lubricating film 19 are formed similarly to the first embodiment.

With the foregoing, it is possible to form the magnetic recording medium 50 in which the easy axis of magnetization of the soft-magnetic shielding layer 51 is aligned perpendicular to the moving direction at the time of recording.

According to the present embodiment, it becomes possible to cause magnetization selectively in the part of the recording layer 16 underneath the saturation region, by forming such a saturation region in a part of the soft-magnetic shielding layer 51 provided over the recording layer 16 by means of the recording magnetic field and causing to pass the recording magnetic field through such a saturation region. Thereby, spreading of the magnetic flux from the recording head is suppressed, and the problem of adjacent track erasing can be prevented. Further, because there is caused concentration in the magnetic flux from the recording head, the recording magnetic field is increased and writing performance to the recording layer can be improved.

Figure 16:
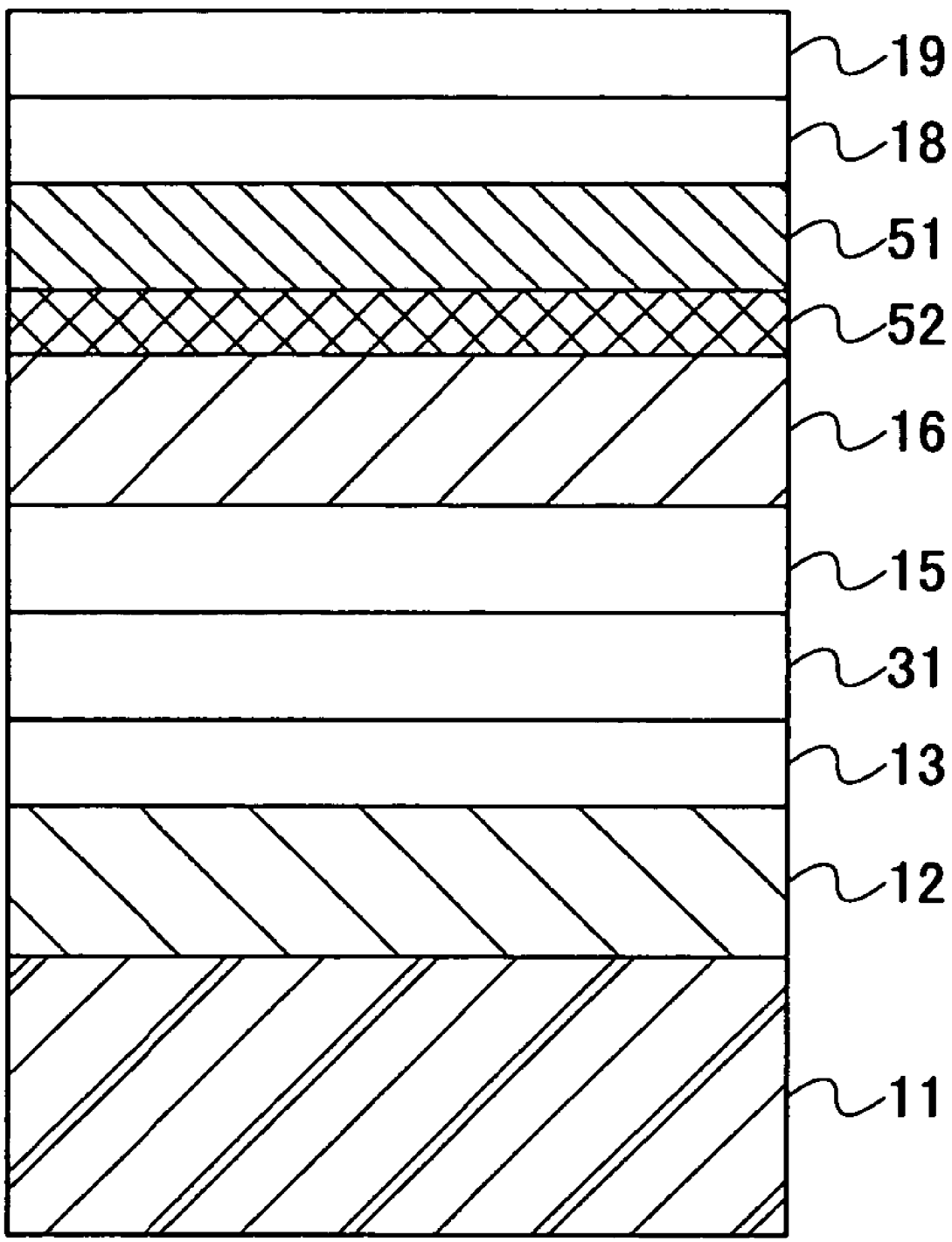
FIG. 16 is a schematic cross sectional diagram of the perpendicular magnetic recording medium according to a modification of the third embodiment.

FIG. 16 is a schematic cross-sectional diagram of the perpendicular magnetic recording medium according to a modification of the present embodiment.

Referring to FIG. 16, the perpendicular magnetic recording medium 55 of the present embodiment includes a substrate 11 and has a construction in which a soft-magnetic backing layer 12, a seed layer 13, an under layer 31, a non-magnetic intermediate layer 15, a recording layer 16, a nonmagnetic layer 52, a soft-magnetic shielding layer 51, a protective layer 18, and a lubricating layer 19 are stacked consecutively over the substrate 11. Otherwise, the construction is identical to that of the perpendicular magnetic recording medium of the third embodiment.

The non-magnetic layer 52 is formed of a non-magnetic material and formed by sputtering, or the like, to have a thickness in the range of 0.5 nm-20 nm. While not specifically limited, it is possible to use $SiO_2$, $Al_2O_3$, $TiO_2$, TiC, C, hydrogenated carbon, or the like, for this purpose.

According to the present embodiment, it becomes possible to prevent magnetic coupling between the recording layer 16 and the soft-magnetic shielding layer 51 by providing such a non-magnetic layer between the recording layer 16 and the non-magnetic shielding layer 51.

Hereinafter, examples of the present embodiment will be described.

EXAMPLE 6

The perpendicular magnetic recording medium of the present example has the following construction. Thus, starting from the side of the substrate, there is formed a structure of glass substrate/soft-magnetic backing layer: CoNbZr film (200 nm)/seed layer: Ta film (5 nm)/under layer: NiFe film (5 nm)/non-magnetic intermediate layer: Ru film (20 nm)/recording layer: (Co86Cr$_8$Pt$_6$) 90 vol %-(SiO$_2$) 10 vol % film (10 nm)/non-magnetic layer: Ta film (4 nm)/soft-magnetic shielding layer: Ni$_{80}$Fe$_{20}$ film (X nm, saturation magnetic flux density 1.1 T)/protective film: carbon film (10-X nm)/lubricating film: AM3001 film (1.5 nm). In the present example samples were prepared by changing the film thickness X of the NiFe film forming the soft-magnetic shielding layer from 0 to 10 nm. Further, in order to maintain the distance from the recording head to the surface of the recording layer constant, the thickness of the protective film is set to 10-X nm for the film thickness X nm of the NiFe film. With the present example, the films were formed by using a sputtering apparatus of Ar gas ambient, wherein the CoNbZr film, the Ta film constituting the non-magnetic layer, the NiFe film constituting the soft-magnetic shielding layer and the carbon film were formed by using a DC magnetron sputtering apparatus in the AR gas ambient under the pressure of 0.5 Pa. Further, the Ta film of the seed layer, the NiFe film of the under layer and the Ru film were formed by using a DC magnetron sputtering apparatus in the Ar gas ambient under the gas pressure of 4.0 Pa. The recording layer was formed by using an RF magnetron sputtering apparatus in the AR ambient gas under the gas pressure of 4.0 Pa. The film formation has been made by setting the substrate temperature at a room temperature. The lubrication layer was formed by a dipping process. The numerals in the parentheses represent the film thickness.

Figure 17:
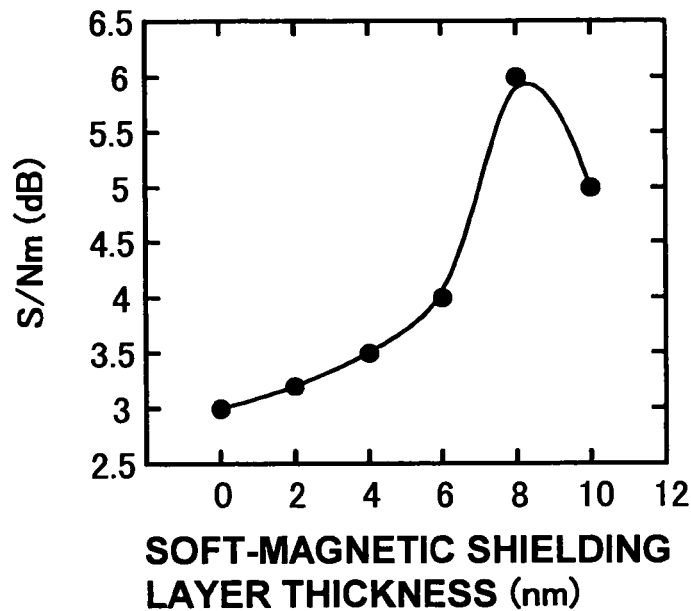
FIG. 17 is a diagram showing the relationship between S/Nm and the thickness of the soft-magnetic shielding layer of Example 6.

FIG. 17 is a diagram showing the relationship between S/Nm and the thickness of the soft-magnetic shielding layer for the case of Example 6. Referring to FIG. 17, it can be seen that, by providing the soft-magnetic shielding layer, a higher S/Nm value is realized as compared with the case in which the soft-magnetic shielding layer is not provided. Further, it can be seen that the value of S/Nm increases with increase of thickness of the soft-magnetic shielding layer and that the S/Nm takes a maximum value at the film thickness of 8 nm. From this, it is interpreted that, with increase of the film thickness, the suction of the magnetic flux from the recording head is increased also and the amount of the magnetic flux leaking to the recording layer is decreased, while this leads to a decrease in the area of the saturation region, and the magnetic flux constricted to the narrowed saturation region has induced magnetization in the recording layer as it passes therethrough. As a result, it is believed that the high recording magnetic field has induced the magnetization in the narrow area having the size of generally equal to the primary magnetic pole in the recording layer.

Here, it should be noted that S/Nm was measured by using a composite magnetic head of the floating distance of 8 nm (recording head: monopole head, write core width: 0.2 um, saturated magnetic flux density×write core width: 0.4 μTm, recording current: 5 mA; reproducing head (GMR element): read core width 0.12 μm). Thereby, the recording density was set to 500 kFCI. It should be noted that the measurement of FIG. 19 and FIG. 20 to be explained later was conducted under the same condition.

Figure 18:
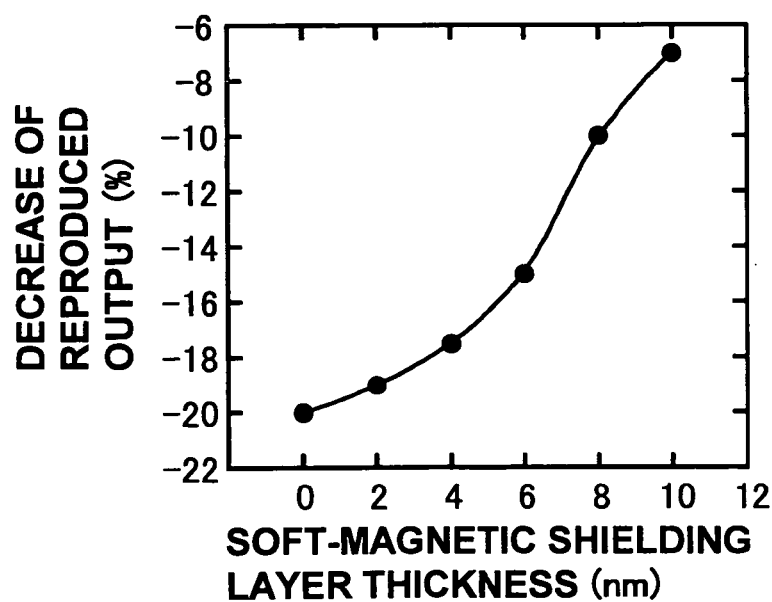
FIG. 18 is a diagram showing the relationship between the rate of decrease of reproduced output and the thickness of the soft-magnetic shielding layer at the time of the test for adjacent track erasing in Example 6.

FIG. 18 is a diagram showing the relationship between the decrease rate of reproduced output and the thickness of the soft-magnetic shielding layer for the case of conducting adjacent track erasing test with regard to the perpendicular magnetic recording medium of Example 6. Referring to FIG. 18, it can be seen that the decrease rate of the reproduced output from the adjacent track becomes smaller in the case the soft-magnetic shielding layer is provided as compared with the case where no such a soft-magnetic shielding layer is provided (film thickness=0). Further, with increase of the film thickness of the soft-magnetic shielding layer, it can be seen that the decrease rate of the reproduced output from the adjacent track decreases monotonously. With this, it is can be seen that the soft-magnetic shielding layer suppresses the magnetic flux that leaks in the track width direction.

Here, it should be noted that the adjacent track erase test has been carried out, after conducting recording into a measuring track with the recording density of 100 kFCI and measuring the initial reproduced output V$_0$ therefrom, by: repeating DC erasing operation for 100 times by offsetting the recording head by 0.25 μm; measuring the reproduced output V$_1$ from the measuring track by aligning the head on the measuring track again; and calculating the reproduced output decrease rate (%) as (V$_1$-V$_0$)/V$_0$×100%.

Figure 19:
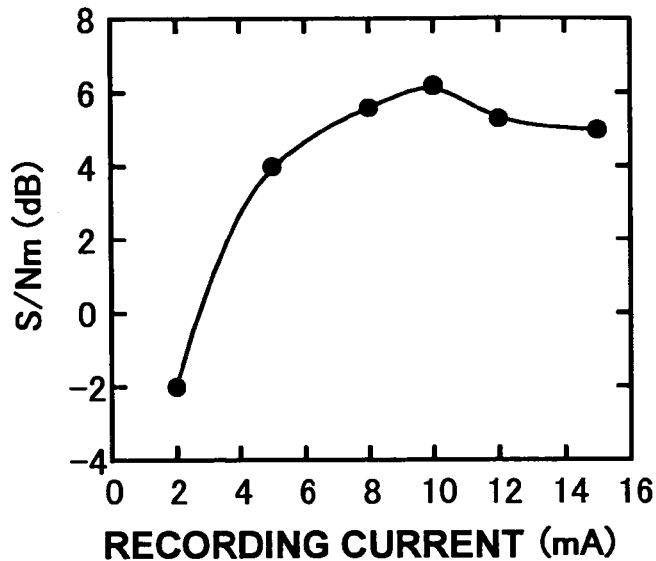
FIG. 19 is a diagram showing the relationship between S/Nm ratio and recording current of Example 6.

FIG. 19 is a diagram showing the relationship between S/Nm and the recording current for Example 6. In this experiment, the sample that has the soft-magnetic shielding layer of 8 nm thickness has been used wherein this film thickness corresponds to the maximum of S/Nm as can be seen in FIG. 17.

Referring to FIG. 19, it can be seen that there appears a maximum in S/Nm with regard to the recording current. From this, it can be seen that there occurs concentration of magnetic flux from the recording head in the case a saturation region of suitable size is formed in the soft-magnetic shielding layer and satisfactory writing becomes possible.

EXAMPLE 7

The perpendicular magnetic recording medium of the present example has the following construction. Thus, starting from the side of the substrate, there is formed a structure of glass substrate/soft-magnetic backing layer: CoNbZr film (200 nm)/non-magnetic intermediate layer: Ru film (20 nm)/recording layer: (Co$_{79}$Cr$_8$Pt$_{13}$) 90 vol %-(SiO$_2$) 10 vol % film (10 nm)/non-magnetic layer: Ta film (X nm)/soft-magnetic shielding layer: Ni$_{50}$Fe$_{50}$ film (20 nm, saturation magnetic flux density 1.3 T)/protective film: carbon film (4 nm)/lubricating film: AM3001 film (1.5 nm). In the present example, samples were prepared by changing the film thickness X of the Ta film forming the non-magnetic layer from 2 to 10 nm. The film forming condition was identical to the case of Example 6.

Figure 20:
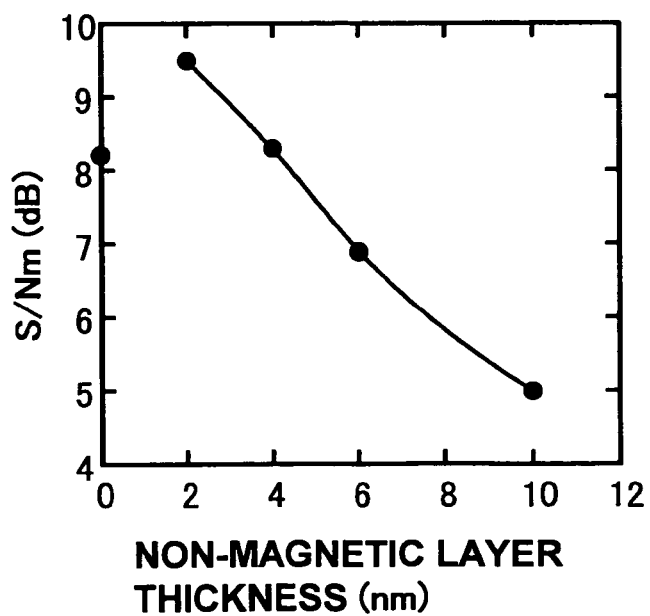
FIG. 20 is a diagram showing the relationship between the S/Nm and the thickness of non-magnetic layer in Example 7.

FIG. 20 is a diagram showing the relationship between S/Nm and the thickness of the non-magnetic layer according to Example 7. Referring to FIG. 20, it can be seen that the S/Nm is largest value of 9.6 dB in the case the non-magnetic layer has the thickness of 2 nm. Thus, it can be seen that there is an improvement by 1.4 dB as compared with the case of not providing such a non-magnetic layer (film thickness=0). Further, it can be seen that S/Nm decreases monotonously with increase of the thickness of the non-magnetic layer. From this, it is possible to improve S/Nm by providing the non-magnetic layer and preventing magnetic coupling between the recording layer and the soft-magnetic shielding layer.

Fourth Embodiment

Next, a perpendicular magnetic recording medium according to a fourth embodiment of the present invention will be described in which a magnetic flux slit layer is formed on the recording layer in the form such that semi-hard or soft-magnetic magnetic particles are dispersed in a non-magnetic matrix phase, or the like.

Figure 21:
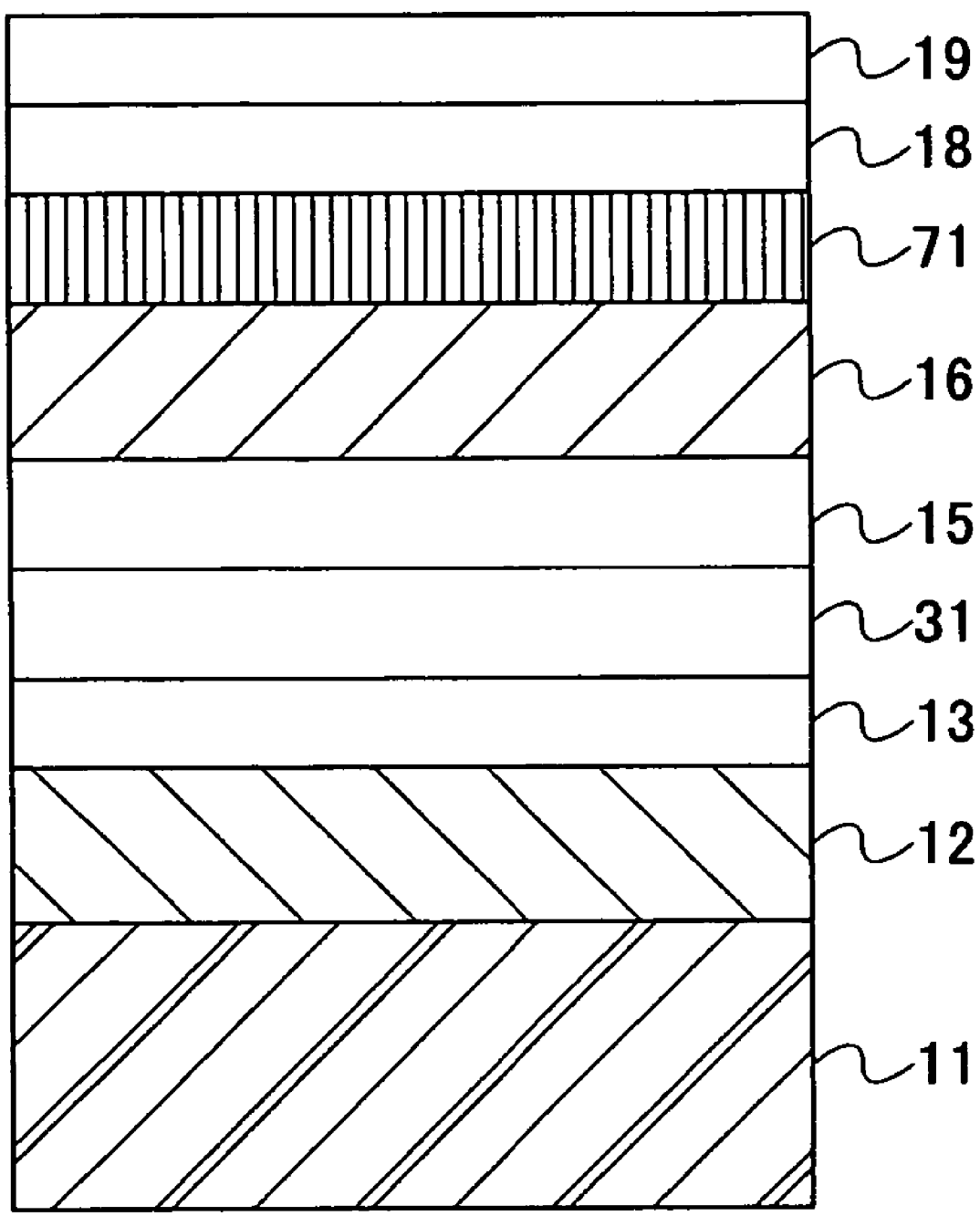
FIG. 21 is a schematic cross sectional diagram of the perpendicular magnetic recording medium according to a fourth embodiment of the present invention.

FIG. 21 is a schematic cross-sectional diagram of the perpendicular magnetic recording medium according to the fourth embodiment of the present invention, wherein those parts corresponding to the parts explained previously are designated by the same reference numerals and the description thereof will be omitted.

Referring to FIG. 21, the perpendicular magnetic recording medium 50 of the present embodiment includes a substrate 11 and has a construction in which a soft-magnetic backing layer 12, a seed layer 13, an under layer 31, a non-magnetic intermediate layer 15, a recording layer 16, a magnetic flux slit layer 71, a protective layer 18, and a lubricating layer 19 are stacked consecutively over the substrate 11.

The magnetic flux slit layer 71 is formed over the recording layer 16 explained in the first or second embodiments with the thickness of 2 nm-20 nm wherein semi-hard or soft-magnetic magnetic particles are disposed in a non-magnetic matrix phase of a non-magnetic material and the magnetic flux slit layer 71 is formed so as to include an easy axis of magnetization in the film thickness direction. With such a construction, the magnetic fine particles are isolated from each other magnetically as they are separated in the in-plane direction by the non-magnetic matrix phase or non-magnetic particles. Further, because the magnetic flux slit layer has the easy axis of magnetization in the film thickness direction, the magnetic flux from the recording head is absorbed by the semi-hard or soft-magnetic magnetic particles having higher permeability as compared with the part formed of the non-magnetic matrix phase or non-magnetic particles, particularly by the magnetic particle located at the closest distance from the recording head. The magnetic flux thus absorbed then passes through the recording layer 16 adjacent to the magnetic flux slit layer 17 and reaches the soft-magnetic backing layer 12. Thus, there is achieved an effect of the recording head is in substantial contact with the recording layer 16, and effects such as increase of recording magnetic field and sharpening of spatial distribution of the recording magnetic filed are attained.

More specifically, the magnetic flux slit layer 71 is formed of a semi-hard ferrite film, a granular film containing semi-hard ferrite particles or soft-magnetic fine particles, or a soft-magnetic nanocrystal film.

For the semi-hard ferrite film, it is preferable to use γ iron oxide having a needle structure ($\gamma\text{-}Fe_2O_3$), magnetite ($Fe_3O_4$), a barium ferrite ($BaFe_{12}O_{19}$) of hexagonal plate form, or the like. By using these materials for the sputtering target, the magnetic flux slit layer is formed by sputtering while heating the substrate, wherein the film is provided with magnetic anisotropy in the thickness direction by conducting an annealing process after the film formation.

Further, with the granular film that contains semi-hard ferrite particles or soft magnetic particles, it is possible to use the particles of $\gamma\text{-}Fe_2O_3$, $Fe_3O_4$ or $BaFe_{12}O_{19}$ for the semi-hard ferrite particles, and it is possible to use a material containing at least one element selected from Co, Fe and Ni for the soft-magnetic particles. The non-magnetic matrix phase is formed of at least one material selected from $SiO_2$, $Al_2O_3$, C and $Fe_3O_4$. For example, $\gamma\text{-}Fe_2O_3$ particles or $Fe_3O_4$ particles have a needle shape form and the grain size as measured in the elongating direction is about 10 nm. Thereby, the coercive force in the elongating direction is 15.8 kA/m (200 Oe)-35.6 kA/m (450 Oe). Further, the saturation magnetization is 70 ems/g-80 emu/g. Further, $BaFe_{12}O_{19}$ particles of hexagonal shape have a size of several ten nanometers and thickness of about 10 nm. Thereby, the coercive force in the thickness direction is 15.8 kA/m (200 Oe)-47.4 kA/m (600 Oe). The saturation magnetization is 50 emu/g-58 emu/g.

The soft-magnetic nanocrystal film may be formed for example of a FeMB (M=Zr, Hf, Nb) film or a FeMO (M=Zr, Hf, Nb, Y, Ce) film, and is constructed by magnetic particles containing large amount of α-Fe and an amorphous and non-magnetic grain boundary part containing M and B or O with large amount. The magnetic particles have a grain diameter in the order of 10 nm to 10 nm in the in-plane direction and the magnetic particles are physically separated with each other by a grain boundary part formed between adjacent magnetic particles. As reported in J. Appl. Phys. vol. 81(1997), p. 2736, it is possible to improve the permeability with FeMB by addition of Cu of about 1 atomic % ($Fe_{84}Nb_{3.5}Zr_{3.5}B_8Cu_1$) and optimization of chemical process of synthesis, while this is also effective for miniaturization of the crystals.

The soft-magnetic nanocrystal film is formed for example by sputtering a FeZrB film of 8 nm thickness over the recording layer 16. Thereby, by applying an annealing process at low temperature before the process of crystallization, it becomes possible to make the size of the crystal particles uniform and improve the permeability.

According to the present embodiment, the recording layer 16 is covered by the magnetic flux slit layer in which magnetic particles are disposed in the state surrounded by a non-magnetic matrix phase or non-magnetic grain boundary, the magnetic flux reaching the soft-magnetic backing layer 12 from the recording head through the magnetic flux slit layer 71 and the recording layer 16 undergoes constriction so as to pass through the magnetic particles of the magnetic flux slit layer 71, and it becomes possible to suppress the spreading of the magnetic flux in the region from the magnetic head to the recording layer 16. Thereby, it becomes possible to concentrate the magnetic flux. Thus, it becomes possible to prevent erasing of adjacent track by the spreading of the magnetic flux and it becomes possible to improve the track density. Further, it becomes possible to narrow the width of the magnetic transition region in the longitudinal direction of the track, and it becomes possible to improve the line recording density. As a result, a perpendicular magnetic recording medium of high recording density is realized.

Fifth Embodiment

Next, a perpendicular magnetic recording medium according to a fifth embodiment of the present invention will be explained wherein the perpendicular magnetic recording medium of the present embodiment includes a magnetic flux slit layer provided over the recording layer in such a manner that non-magnetic particles are disposed in a ferromagnetic matrix phase.

Figure 22:
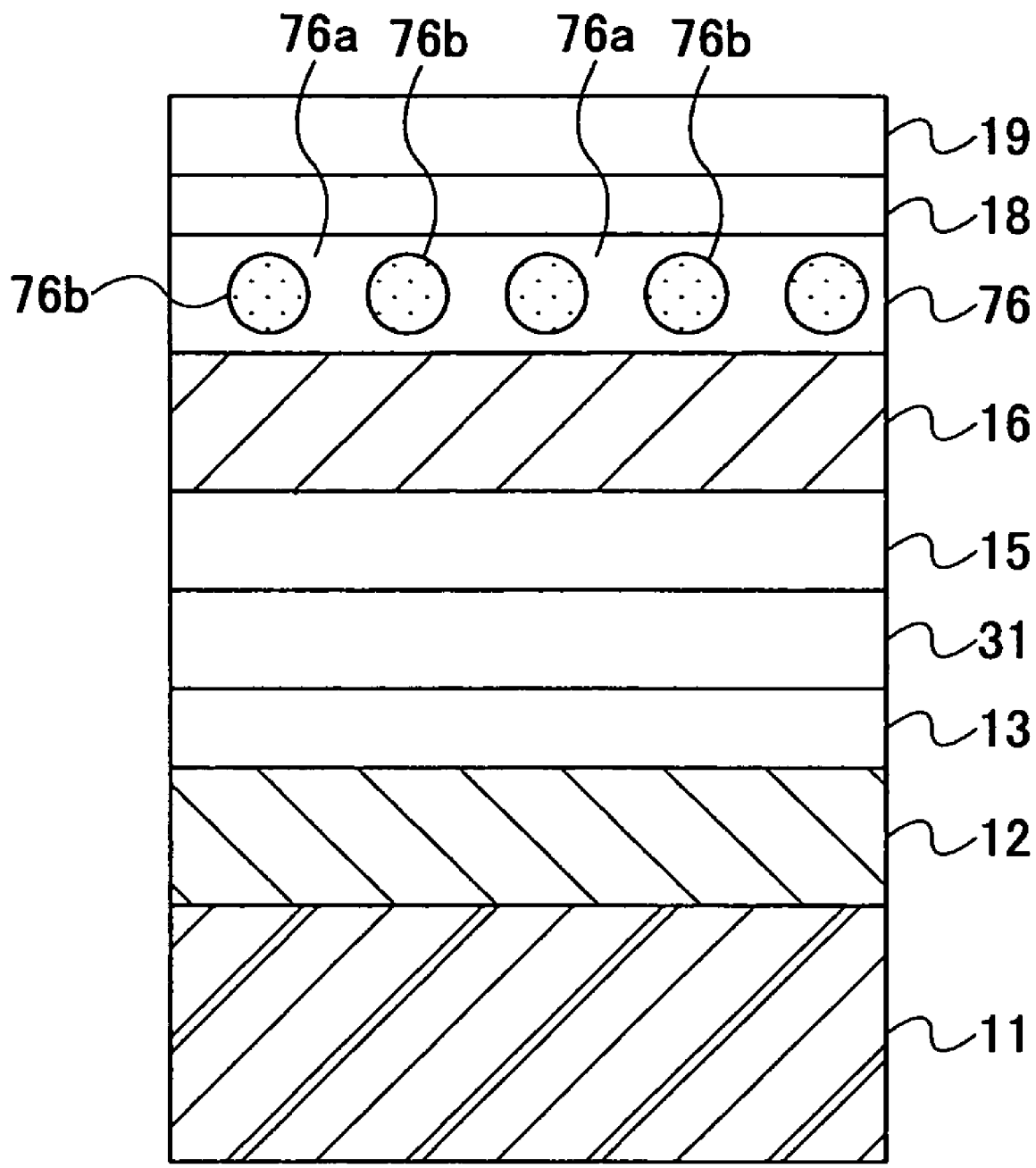
FIG. 22 is a schematic cross sectional diagram of the perpendicular magnetic recording medium according to a fifth embodiment of the present invention.

FIG. 22 is a schematic cross-sectional diagram of the perpendicular magnetic recording medium according to the fifth embodiment of the present invention, wherein those parts corresponding to the parts explained previously are designated by the same reference numerals and the description thereof will be omitted.

Referring to FIG. 22, the perpendicular magnetic recording medium 75 of the present embodiment includes a substrate 11 and has a construction in which a soft-magnetic backing layer 12, a seed layer 13, an under layer 31, a non-magnetic intermediate layer 15, a recording layer 16, a magnetic flux slit layer 76, a protective layer 18, and a lubricating layer 19 are stacked consecutively over the substrate 11.

The magnetic flux slit layer 76 has a thickness of 2 nm-10 nm and has a construction in which non-magnetic particles 76b are disposed in a ferromagnetic matrix phase 86a of an alloy of a rare earth metal and a transition metal. The rare earth metal of the ferromagnetic matrix phase 19 is selected from Tb, Gd and Dy and there may be one or two or more of such rare earth metal elements included in the ferromagnetic matrix phase. Further, the transition metal is selected from Fe and Co and there may be one or two of such transition metal elements included in the ferromagnetic matrix phase. For example, the ferromagnetic matrix phase 76a may be formed of TbFeCo, GdFeCo, DyFeCo, or the like, wherein it is preferable, in the case of using an alloy of rare earth and FeCo represented as $(Tb, Gd, Dy \text{ or an alloy thereof})_x(Fe_{100-y}Co_y)_{100-x}$, for the ferromagnetic matrix phase 76a, to set x=10 atomic %-30 atomic %, y=40 atomic % or less. Within the foregoing range, the easy axis of magnetization of the ferromagnetic matrix phase aligns in the film thickness direction, and it becomes possible to cause the magnetic flux to pass therethrough in response to the increase or decrease of the magnetic flux from the recording head. As a result, magnetic saturation of the ferromagnetic matrix phase is avoided and constriction of the magnetic flux becomes possible.

It should be noted that the non-magnetic fine particles 76b is selected from a compound of any one element selected from the group consisting of Si, Al, Ta, Zr, Y, and Mg, and at least one element selected from the group consisting of O, C and N. More specifically, the material for the non-magnetic fine particles 76b is selected from the materials similar to those used for the second non-soluble phase 42b of the second embodiment. Because these oxides, nitrides or carbides form a compound of covalent bond, which easily separates from the rare earth metal—transition metal alloy material constituting the ferromagnetic matrix phase 76a, such oxides, nitrides or carbides cause precipitation in the ferromagnetic matrix phase 76a in the form of fine particles. Thus, the non-magnetic fine particles 76b are formed in the ferromagnetic matrix phase 19 in a self-organized manner.

Preferably, the non-magnetic fine particles 76b contain Y (yttrium). When the non-magnetic fine particles 76b contains oxygen, selective formation of bond between the rare earth metal in the ferromagnetic matrix phase 76a and oxygen (such as Tb—O) is blocked, and it becomes possible to prevent decrease of the saturated magnetic flux density of the ferromagnetic matrix phase 76a.

Preferably, the average grain diameter in the non-magnetic fine particles 76b is set within the range of 3 nm-10 nm, and it is also preferable that the average gap between a non-magnetic fine particle and a non-magnetic fine particle adjacent thereto is set within the range of 0.5 nm-10 nm. By setting these parameters within the foregoing range, it becomes possible to constrict the magnetic flux sufficiently with regard to the size of the bit to be recorded.

The magnetic flux slit layer 76 is formed by a vacuum evaporation deposition method or sputtering method. In the case of using a sputtering method, for example, a sputtering target of TbFeCo and a sputtering target of $YSiO_2$ are used simultaneously for forming the magnetic flux slit layer. In one example of the present embodiment, the magnetic flux slit layer 76 was formed over the recording layer with a thickness of 10 nm by using an RF magnetron sputtering apparatus and conducting sputtering by simultaneously using a sputter target of TbFeCo (10 atomic % Tb-72 atomic % Fe-8 atomic % Co) and a sputter target of $YSiO_2$, such that $YSiO_2$ is contained with 70 volumetric % with reference to the volume of the magnetic flux slit layer 76. Here, it should be noted that it is also possible to use a composite sputter target in which TbFeCo and $YSiO_2$ are mixed in place of using two sputter targets as noted above.

According to the present invention, in which the magnetic flux slit layer 76 is provided over the recording layer in such a manner that non-magnetic fine particles 76b are disposed in the ferromagnetic matrix phase 76a, the magnetic flux reaching the soft-magnetic backing layer 12 from the recording head through the magnetic flux slit layer 76 and the recording layer 16 undergoes constriction so as to pass through the ferromagnetic matrix phase 76a of the magnetic flux slit layer 76 between the non-magnetic particles 76b, and it becomes possible to suppress the spreading of the magnetic flux in the region from the magnetic head to the recording layer 16. Thereby, it becomes possible to concentrate the magnetic flux. Thus, it becomes possible to prevent erasing of adjacent track by the spreading of the magnetic flux and it becomes possible to improve the track density. Further, it becomes possible to narrow the width of the magnetic transition region in the longitudinal direction of the track, and it becomes possible to improve the line recording density. As a result, a perpendicular magnetic recording medium of high recording density is realized.

Figure 23:
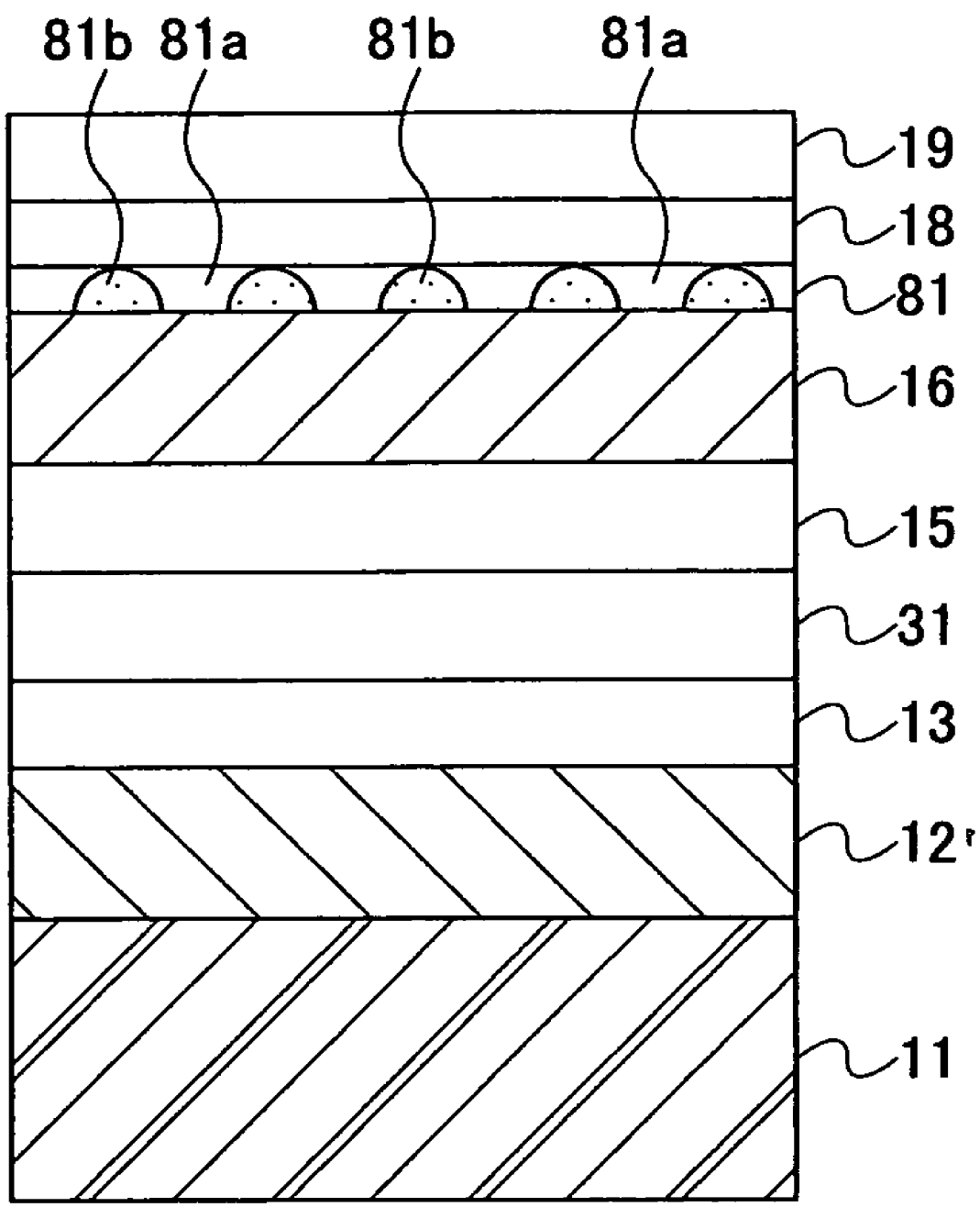
FIG. 23 is a schematic cross-sectional diagram of the perpendicular magnetic recording medium according to a modification of the fifth embodiment of the present invention.

FIG. 23 is a schematic diagram of a perpendicular magnetic recording medium according to a modification of the fifth embodiment of the present invention The perpendicular magnetic recording medium 80 of the present modification includes a substrate 11 and has a construction in which a soft-magnetic backing layer 12, a seed layer 13, an under layer 31, a non-magnetic intermediate layer 15, a recording layer 16, a magnetic flux slit layer 81, a protective layer 18, and a lubricating layer 19 are stacked consecutively over the substrate 11. Thus, the perpendicular magnetic recording medium of the present embodiment has a construction similar to that of the perpendicular magnetic recording medium of the fifth embodiment, except that the magnetic flux slit layer 81 is provided in place of the magnetic flux slit layer 76 shown in FIG. 22, wherein it should be noted that the magnetic flux slit layer 81 if formed of crystal growth nuclei 81b of a non-magnetic material formed on the surface of the recording layer 16 and a soft-magnetic matrix layer 81a of a soft-magnetic material filling a gap between adjacent crystal growth nuclei 81b.

The crystal growth nuclei 81b of the magnetic flux slit layer 81 is formed of a non-magnetic material selected from Al, Ta, Ti, Ag, Cu, Pb, Si, B, Zr, Cr, Ru, Re and an alloy thereof and is formed on the surface of the recording layer 16 by a sputtering process, vacuum evaporation deposition process, CVD process, or the like. It should be noted that the crystal growth nuclei 81b are the nuclei of crystal growth formed in the initial phase of growth process, and it is possible to control the size of the crystal growth nuclei 81b or the separation between adjacent crystal growth nuclei 81b by way of control of the substrate temperature, deposition amount, deposition rate, or the like.

The soft magnetic matrix phase 81b is filled with a soft magnetic material of high saturation magnetic flux density such as the material generally identical to the material used for the soft-magnetic backing layer 12. Thereby, it is preferable that the soft-magnetic matrix layer 81a has a thickness smaller than the thickness of the crystal growth nuclei 81b. Wit this, it becomes possible to prevent spreading of the magnetic flux and achieve effective constriction of the magnetic flux.

According to the present modification, in which the crystal growth nuclei 81b of a non-magnetic material are disposed in the soft-magnetic matrix layer 81b with mutual separation between the recording layer 16 and the protective film 18, the magnetic flux from the recording head is constricted by the soft-magnetic material filling the gap between the crystal growth nuclei 81b at the time of recording, and it becomes possible to suppress the spreading of the magnetic flux, and the magnetic flux is concentrated in the recording layer 16. It is also possible to provide a non-magnetic layer of the thickness of 1.0-5.0 nm between the magnetic flux slit layer 76 or 81 and the recording layer 16. With such a construction, too, it is possible to disconnect the magnetic interaction between the magnetic flux slit layer 76 or 81 and the recording layer 16.

Sixth Embodiment

Next, a perpendicular magnetic recording medium according to a sixth embodiment of the present invention will be explained wherein the perpendicular magnetic recording medium of the present embodiment includes tip-shaped magnetic bodies of a non-magnetic material disposed between the soft-magnetic backing layer and the recording layer in alignment in the in-plane direction.

Figure 24:
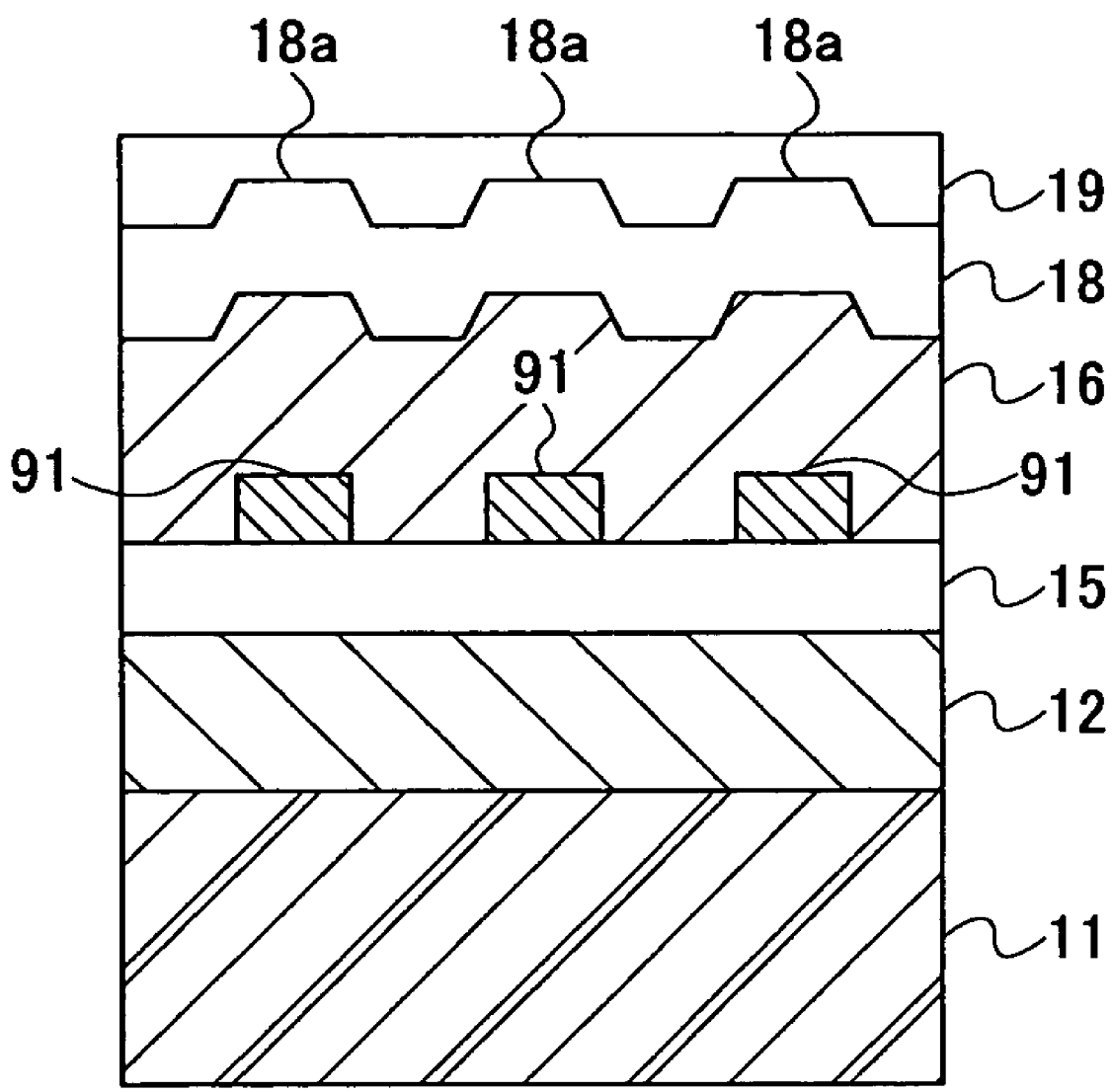
FIG. 24 is a schematic cross sectional diagram of the perpendicular magnetic recording medium according to a sixth embodiment of the present invention.

FIG. 24 is a schematic cross-sectional diagram of the perpendicular magnetic recording medium according to the sixth embodiment of the present invention, wherein those parts corresponding to the parts explained previously are designated by the same reference numerals and the description thereof will be omitted.

Referring to FIG. 24, the perpendicular magnetic recording medium 90 of the present embodiment includes a substrate 11 and has a construction in which a soft-magnetic backing layer 12, a seed layer 13, an under layer 31, a non-magnetic intermediate layer 15, tip-shaped magnetic bodies 91, a recording layer 16, a protective layer 18, and a lubricating layer 19 are stacked consecutively over the substrate 11.

Here, the tip-shaped magnetic bodies 91 are formed of a semi-hard material or a soft-magnetic material by a sputtering process and have the coercive force of 79 kA/m or less. Thereby, the tip-shaped magnetic bodies are formed to have the easy axis of magnetization in the film thickness direction. In order to align the easy axis of magnetization in the film thickness direction, a material having the easy axis of magnetization in the film thickness direction is used, wherein such a material includes a 19 atomic %-28 atomic % Gd—Fe film, a 20 atomic %-30 atomic % Nd—Fe film, a 20 atomic %-30 atomic % Nd—Co film, or the like. Thereby, the direction of the easy axis of magnetization is aligned easily in the film thickness direction by using a sputtering process, such as a DC magnetron sputtering process for the formation thereof. Further, it is possible to use a CoCr film for the tip-shaped magnetic body 91 by using a Ru film or Pd film for the non-magnetic intermediate layer 15.

The tip-shaped magnetic bodies 91 are formed to have a size of 0.6 nm-20 nm×0.6 nm-20 nm and have a thickness of 2 nm-10 nm, wherein the tip-shaped magnetic bodies 91 are formed such that separation between adjacent tip-shaped magnetic bodies 91 is 0.6 nm-20 nm. Thereby, the tip-shaped magnetic bodies 91 are disposed generally uniformly over the surface of the non-magnetic intermediate layer 15. Thereby, it is preferable that the tip-shaped magnetic bodies 91 are formed with a size and separation such that at least two or more tip-shaped magnetic bodies 91 are deposed with regard to the size of the recording bit formed in the recording layer. With this, it becomes possible to concentrate the magnetic flux from the recording head to the recording layer 16.

Figure 25:
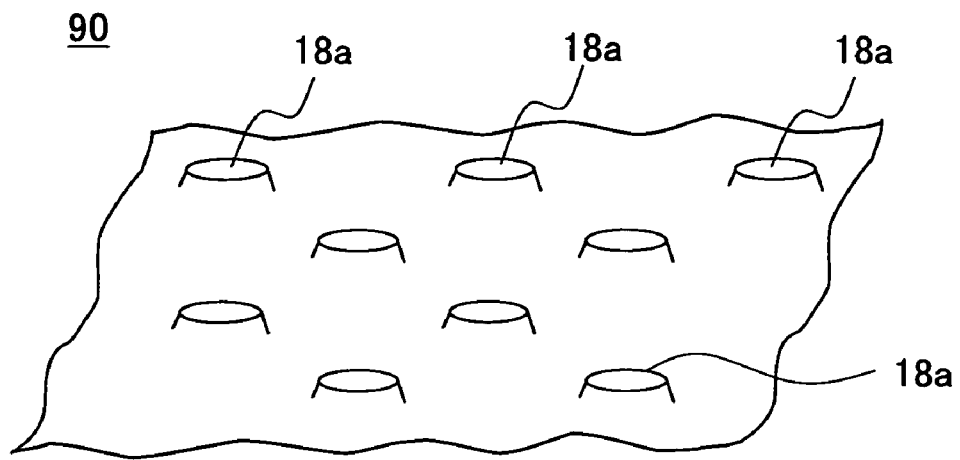
FIG. 25 is a plan view diagram of the perpendicular magnetic recording medium according to the sixth embodiment.

FIG. 25 is a plan view diagram of the perpendicular magnetic recording medium 90 of the sixth embodiment. Referring to FIG. 25, there appears a pattern 18*a* of the tip-shaped magnetic body 19 at the surface of the perpendicular magnetic recording medium 90, wherein the pattern 18*a* functions as so-called texture. With this, it becomes possible to prevent adhesion of the magnetic head not illustrated in the case the magnetic head has stopped at the surface of the perpendicular magnetic recording medium 90.

Next, the method of forming the tip-shaped magnetic body 91 will be explained.

First, a soft magnetic layer forming the tip-shaped magnetic bodies 91 is formed on the non-magnetic intermediate layer 15 by a sputtering process or evaporation deposition process. Next, an electron beam resist film is coated by using a spin coater, and after baking, the texture shape pattern formed on a stencil mask of 4 times magnification is exposed by using a single-shot electron beam projection exposure method.

Next, a post-exposure baking processing is conducted, and a resist pattern is formed after development. Further, by using the resist pattern thus obtained as a mask, the soft-magnetic layer is subjected to an etching process by using an ion milling process, such that the etching reaches the non-magnetic intermediate layer. Thereafter, the resist pattern is removed.

With such a process, the tip-shaped magnetic bodies 91 can be formed to the minimum size of about 0.6 nm in view of the fact that the address unit of the current mask data is 2.5 nm and patterning is made with a 4 times demagnification.

Figure 26:
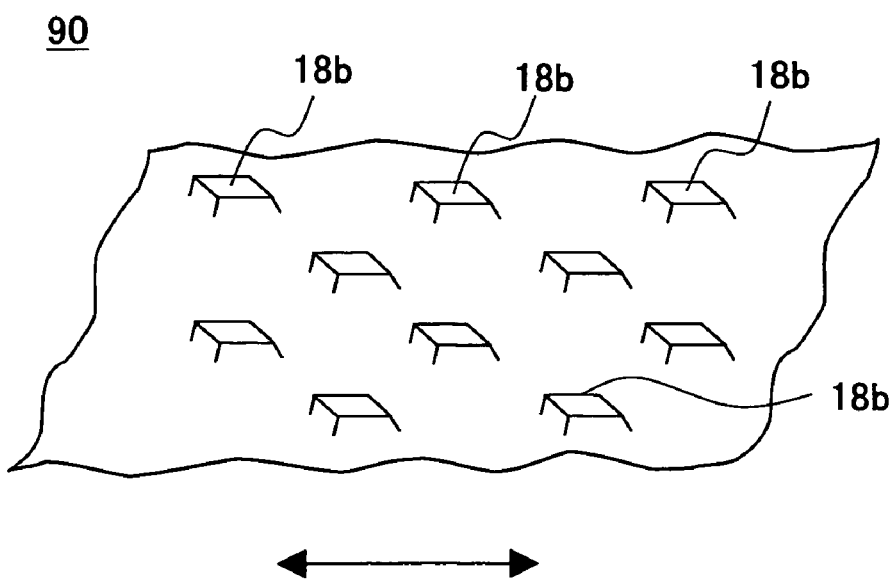
FIG. 26 is a schematic cross-sectional diagram of the perpendicular magnetic recording medium according to a modification of the sixth embodiment of the present invention.

It should be noted that the magnetic flux slit layer 91 may include rectangular patterns 18*b* shown in FIG. 26 in place of the circular patterns showing in the plan view of FIG. 25. Thereby, each pattern 18*b* is formed such that the edge of the pattern 18*b* crosses perpendicularly to the moving direction Mv of the perpendicular magnetic recording medium 90 shown by an arrow. By controlling the shape and height of the tip-shaped magnetic bodies 91 in the moving direction Mv, the risk of the magnetic head causes crashing by contacting with the surface of the perpendicular magnetic recording medium 90 can be reduced.

Further, it is possible to provide a non-magnetic layer between the tip-shaped magnetic bodies 91 and the recording layer 16. With this, it becomes possible to disconnect magnetic coupling between the tip-shaped magnetic body 91 and the recording layer 16. Further, it is possible to cover the tip-shaped magnetic bodies 91 by a non-magnetic layer and adjust the dimples formed by the tip-shaped magnetic bodies 91 by an etching process or polishing by way of a chemical mechanical polishing process. With this, it becomes possible to control the texture effect by adjusting the surface roughness of the perpendicular magnetic recording medium 90.

According to the present embodiment, in which the tip-shaped magnetic bodies 91 are provided between the soft-magnetic backing layer 12 and the recording layer 16 such that the tip-shaped magnetic bodies 91 have an easy axis of magnetization in the film thickness direction, it becomes possible to concentrate the magnetic flux from the recording head to the tip-shaped magnetic bodies 91 and hence to the recording layer. Thereby, it becomes possible to increase the gradient of the magnetic field. Further, the shape of the tip-shaped magnetic bodies 91 is transferred to the layers in the film thickness direction, there is formed a texture pattern of dimple shape on the surface of the perpendicular magnetic recording medium 90, and adhesion of the magnetic head to the surface is prevented and the risk of occurrence of head crash is reduced.

Seventh Embodiment

Next, a perpendicular magnetic recording medium according to a seventh embodiment of the present invention will be explained wherein the perpendicular magnetic recording medium of the present embodiment includes a magnetic flux control layer of a superconducting material between the soft-magnetic backing layer and the recording layer.

Figure 27:
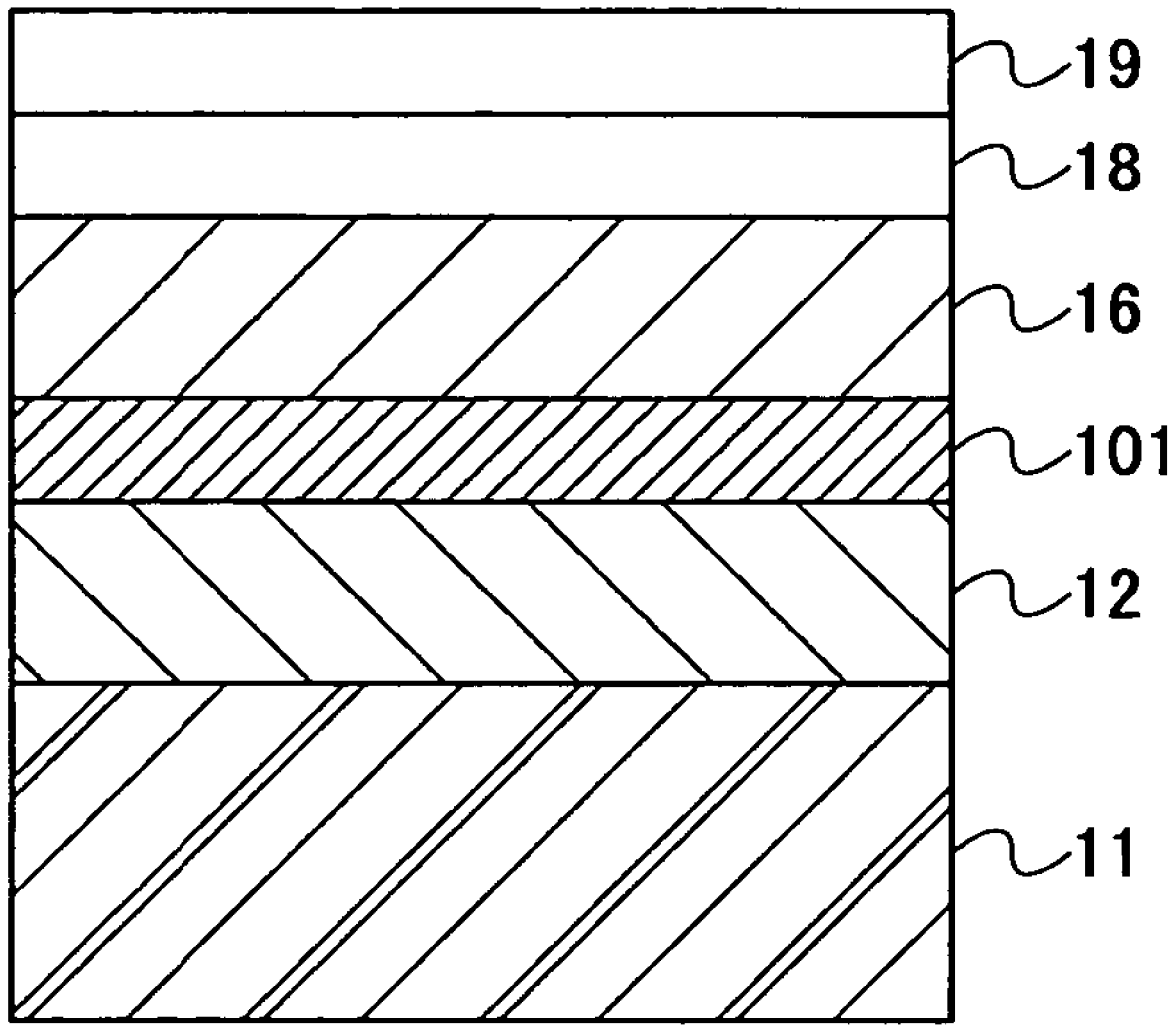
FIG. 27 is a schematic cross-sectional diagram of the perpendicular magnetic recording medium according to a seventh embodiment.

FIG. 27 is a schematic cross-sectional diagram of the perpendicular magnetic recording medium according to the seventh embodiment of the present invention, wherein those parts corresponding to the parts explained previously are designated by the same reference numerals and the description thereof will be omitted.

Referring to FIG. 27, the perpendicular magnetic recording medium 100 of the present embodiment includes a substrate 11 and has a construction in which a soft-magnetic backing layer 12, a magnetic flux control layer 101, a recording layer 16, a protective layer 18, and a lubricating layer 19 are stacked consecutively over the substrate 11.

The magnetic flux control layer 101 is formed of a superconducting material of the thickness of 10 nm-1000 nm, wherein the magnetic flux control layer 101 may be formed by a sputtering process, vacuum evaporation deposition process, a CVD process, a laser ablation process, or the like. From the viewpoint of the spacing between the recording head (not shown) and the soft magnetic backing layer 12, it is preferable that the thickness of the magnetic flux control layer 101 is less than 50 nm within the foregoing range, while from the viewpoint of leakage of magnetic flux from the magnetic flux control layer 101, it is preferable that the magnetic flux control layer 101 has the thickness larger than ⅓ of the penetration depth of the magnetic field.

While the superconducting material used for the magnetic flux control layer 101 is not specifically limited, it is preferable to use oxide superconductors having a critical temperature Tc of superconductivity of 90K-125K such as $YBa_2Cu_3O_{7-\delta}$ (0<δ<1), $Bi_2Sr_2CaCu_2O_8$, $Bi_2Sr_2Ca_2Cu_3O_{10}$, $Ti_2Ba_2Ca_2Cu_3O_{10}$ or $Nb_3Ge$, $Nb_3Al$, or the like.

When the perpendicular magnetic recording medium 100 is cooled to the critical temperature Tc of superconductivity, the magnetic flux control layer 101 takes a superconducting state and becomes a perfect diamagnetic body, and thus, the magnetic flux from the recording head cannot pass through the magnetic flux control layer 101 and reach the soft-magnetic backing layer 12. Thus, the magnetic flux from the recording head is spread over a wide area. According to the present embodiment, on the other hand, a part of the magnetic flux control layer 101 is heated such that there is caused a change to the normal conduction state. As a result, the magnetic flux can selectively pass through the region thus converted to the normal conduction state, and it becomes possible to concentrate the magnetic field to such a region and hence cause concentration in the recording layer 16.

Hereinafter, the recording and reproducing method of the perpendicular magnetic recording medium 100 of the present embodiment will be explained.

Figure 28:
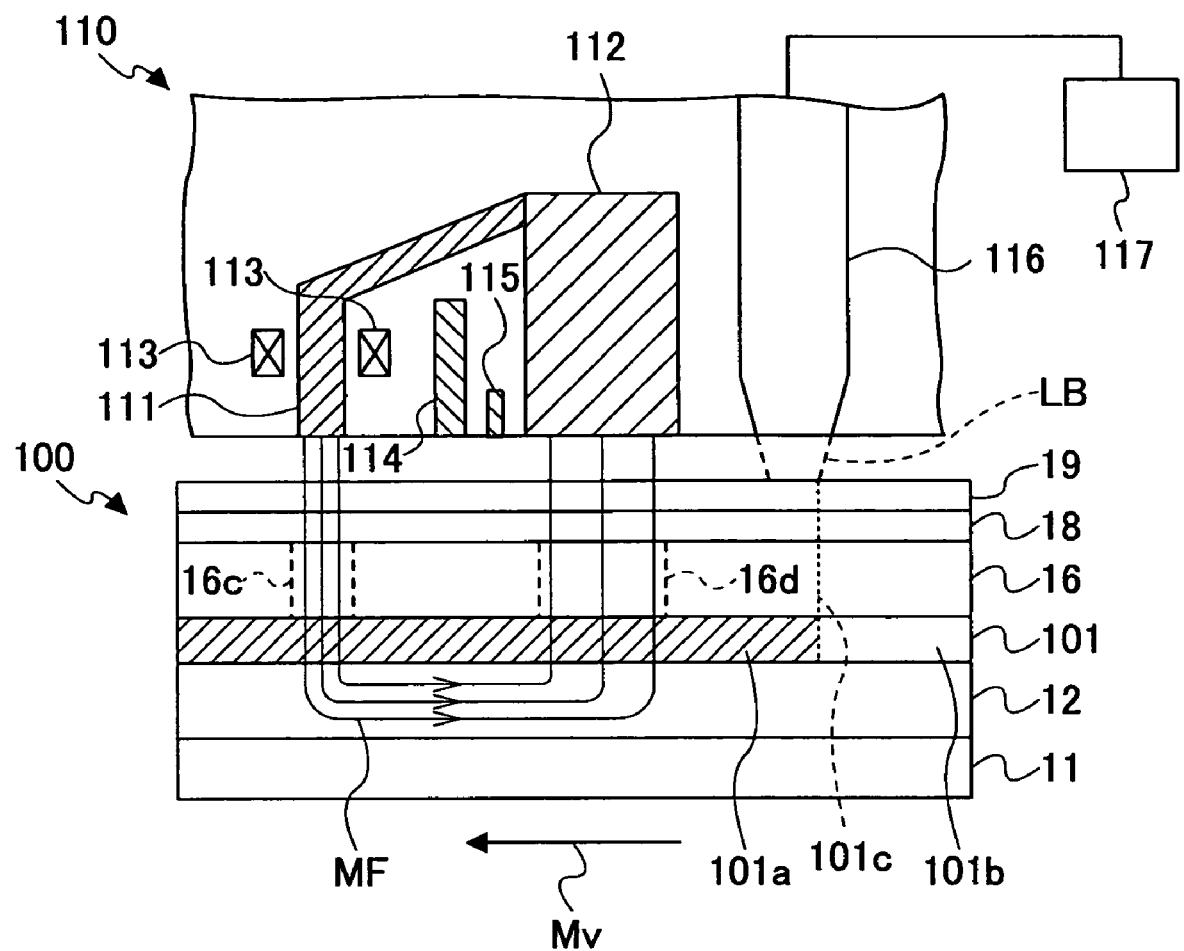
FIG. 28 is a diagram showing recording made on the perpendicular magnetic recording medium o the seventh embodiment.

FIG. 28 is a diagram showing the state of carrying out recording into the perpendicular magnetic recording medium of the present embodiment. There is deposed a composite magnetic head 110 so as to face the perpendicular magnetic recording medium 100, wherein the composite magnetic head 110 comprises: a recording head including a primary magnetic pole 111, a recording coil 113 magnetically energizing the primary magnetic pole 111, and a return yoke 112 connected to the primary magnetic pole 111 magnetically; a reproducing head including a magnetic sensing element 115 such as an MR element, a shield 114, or the like; an optical fiber 116 connected to a laser optical source 117 such as a laser diode, the optical fiber 116 having a squeezed tip end part and used for irradiating an optical beam LB on the surface of the perpendicular magnetic recording medium 100. It should be noted that the magnetic head 110 and the perpendicular magnetic recording medium 100 are accommodated in a constant temperature vessel or constant temperature tank not illustrated and is held in the ambient of the critical temperature Tc or lower.

When recording information on the perpendicular magnetic recording medium 100, it is conducted, in addition to the application of the recording magnetic field, to cause a change of state to the normal conduction sate in the magnetic flux recording layer 101 in correspondence to the region underneath the primary magnetic pole 111 and the return yoke 112, such that the magnetic flux from the recording head 110 makes a circuit between the magnetic head 110 and the soft-magnet backing layer 12. More specifically, an optical beam is irradiated upon the surface of the perpendicular magnetic recording medium 100 at an upstream side of the perpendicular magnetic recording medium 100 that moves in the direction of arrow Mv so as to heat the magnetic flux control layer 101 to a temperature higher than the critical temperature Tc by way of thermal conduction, and with this, there is formed a region 101a of normal conduction state. The power and wavelength of the optical beam is adjusted appropriately depending on the temperature of the perpendicular magnetic recording medium 100 and the temperature to be reached by the heating. For example, the power is set to be several milliwatts or less and the beam diameter is set to 1 μm or less.

Because heating is made with the present embodiment by a single beam, the region 101a takes normal conducting state wherein the region 101a of normal conduction state is distinguished over the region 101b of superconducting state at the upstream side by a boundary 101c. Thus, the part of the magnetic flux control layer 101 right underneath the primary magnetic pole 111 and the return yoke 112 is always in normal conduction state and takes a non-magnetic state, and thus, the magnetic flux from the primary magnetic pole 111 flows to the return yoke 112 along the path of: recording layer 16a—magnetic flux control layer 101—soft-magnetic backing layer 12—magnetic flux control layer 101—recording layer 16b. As a result, the recording layer 16a facing the primary magnetic pole 111 is magnetized.

FIG. 29 is a diagram for explaining the situation of the magnetic flux control layer as viewed from side of the composite magnetic head of FIG. 28. In the drawing, the perpendicular magnetic recording medium 100 moves in the direction Mv represented by the arrow, and thus, the upstream side is located at the right hand side of the drawing. Further, FIG. 29 shows the tracks $Tk_{n-1}$-$Tk_{n+1}$ formed in the recording layer 16.

Referring to FIG. 29, the magnetic flux control layer 101 is heated by an optical beam LB emitted from the optical fiber and there is formed a region 101a of normal conduction state in a part of the region 101b of superconducting state at the boundary 101c. It should be noted that the region 101a of normal conduction state spreads in the track width direction at the upstream side while this spreading reduces in the downward direction. In the region that faces the primary magnetic pole 111, expansion in the track width direction is set generally equal to the track width. Thus, the magnetic flux from the primary magnetic pole 111 passes through the recording layer 16 in the state of experiencing restriction in the track width direction, and no influence is provided to the magnetization in the adjacent tracks $Tk_{n-1}$ and $Tk_{n+1}$. As a result, it becomes possible to prevent erasing of adjacent tracks, and it becomes possible to increase the track density.

With regard to the elongating direction of the tracks, there is caused spreading for the region 101a of normal conducting state in the elongating direction as long as a single beam is used, and it is not possible to constrict the magnetic flux to the degree that the region of normal conduction state corresponds to one bit magnetization region, which is sandwiched by magnetic transition regions. On the other hand, the spreading of magnetic flux in the track width direction is restricted with the present construction, and there is attained the effect of increase in the magnetic flux density and hence the recording magnetic field. Thus, writing performance such as overwrite characteristics or NLTS characteristics are improved with the present embodiment.

In the foregoing, it is also possible to focus the laser beam upon the surface of the perpendicular magnetic recording medium 100 by using a microlens in place of the optical fiber.

Referring back to FIG. 28, reproducing of the information recorded upon the perpendicular magnetic recording medium 100 is achieved by detecting the leakage magnetic field from the magnetized recording layer 16 by way of a magnetic sensing element of the reproducing head similarly to the conventional perpendicular magnetic recording medium. Further, in the case reproducing operation alone is to be performed, it is possible that the magnetic flux control layer 101 is in the normal conduction state.

Meanwhile, it is also possible to separate the primary magnetic pole 111 from the return yoke 112 and provide another optical fiber between the primary magnetic pole 111 and the return yoke 112 and irradiate two optical beams for the primary magnetic pole and the return yoke. More specifically, the optical beam for the return yoke is set such that there is formed a region of normal conduction state with the larger diameter shown in FIG. 29, and the region of normal conduction state is formed by heating the optical beam for the primary magnetic pole to have the size generally corresponding to thickness×width of the primary magnetic pole 111. Further, the region of normal conduction state for the return yoke and the region of normal conduction state for the primary pole are separated from each other by separating the primary magnetic pole 111 from the return yoke 112. With such a construction, it becomes possible to increase the magnetic flux density and hence the magnetic field from the primary magnetic pole 111 and the gradient of recording magnetic field is made steeper.

In the following, calculation will be shown with regard to the effect of the perpendicular magnetic recording medium of the present invention.

Figure 30A:
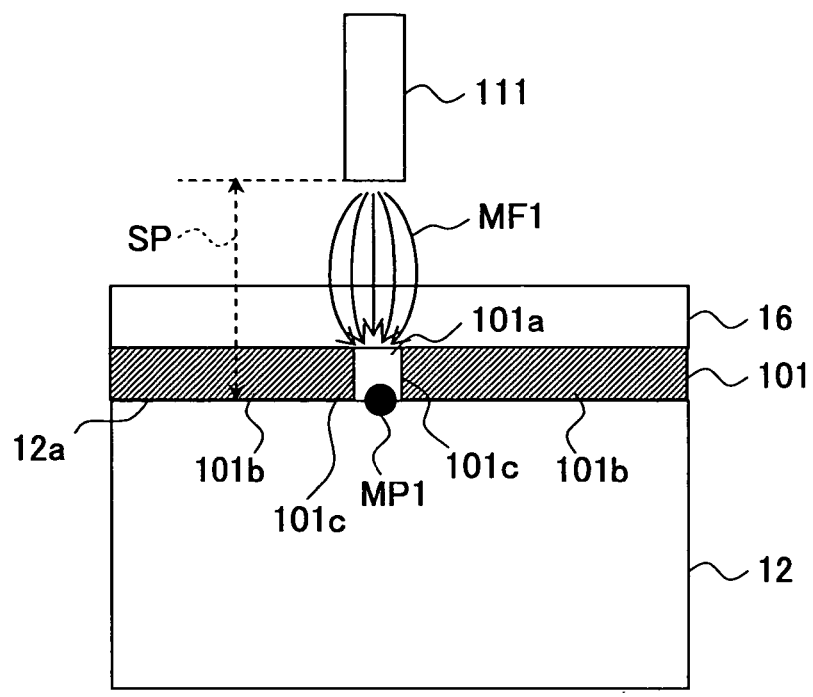
Figure 30B:
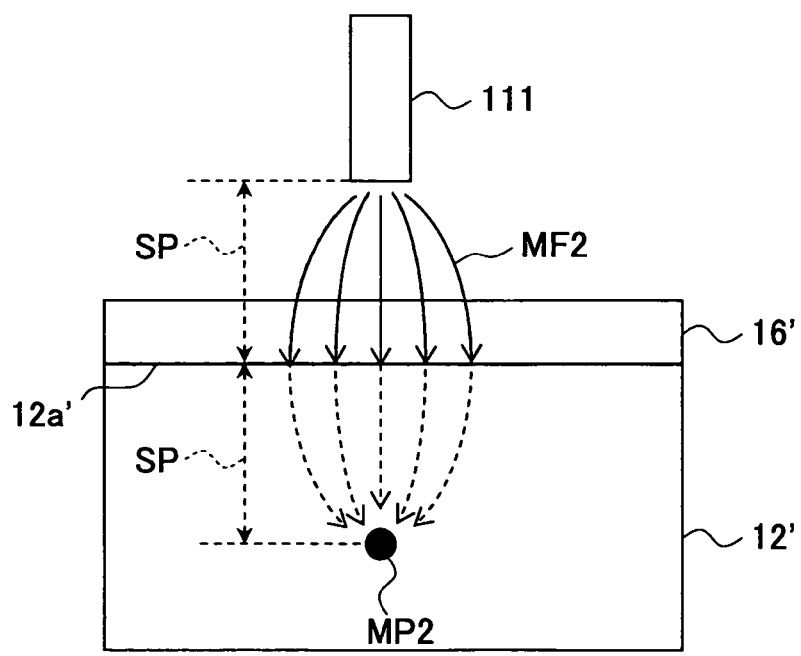
FIG. 30B is a diagram showing application of a magnetic flux to the perpendicular magnetic recording medium of a comparative example from a primary magnetic pole of a recording head.

FIG. 30A is a diagram showing application of the magnetic flux from the primary magnetic pole of the recording head upon the perpendicular magnetic recording medium of an example of the present embodiment, while FIG. 30B shows application of the magnetic flux of the primary magnetic pole of the recording head to the perpendicular magnetic recording medium according to a comparative example. For the convenience of explanation, illustration of the protective film 18 and the lubricating film 19 is omitted.

Referring to FIG. 30A, in the perpendicular magnetic recording medium of the present embodiment, it is thought that a virtual magnetic pole MP1 formed by mirror effect with respect to the primary magnetic pole 111 is located on the surface of the soft-magnetic backing layer 12 in view of the fact that the magnetic flux is constricted to the normal conduction region, as long as the normal conduction region formed in the magnetic flux control layer 101 by heating has an area equal to or smaller than the area of the primary magnetic pole 111. Thus, a magnetic flux MF1 is concentrated in the recording layer 16. Further, the spacing becomes equal to a distance SP between the primary magnetic pole 111 and the virtual magnetic pole MP1.

Referring to FIG. 30B, on the other hand, there is no magnetic flux control layer between a soft magnetic backing layer 12' and a recording layer 16' in the case of the perpendicular magnetic recording medium of the comparative experiment, and thus, the magnetic flux from the primary magnetic pole 111 spreads as it extends toward the soft magnetic backing layer 12'. Thus, there is formed a virtual magnetic pole MP2 symmetrically with regard to the surface 12a' of the soft-magnetic backing layer 12', and thus at a distance SP, which is equal to the distance between the primary magnetic pole 111 and the surface of the soft-magnetic backing layer 12a', in the downward direction as measured from the surface of the backing layer 12a'. In this case the distance between the primary magnetic pole 111 and the virtual magnetic pole MP2 becomes 2×SP.

Here, the relationship between the signal-to-noise ratio (S/Nm) that includes the line recording density dependence and the spacing as set forth in the table below. It should be noted that negative change ratio of S/Nm in the table below means that there occurs decrease of S/Nm with increase of the spacing.

| <Line Recording Density> | <S/Nm change ratio per 1 nm spacing> |
|---|---|
| 200 kFCI | −0.1 dB/nm |
| 370 kFCI | −0.3 dB/nm |
| 480 kFCI | −0.4 dB/nm |

From above, the results below are obtained by the calculation based on the spacing between the primary magnetic pole 111 and virtual magnetic pole MP1 or MP2, while using the relationship between S/Nm and the line recording density. Here, it was assumed that the distance SP=50 nm. In the table below, the increment of S/Nm represents the increment of S/Nm of the example of the present invention with regard to the comparative example, and the positive value means that the example of the present invention provides higher S/Nm as compared with the comparative example.

| <Line Recording Density> | <increment of S/Nm> |
|---|---|
| 200 kFCI | 5 dB |
| 300 kFCI | 10 dB |
| 400 kFCI | 15 dB |
| 500 kFCI | 20 dB |
| 600 kFCI | 25 dB |

From the table above, it can be seen that there is a significant increase of S/Nm with the example of the present embodiment. Thus, by providing the magnetic flux control layer 101 between the soft magnetic backing layer 12 and the recording layer 16, there is caused improvement of S/Nm and that high density recording becomes possible.

Further, it should be noted that, while the recording layer 16 of the present embodiment is similar to the recording layer 16 explained with the first or second embodiment, the perpendicular magnetic recording medium 100 of the present embodiment is used at the temperature below the critical temperature Tc. For example, the critical temperature Tc of the superconducting materials currently discovered is about 120K or lower. Therefore, the degree of demagnetization caused by thermal stability is small. Thus, the constraint on the volume of the magnetic particles is relaxed as compared with conventional perpendicular magnetic recording media, while this enables further miniaturization of the magnetic particles constituting the recording layer 16. Thereby, it becomes possible to achieve further reduction of the medium noise easily.

It should be noted that it is possible to stack a non-magnetic intermediate layer 15 shown in FIG. 1 and explained in the first embodiment between the magnetic flux control layer 101 and the recording layer 16. It is noted that epitaxial growth of the ferromagnetic material constituting the recording layer 16 over the magnetic flux control layer 101 is difficult, while with the formation of the non-magnetic intermediate layer 15, the crystallinity and crystal orientation of the recording layer 16 is improved, it becomes possible to reduce the medium noise further. Further, it is possible to provide the seed layer 13 and the under layer 31 shown in FIGS. 1 and 2 between the magnetic flux control layer 101 and the non-magnetic intermediate layer 15.

In an example of the present embodiment, a structure of: glass substrate/CoNbZr film (120 nm)/$YBa_2Cu_3O_{7-\delta}$ film (20 nm)/Ta film (1 nm)/$(Co_{76}Cr_9Pt_{15})$ 90 vol %-$(SiO_2)$ 10 vol % film (10 nm)/carbon film (4 nm)/AM3001 film (1.5 nm) was formed from the side of the substrate, wherein the AM3001 film was formed by a pull up process while other films were formed by a sputtering process. The numerals in the parentheses represent the film thickness.

Next, a perpendicular magnetic recording medium in which a magnetic flux control layer of superconducting material is provided on the recording layer will be explained as a modification of the present embodiment.

Figure 31:
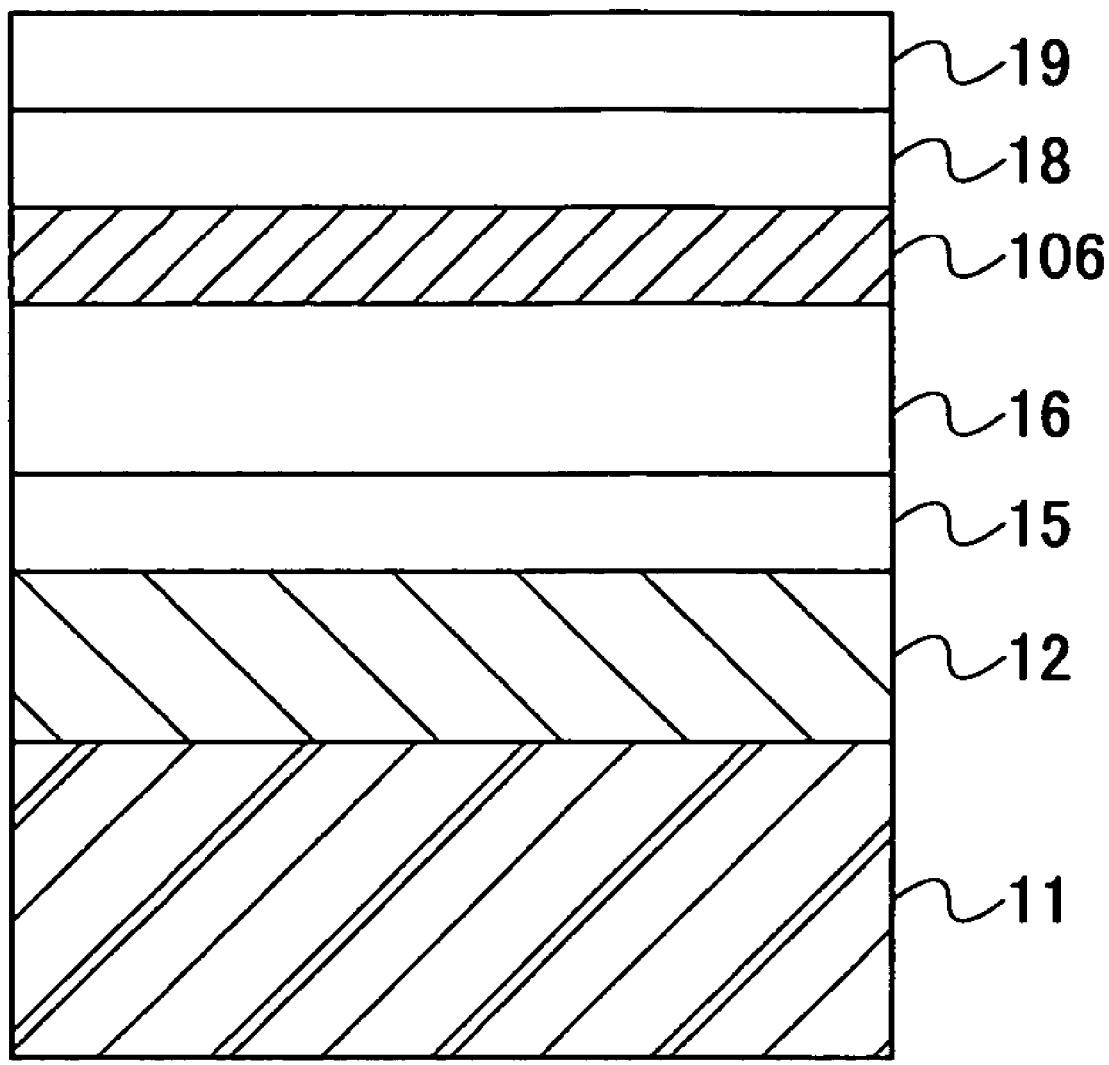
FIG. 31 is a schematic cross-sectional diagram of the perpendicular magnetic recording medium according to the seventh embodiment of the present invention.

FIG. 31 is a schematic cross-sectional diagram of the perpendicular magnetic recording medium of the modification of the seventh embodiment, wherein those parts in the drawing corresponding to the parts explained previously are designated by the same reference numerals and the description thereof will be omitted.

Referring to FIG. 31, the perpendicular magnetic recording medium 105 includes a substrate 11 and hast the constriction of consecutively stacking, on the substrate 11, a soft-magnetic backing layer 12, a recording layer 16, a magnetic flux control layer 106, a protective film 18, and a lubricating film 19.

The magnetic flux control layer 106 on the recording layer 16 is formed similarly to the magnetic flux control layer 101 of the present embodiment, and recording is conducted similarly. Thereby, it should be noted that the output or beam size of the optical beam LB shown in FIGS. 28 and 29 are adjusted appropriately according to the material and thickness of the superconducting material of the magnetic flux control layer 106.

In the case of reproducing the perpendicular magnetic recording medium of the present embodiment, irradiation of the optical beam is conducted similarly to the recording method of FIGS. 28 and 29 to form the region of normal conduction state in the magnetic flux control layer 106 and reproducing is achieved by detecting the leakage magnetic field from the recording layer 16 by the magnetic sensing element of the reproducing head not illustrated through the region of the normal conduction state in the magnetic flux control layer 106.

According to the present modification, it becomes possible to constrict the magnetic flux between the recording head and the recording layer 16, and high recording magnetic field and large gradient for the recording magnetic field are achieved.

While the optical beam has been irradiated from the front side of the perpendicular magnetic recording medium 100 or 105 with the present embodiment, it is also possible to irradiate the optical beam from the rear side.

Eighth Embodiment

Next, a perpendicular magnetic recording medium according to an eighth embodiment of the present invention will be explained wherein the perpendicular magnetic recording medium of the present embodiment includes tip-shaped magnetic bodies of a non-magnetic material disposed between the soft-magnetic backing layer and the recording layer generally uniformly and a magnetic flux slit layer of a superconducting material filling the gap between adjacent tip-shaped non-magnetic bodies.

Figure 32A:
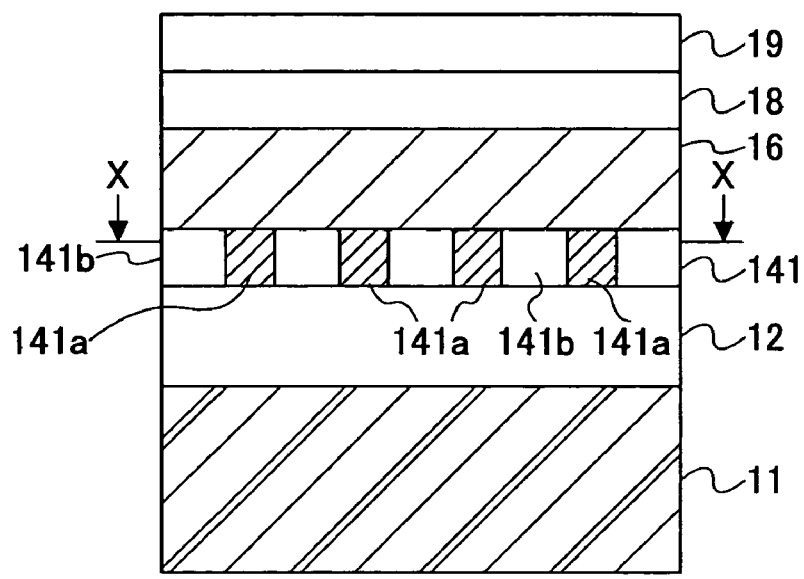
Figure 32B:
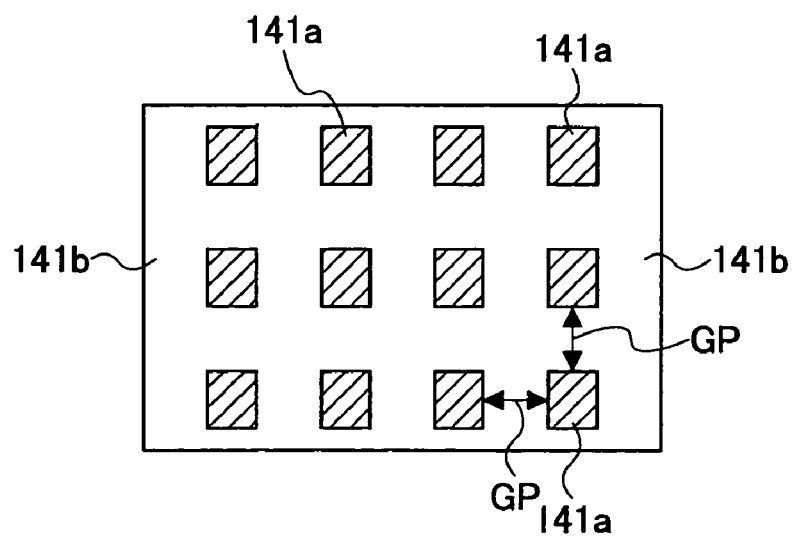
FIG. 32B is an X-X cross-sectional diagram of FIG. 32A.

FIG. 32A is a schematic cross-sectional diagram of the perpendicular magnetic recording medium of the eighth embodiment, while FIG. 32B is an X-X cross-sectional diagram of FIG. 32A. In the drawings, those parts corresponding to the parts described before are designated by the same reference numerals and the description thereof will be omitted.

Referring to FIGS. 32A and 32B, the perpendicular magnetic recording medium 140 of the present embodiment includes a substrate 11 and has a construction in which a soft-magnetic backing layer 12, a magnetic flux slit layer 141, a recording layer 16, a protective layer 18, and a lubricating layer 19 are stacked consecutively over the substrate 11.

The magnetic flux slit layer 101 has a thickness of 2 nm-10 nm and is formed of tip-shaped non-magnetic bodies 141a of a non-magnetic material and a perfect diamagnetic part 141b of a superconducting material filling the cap between adjacent tip-shaped non-magnetic bodies 141a. The non-magnetic material used for the tip-shaped non-magnetic bodies 141a is selected for example from the non-magnetic materials such as Co, Cr, Ru, Re, Ri, Hf and an alloy thereof, wherein it is preferable to have an hcp structure. With this, it is possible to cause epitaxial growth in the event the recording layer 16 has an hcp structure. For example, the tip-shaped non-magnetic bodies 141a are formed to the size of 0.6 nm-20 nm×0.6 nm-20 nm, with a gap GP of 0.6 nm-20 nm between adjacent tip-shaped non-magnetic bodies 141a.

For the superconducting material of the perfect diamagnetic part 141b, it is possible to use the materials similar to those used for the magnetic flux control layer of the seventh embodiment.

The magnetic flux slit layer 101 can be formed similarly to the tip-shaped magnetic bodies of the sixth embodiment. Thus, a soft magnetic layer forming the tip-shaped magnetic bodies 141a is formed on the soft-magnetic backing layer 12, and the tip-shaped non-magnetic bodies 141a are formed by manufacturing a mask by using an electron beam resist film and a single-shot electron beam projection exposure process and further conducting an etching process. Next, a superconducting material covering the tip-shaped non-magnetic body 141a is formed, followed by a planarizing process conducted by a CMP process, or the like, until the tip-shaped non-magnetic bodies 141a are exposed.

The perpendicular magnetic recording medium 140 of the present embodiment is used in the ambient of the critical temperature Tc or lower, similarly to the seventh embodiment, in the state that the perfect diamagnetic part 141b is in superconducting state. Thereby, the magnetic flux exiting from the recording head cannot pass through the perfect diamagnetic part 141a at all and passes through the tip-shaped non-magnetic bodies 141a. Thus the magnetic flux from the recording head are concentrated in the tip-shaped non-magnetic bodies 141a, and with this, it becomes possible to concentrate the magnetic flux to the recording layer 16.

From the viewpoint of concentrating the magnetic flux, it is possible to use a soft-magnetic material for the tip-shaped non-magnetic body 141a.

The perpendicular magnetic recording medium 140 of the present embodiment can achieve recording and reproducing without using an optical beam, contrary to the perpendicular magnetic recording medium of the seventh embodiment, and thus, it becomes possible to simplify the construction of the magnetic head.

Ninth Embodiment

Next, a magnetic storage apparatus of a ninth embodiment of the present invention will be described, wherein the magnetic storage apparatus of the present embodiment is equipped with a perpendicular magnetic recording medium of any of the first through sixth embodiments.

Figure 33:
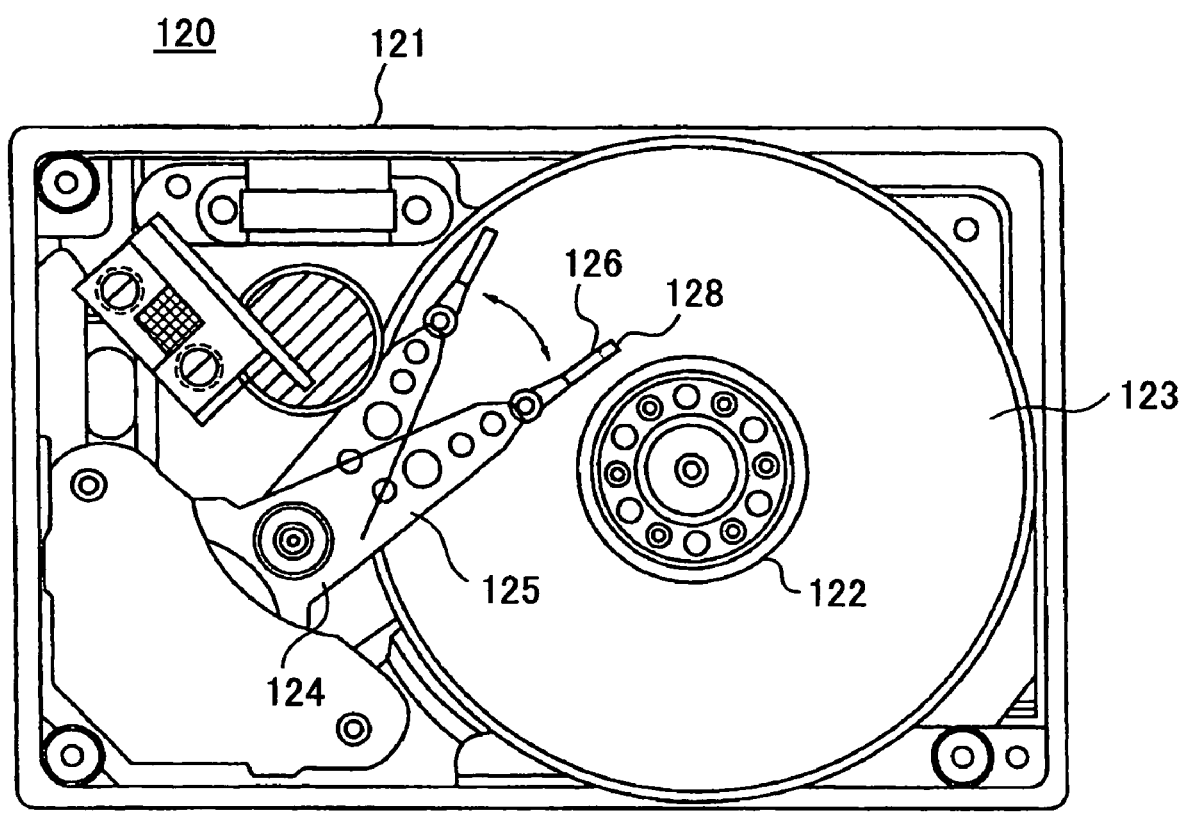
FIG. 33 is a diagram showing an essential part of the magnetic storage apparatus according to a ninth embodiment of the present invention.

FIG. 33 is a diagram showing an essential par of the magnetic storage apparatus according to the present embodiment.

Referring to FIG. 33, the magnetic storage apparatus 120 is generally formed of a housing 121, wherein the housing 121 accommodates therein a hub 122 driven by a spindle (not shown), a perpendicular magnetic recording medium 123 fixed upon the hub 122 for rotation, an actuator unit 124, an arm 125 mounted upon the actuator unit 124 and is moved in the radial direction of the perpendicular magnetic recording medium 123, a suspension 126, and a perpendicular magnetic head 128 supported by the suspension 126.

Figure 34:
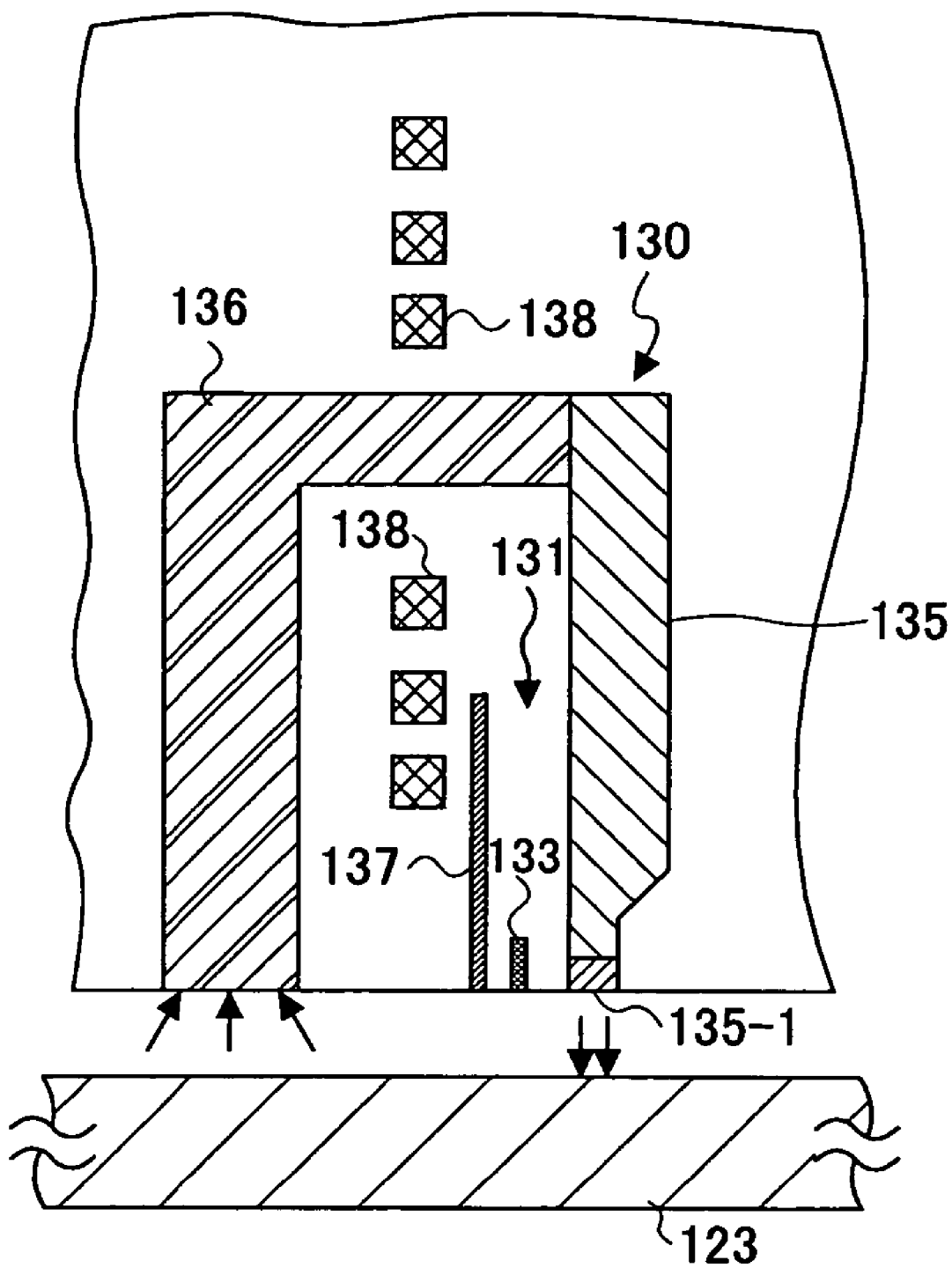
FIG. 34 is a schematic cross-sectional diagram of a perpendicular magnetic recording head and a perpendicular magnetic recording medium.

FIG. 34 is a schematic cross-sectional diagram of the perpendicular magnetic recording head and the perpendicular magnetic recording medium. Referring to FIG. 34, the perpendicular magnetic head 128 is generally formed of a recording head 130 including a primary magnetic pole 135 and return yoke 136 and a reproducing head 131 formed of a GMR (Giant Magneto Resistive) element 133. The recording head 130 is formed of a primary magnetic pole 135 of the soft magnetic body for applying a recording magnetic field to the perpendicular magnetic recording medium 123 and a return yoke 136 connected to the primary magnetic pole 135 magnetically, a recording coil 138 for inducing the recording magnetic field in the primary magnetic pole 135, and the like. Further, the reproducing head 131 is formed a GMR element 133 sandwiched between a lower shield that uses the return yoke 136 and an upper shield 137.

The recording head 130 applies the recording magnetic field to the perpendicular magnetic recording medium 123 from a tip end part 135-1 of the primary magnetic pole in the perpendicular direction and forms magnetization in the recording layer (not shown) in the perpendicular direction. Thereby, it should be noted that the magnetic flux thus exited from the tip end part 135-1 of the primary magnetic pole returns to the return yoke 136 after passing through the soft-magnetic backing layer (not shown). Preferably, the soft-magnetic material of high saturation magnetic flux density such as 50 at % Ni-50 at % Fe, a FeCoNi alloy, a FeCoAlO, or the like, is used for the tip end part 135-1 of the primary magnetic pole. With this, magnetic saturation is prevented and it becomes possible to concentrate the magnetic flux of high magnetic flux density to the recording layer 120.

Further, the reproducing head 131 senses the leakage magnetic field of the magnetization in the perpendicular magnetic recording medium 123 and obtains the information recorded in the recording layer in the form of change of the resistance of the GMR element 133 corresponding to that direction. Further, it is possible to use a TMR (Ferromagnetic Tunnel Junction Magneto Resistive) element or ballistic MR element in place of the GMR element 133.

It should be noted that the magnetic recording medium 120 of the present embodiment has the feature in the perpendicular magnetic recording medium 123. For example, the perpendicular magnetic recording medium 123 is formed of a perpendicular magnetic recording medium of any of the first through sixth embodiments or a modification thereof.

Further, fundamental construction of the magnetic recording medium 120 is not limited to the one shown in FIG. 33. Thus, the perpendicular magnetic recording medium 123 used with the present invention is not limited to a magnetic disk but may be a magnetic tape.

According to the present embodiment, the magnetic storage apparatus 120 can achieve narrowing of tracks and improvement of linear recording density and thus can achieve high density recording, by constricting the magnetic flux from the principal magnetic pole 135 of the recording head 130 to the recording layer in the perpendicular magnetic recording medium 123.

While the present invention has been explained with reference to preferred embodiments, the present invention is not limited to such particular embodiments and various variations and modifications may be made within the scope of the invention described in the form of patent claims.

For example, while magnetic disk has been described as the perpendicular magnetic recording medium in the magnetic storage apparatus of the ninth embodiment, the perpendicular magnetic recording medium of the present invention is not limited to a magnetic disk and it may be a magnetic tape of helical scanning type or lateral transport type that uses a film of PET, PEN or polyimide for the substrate. Further, the perpendicular magnetic recording medium may have the shape of a card.

INDUSTRIAL APPLICABILITY

According to the present invention, it becomes possible to suppress the spreading of magnetic flux from the recording head by providing a magnetic flux slit layer, magnetic shielding layer or magnetic flux control layer between the soft-magnetic backing layer and the recording layer, or over the recording layer. With this, the recording magnetic field is increased and the gradient of the recording magnetic field is made steep, and it becomes possible to realize a perpendicular magnetic recording medium capable of performing high density recording.

Further, by providing a non-magnetic intermediate layer between the soft-magnetic backing layer and the recording layer for controlling the grain diameter and distribution of the magnetic particles of the recording layer, miniaturization and isolation of crystal particles is facilitated for the recording layer at the same time, and S/N is improved. Thereby, a perpendicular magnetic recording medium capable of performing high density recording is realized.

What is claimed is:

1. A perpendicular magnetic recording medium, comprising:

a soft-magnetic backing layer; and a recording layer provided over said soft-magnetic backing layer, wherein there is provided a magnetic flux slit layer between said soft-magnetic backing layer and said recording layer, said magnetic flux slit layer comprising a soft-magnetic layer having a generally columnar structure generally isolated magnetically in an in-plane direction, wherein said magnetic flux slit layer contains at least one selected from the group consisting of Co, Fe, Ni, a Co alloy, a Fe alloy, and a Ni alloy, as a major component, and wherein said magnetic flux slit layer further contains any one selected from the group consisting of Ta, Cu, Pb, Cr, and Re.

2. The perpendicular magnetic recording medium as claimed in claim 1, wherein there is further provided a non-magnetic intermediate layer between said magnetic flux slit layer and said recording layer,
said recording layer being grown epitaxially over said non-magnetic intermediate layer.

3. The perpendicular magnetic recording medium as claimed in claim 2, wherein said non-magnetic intermediate layer has an hcp crystal structure and has a (100) surface in a crystal growth direction,
and wherein said magnetic flux slit layer has any of an hcp crystal structure or an fcc crystal structure.

4. The perpendicular magnetic recording medium as claimed in claim 1, wherein said magnetic flux slit layer has an in-plane magnetic anisotropy exceeding a perpendicular magnetic anisotropy.

5. The perpendicular magnetic recording medium as claimed in claim 4, wherein an anisotropic magnetic field of said in-plane magnetic anisotropy exceeds 711 kA/m.

6. The perpendicular magnetic recording medium as claimed in claim 1, wherein said magnetic flux slit layer comprises crystal particles of said generally columnar structure and a grain boundary part formed between said crystal particles.

7. The perpendicular magnetic recording medium as claimed in claim 6, wherein a major component of said crystal particles and a major component of said grain boundary part are generally identical.

8. The perpendicular magnetic recording medium as claimed in claim 7, wherein said grain boundary part containing an inert gas with an amount larger than in said crystal particles.

9. The perpendicular magnetic recording medium as claimed in claim 1, wherein said magnetic flux slit layer is formed on said soft-magnetic backing layer in contact therewith.

10. The perpendicular magnetic recording medium as claimed in claim 1, wherein said magnetic flux slit layer has an in-plane magnetic anisotropy equal to or larger than an in-plane magnetic anisotropy of said soft-magnetic backing layer.

11. The perpendicular magnetic recording medium as claimed in claim 1, wherein said recording layer comprises magnetic particles having a columnar structure and a non-magnetic non-soluble phase surrounding said magnetic particles,
said non-soluble phase comprising any of an oxide, a nitride and a carbide.

12. A magnetic storage apparatus, comprising:
a perpendicular magnetic recording medium; and
a recording and reproducing head, said perpendicular magnetic recording medium comprising:
a soft-magnetic backing layer; and
a recording layer provided over said soft-magnetic backing layer,
wherein there is provided a magnetic flux slit layer between said soft-magnetic backing layer and said recording layer, said magnetic flux slit layer comprising a soft-magnetic layer having a generally columnar structure generally isolated magnetically in an in-plane direction,
wherein said magnetic flux slit layer contains at least one selected from the group consisting of Co, Fe, Ni, a Co alloy, a Fe alloy, and a Ni alloy, as a major component, and
wherein said magnetic flux slit layer further contains any one selected from the group consisting of Ta, Cu, Pb, Cr, and Re.

13. The perpendicular magnetic recording medium as claimed in claim 1, wherein said magnetic flux slit layer includes ferrite particles of a needle form disposed such that an easy axis of magnetization is oriented generally in a thickness direction of said magnetic flux slit layer, said ferrite particle having a coercive force of 15.8 kA/m–35.6 kA/m in an elongating direction thereof.

14. The perpendicular magnetic recording medium as claimed in claim 1, wherein said magnetic flux slit layer includes ferrite particles of a plate form disposed such that an easy axis of magnetization is oriented generally in a thickness direction of said magnetic flux slit layer, said ferrite particle having a coercive force of 15.8 kA/m–47.4 kA/m in a thickness direction thereof.

15. A perpendicular magnetic recording medium, comprising:
a soft-magnetic backing layer; and
a recording layer provided over said soft-magnetic backing layer,
wherein there is provided a magnetic flux slit layer between said soft-magnetic backing layer and said recording layer, said magnetic flux slit layer comprising a soft-magnetic layer having a generally columnar structure generally isolated magnetically in an in-plane direction,
wherein there is further provided a non-magnetic intermediate layer between said magnetic flux slit layer and said recording layer, with said recording layer being grown epitaxially over said non-magnetic intermediate layer,
wherein said non-magnetic intermediate layer has an hcp crystal structure and has a (100) surface in a crystal growth direction,
wherein said magnetic flux slit layer has any of an hcp crystal structure or an fcc crystal structure,
wherein said magnetic flux slit layer has an in-plane magnetic anisotropy exceeding a perpendicular magnetic anisotropy, and
wherein an anisotropic magnetic field of said in-plane magnetic anisotropy exceeds 711 kA/m.

16. The perpendicular magnetic recording medium as claimed in claim 1:
wherein said magnetic flux slit layer comprises crystal particles of said generally columnar structure and a grain boundary part formed between said crystal particles, and
wherein said crystal particles have an average particle diameter of 3 nm to 10 nm, with an average separation between said crystal particles of between 0.5 nm and 3 nm.

17. The magnetic storage apparatus as claimed in claim 12:
wherein said magnetic flux slit layer comprises crystal particles of said generally columnar structure and a grain boundary part formed between said crystal particles, and
wherein said crystal particles have an average particle diameter of 3 nm to 10 nm, with an average separation between said crystal particles of between 0.5 nm and 3 nm.

18. The perpendicular magnetic recording medium as claimed in claim 15:
wherein said magnetic flux slit layer comprises crystal particles of said generally columnar structure and a grain boundary part formed between said crystal particles, and
wherein said crystal particles have an average particle diameter of 3 nm to 10 nm, with an average separation between said crystal particles of between 0.5 nm and 3 nm.

19. The perpendicular magnetic recording medium as claimed in claim 1, wherein said magnetic flux slit layer has a thickness of between 0.5 nm and 5 nm.

20. The magnetic storage apparatus as claimed in claim 12, wherein said magnetic flux slit layer has a thickness of between 0.5 nm and 5 nm.

21. The perpendicular magnetic recording medium as claimed in claim 15, wherein said magnetic flux slit layer has a thickness of between 0.5 nm and 5 nm.

* * * * *